United States Patent [19]

Kobayashi

[11] Patent Number: 5,286,240
[45] Date of Patent: Feb. 15, 1994

[54] SHIFT CONTROL SYSTEM FOR CONTINUOUSLY VARIABLE TRACTION ROLLER TRANSMISSION

[75] Inventor: Katsuya Kobayashi, Kanagawa, Japan

[73] Assignee: Nissan Motor Co., Ltd., Yokohama, Japan

[21] Appl. No.: 922,789

[22] Filed: Jul. 31, 1992

[30] Foreign Application Priority Data

Aug. 1, 1991 [JP] Japan .................. 3-214262

[51] Int. Cl.⁵ .................................... F16H 15/08
[52] U.S. Cl. ............................. 476/10; 476/40
[58] Field of Search ................... 476/10, 40, 42

[56] References Cited

U.S. PATENT DOCUMENTS

| | | | |
|---|---|---|---|
| 3,142,189 | 7/1964 | Davis et al. | 476/10 |
| 3,142,190 | 7/1964 | Kelsey et al. | 476/10 |
| 4,911,030 | 3/1990 | Kraus | 476/10 |
| 4,960,004 | 10/1990 | Hibi et al. | 476/10 |
| 5,048,359 | 7/1991 | Nakano | 476/10 |
| 5,052,236 | 10/1991 | Nakano | 476/10 |
| 5,136,890 | 8/1992 | Hibi et al. | 476/10 |

FOREIGN PATENT DOCUMENTS 2-163567 6/1990 Japan .

*Primary Examiner*—Leslie A. Braun
*Assistant Examiner*—David W. Laub
*Attorney, Agent, or Firm*—Foley & Lardner

[57] ABSTRACT

A shift control system for a continuously variable traction roller transmission controls the feedback to a shift control valve so that a ratio b/a of a variation "b" mm of a feedback amount to the shift control valve for 1 mm of a displacement of a power roller to a variation "a" mm of the feedback amount to the shift control valve for 1 degree of an inclination of the power roller is in a range given by: $1.74R^{4/5} - 3.90 \leq b/a \leq 3.09R^{5/9} + 30.51$.

2 Claims, 66 Drawing Sheets

SHIFT CONTROL SYSTEM FOR CONTINUOUSLY VARIABLE TRACTION ROLLER TRANSMISSION

BACKGROUND OF THE INVENTION

The present invention relates to a shift control system for a continuously variable traction roller transmission.

One of the previously proposed continuously variable traction roller transmissions is disclosed, for example, in JP-A 2-163567. Such a continuously variable transmission may use a shift control system as shown in FIGS. 64–66.

Referring to FIGS. 64–66, 1 generally designates a power roller which is interposed between input and output toroidal disks 2, 3 disposed axially perpendicular thereto. An opposed surface of each of the input and output toroidal disks 2, 3 is a toroidal surface, whereas a periphery of the power roller 1 is a spherical surface which is contact therewith. Thus, torque to the input toroidal disk 2 is transmitted to the output toroidal disk 3 via rotation of the power roller 1. By slantly rotating the power roller 1 about a slant rotation axis $O_2$ perpendicular to a rotation axis $O_1$ thereof to vary a position of contact with the input and output disks 2, 3, the input-/output rotation ratio or speed ratio can be changed steplessly.

While the power roller 1 occupies a position to put the rotation axis $O_1$ at the same level as a rotation axis $O_3$ of the input and output corn disks 2, 3, it preserves the inclination or speed ratio at the same value, whereas when the power roller 1 is moved in the direction of the slant rotation axis $O_2$ to put the rotation axis $O_1$ offset from the rotation axis $O_3$ of the input and output disks 2, 3, it slantly rotates by itself in the direction corresponding to the offset direction to vary the inclination. From the foregoing, when controlling this continuously variable transmission, the following shift control method is adopted:

A trunnion 4 for rotatably supporting the power roller 1 is not only rotatable about the slant rotation axis $O_2$, but movable in the direction of slant rotation axis $O_2$. This displacement is produced by a plurality of servo pistons 5 which are in turn controlled in stroke by a shift control valve 6. For that purpose, the shift control valve 6 has an input port 6a to which a line pressure is supplied, and output ports 6b, 6c connected to chambers on both sides of each servo piston 5, respectively. Additionally, the shift control valve 6 receives a speed ratio command from a pinion 7 driven by a stepper motor (not shown). An input sleeve valve body 8 is stroked in accordance with this command, so that a relative position thereof with respect to a feedback spool valve body 9 is changed from a balance position as indicated in FIG. 65. Thus, the shift control valve 6 supplies in response to a new speed ratio command a line pressure of the input port 6a from the one output port 6b to the corresponding side of each servo piston 5, and drains the opposite side thereof from the other output port 6c, putting the power roller 1 offset in the corresponding direction and with respect to the input and output toroidal disks 2, 3. Under such offset conditions, the power roller 1 changes the inclination by itself in the direction corresponding to the speed ratio command.

The displacement or offset to the slant rotation axis $O_2$ and slant rotation of the power roller 1 are transmitted, via the displacement to the slant rotation axis $O_2$ and rotation of a precess cam 10 connected to the power roller 1, to a link 11 which is in contact with a cam face 10a thereof, and are fed back to the feedback spool valve body 9 of the shift control valve 6 via rotation of the link 11 about a shaft 12. The link 11 is an L-shaped lever, and has one lever arm in contact with the cam face 10a of the precess cam 10, and the other lever arm abutting on the feedback spool valve body 9 via an adjust screw 13 engaged therewith. This feedback enables the feedback spool valve body 9 to follow the displacement of the input sleeve valve body 8 in response to the speed ratio command so as to regain the initial relative position with respect to the input sleeve valve body 8. Accordingly, as soon as the power roller 1 has the inclination corresponding to the speed ratio command, the shift control valve 6 puts at zero the offset of the power roller 1 via the servo pistons 5, preserving the inclination or speed ratio.

With such a shift control system for a continuously variable traction roller transmission, it is preferable that a response lag is small which is produced between receiving of the speed ratio modifier command and achievement of the corresponding inclination of the power roller 1, and that the speed ratio converges quickly on a speed ratio command value with small frequency of vibrations or hunting which is produced until the inclination of the power roller 1 or speed ratio settles to the command value during a transition period of modification of the speed ratio.

One of the factors affecting such shift control performances is the type of the shift control valve 6. When using an overlap type shift control valve, i.e., the shift control valve wherein valve port parts of the input sleeve valve body 8 and the feedback spool valve body 9 overlap or engage each other in a balance state thereof after completion of the shift, relatively frequent hunting is produced. On the other hand, when using an underlap type shift control valve, i.e., the shift control valve wherein the valve port parts of the two valve bodies 8, 9 do not engage each other to keep valve ports open even in the balance state thereof, the response lag is larger, so that the shift control is practically difficult to carry out.

On the other hand, referring to FIG. 65, there is a just lap type shift control valve, i.e., the shift control valve wherein the valve port parts of the two valve bodies 8, 9 just close the valve ports in the balance state thereof. However, although not as considerable as compared with the underlap type shift control valve, the just lap type shift control valve is not free from a constant leakage of hydraulic fluid out of the valve ports even in the balance state of the shift control valve, thereby enlarging energy loss of an engine for driving an oil pump.

It is, therefore, an object of the present invention to provide a shift control system for a continuously variable traction roller transmission including an overlap type shift control valve which is free from not only the problem of hunting, but also response lag.

SUMMARY OF THE INVENTION

There is provided, according to the present invention, a continuously variable traction roller transmission, the transmission being shiftable in a speed ratio in response to a command thereof, comprising:

input and output toroidal disks having an axis;

a power roller interposed between said input and output toroidal disks to be rotatable with an inclination, said power roller having an axis;

a shift control valve disposed to be responsive to the command, said shift control valve having valve bodies and inflow and outflow ports having an opening area; and a plurality of servo pistons fluidly connected to said shift control valve, said plurality of servo pistons moving said power roller to be offset from a position wherein said axis of said power roller intersects said axis of said input and output toroidal disks so as to direct the speed ratio to a value of the command, said plurality of servo pistons feedbacking movement and offset of said power roller to said shift control valve so as to hold said power roller to fail to be offset from said position when said inclination of said power roller corresponds to said value of the command, wherein when a dimensionless parameter R is given by:

$$R = \sqrt{\rho} \cdot A_1 \cdot \sqrt{C_r} / \sqrt{P} \cdot A_2$$

$\rho$: specific gravity (kg/cm$^3$) of hydrualic fluid,
$A_1$: total pressure area (cm$^2$) of said plurality of servo pistons.
$C_r$: radial clearance (cm) between said valve bodies of said shift control valve at the overlap portion thereof,
P: input pressure (kg/cm$^2$) to said shift control valve,
$A_2$: average (cm$^2$) of variations of said opening areas of said inflow and outflow ports for 0.1 mm of a relative displacement between said valve bodies of said shift control valve with respect to a balance state thereof,
the feedback to said shift control valve is carried out so that a ratio b/a of a variation "b" mm of a feedback amount to said shift control valve for 1 mm of a displacement of said power roller to a variation "a" mm of said feedback amount to said shift control valve for 1 degree of said inclination of said power roller is in a range given by:

$$1.74R^{4/5} - 3.90 \leq b/a \leq 3.09R^{5/9} + 30.51.$$

DETAILED DESCRIPTION OF THE INVENTION

Figure 1:
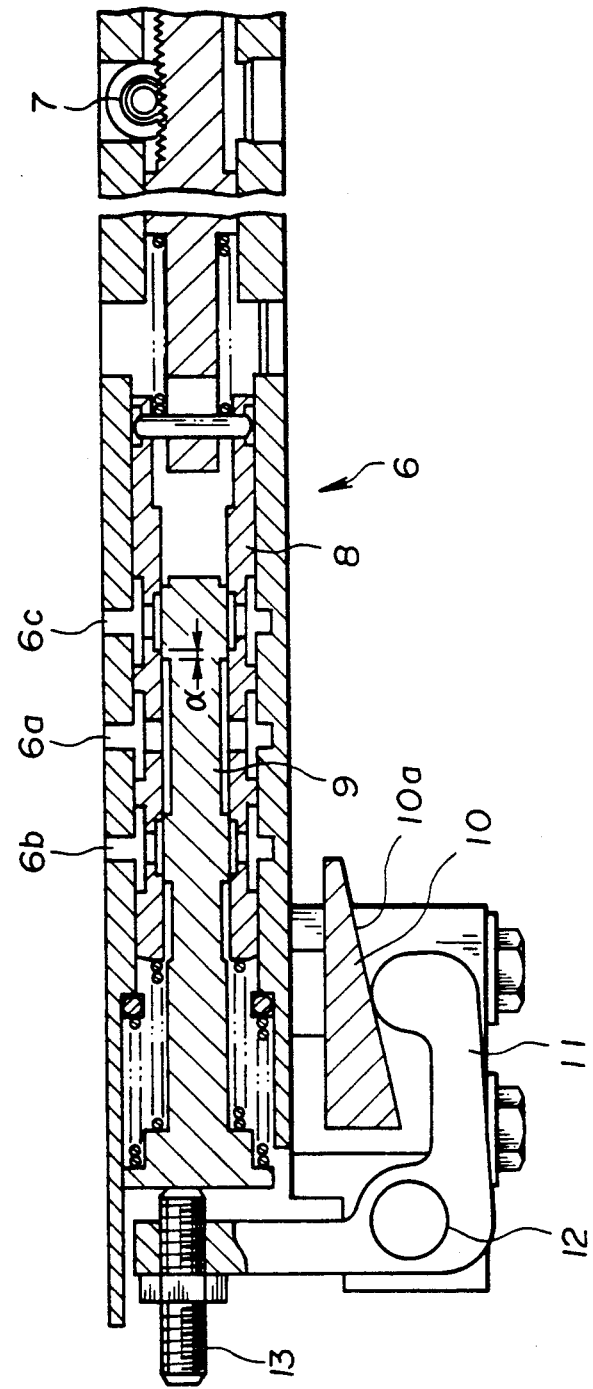
FIG. 1 is a sectional view showing a shift control valve for a continuously variable traction roller transmission to which the present invention is applied.
Figure 2:
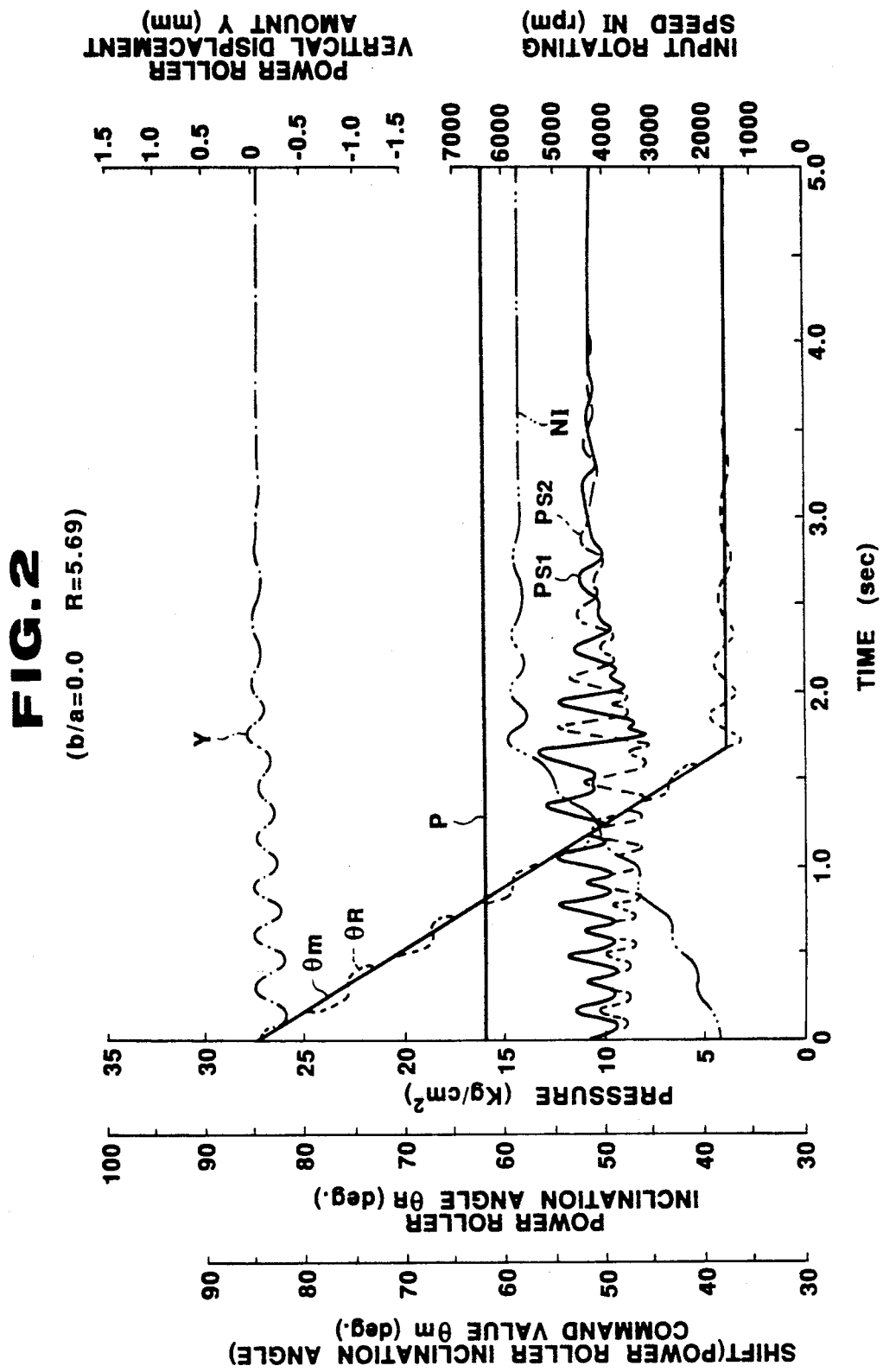
FIG. 2 is a time chart of shift operation showing a 1st test result.
Figure 3:
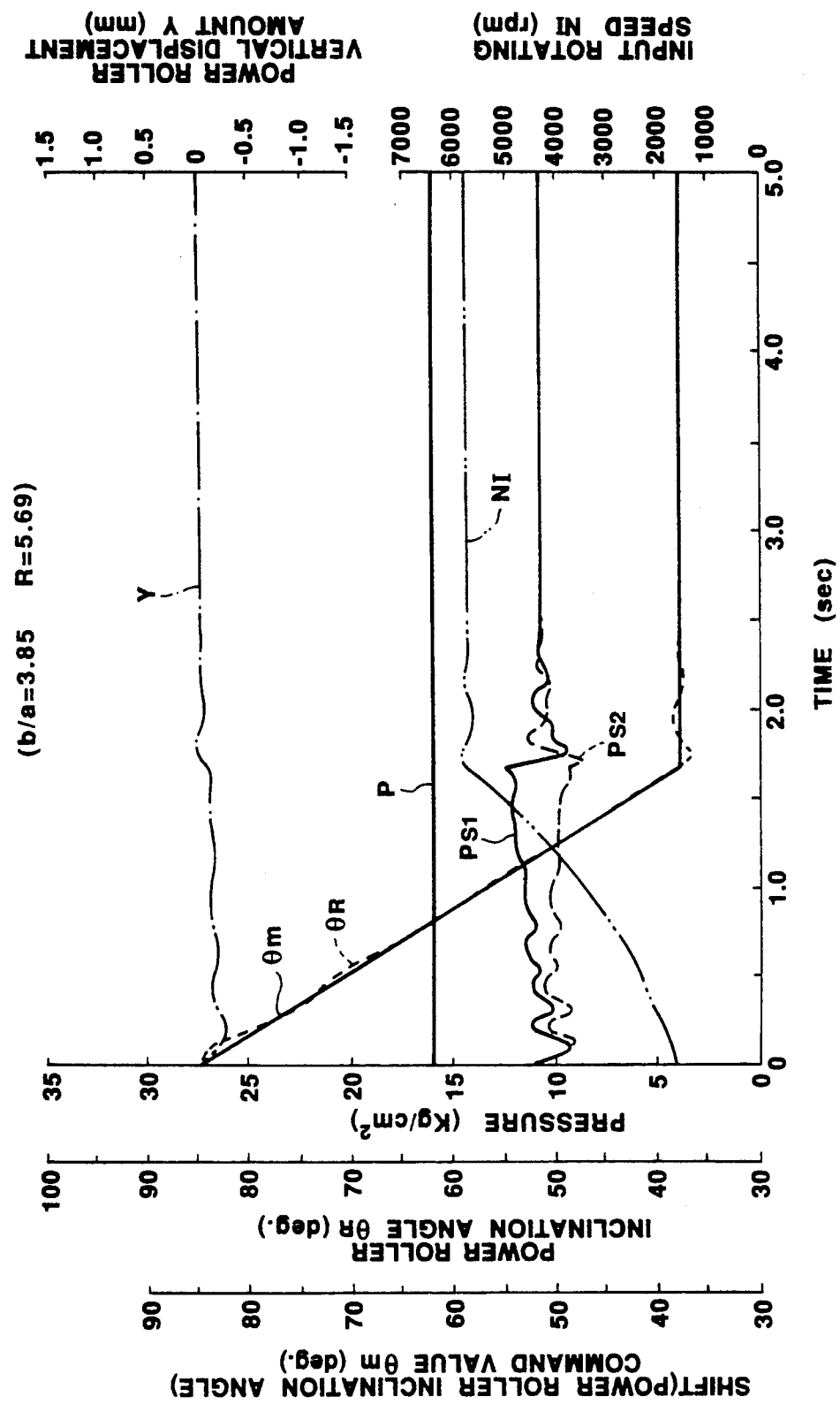
FIG. 3 is a view similar to FIG. 2, showing a 2nd test result.
Figure 4:
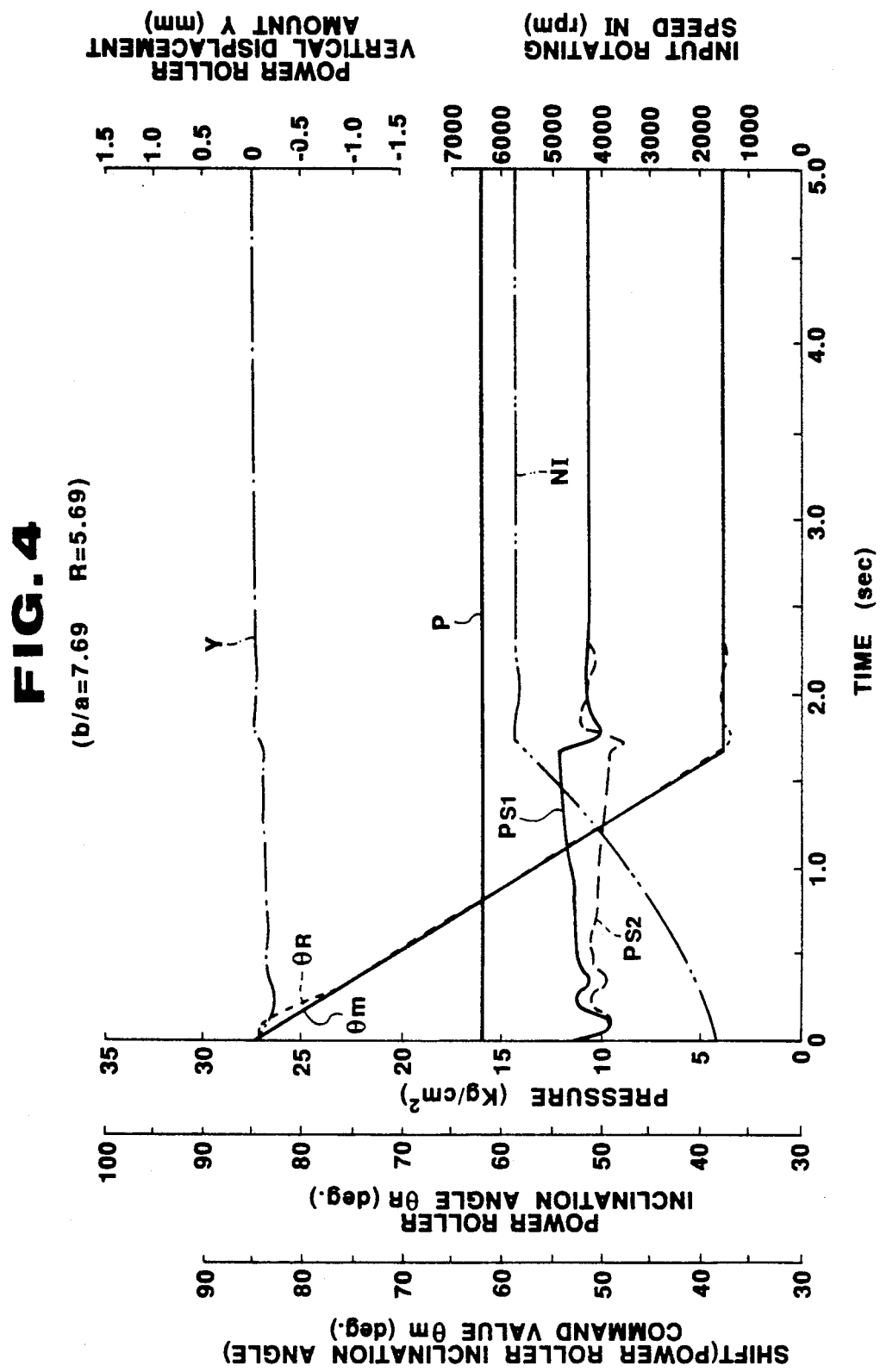
FIG. 4 is a view similar to FIG. 3, showing a 3rd test result.
Figure 5:
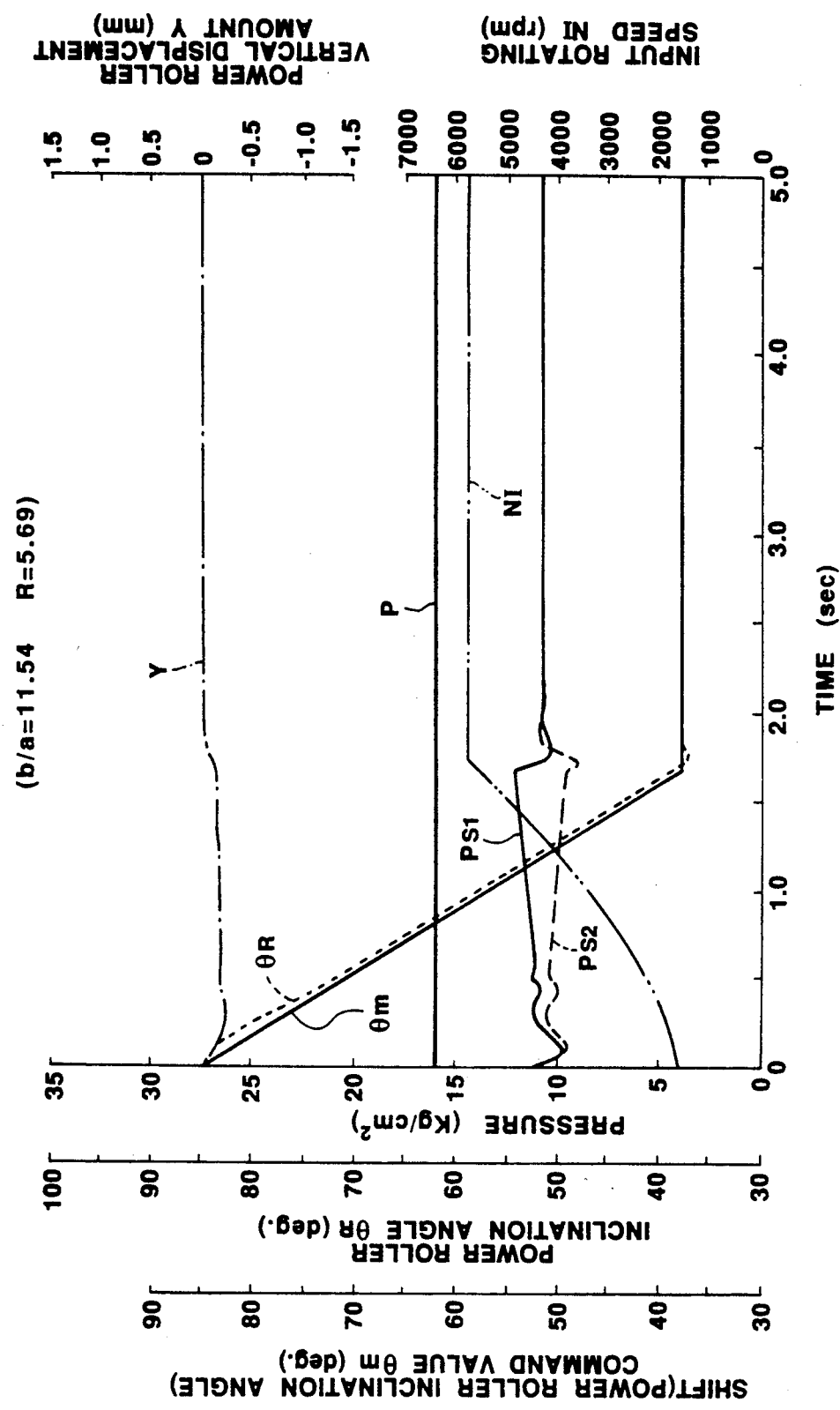
FIG. 5 is a view similar to FIG. 4, showing a 4th test result.
Figure 6:
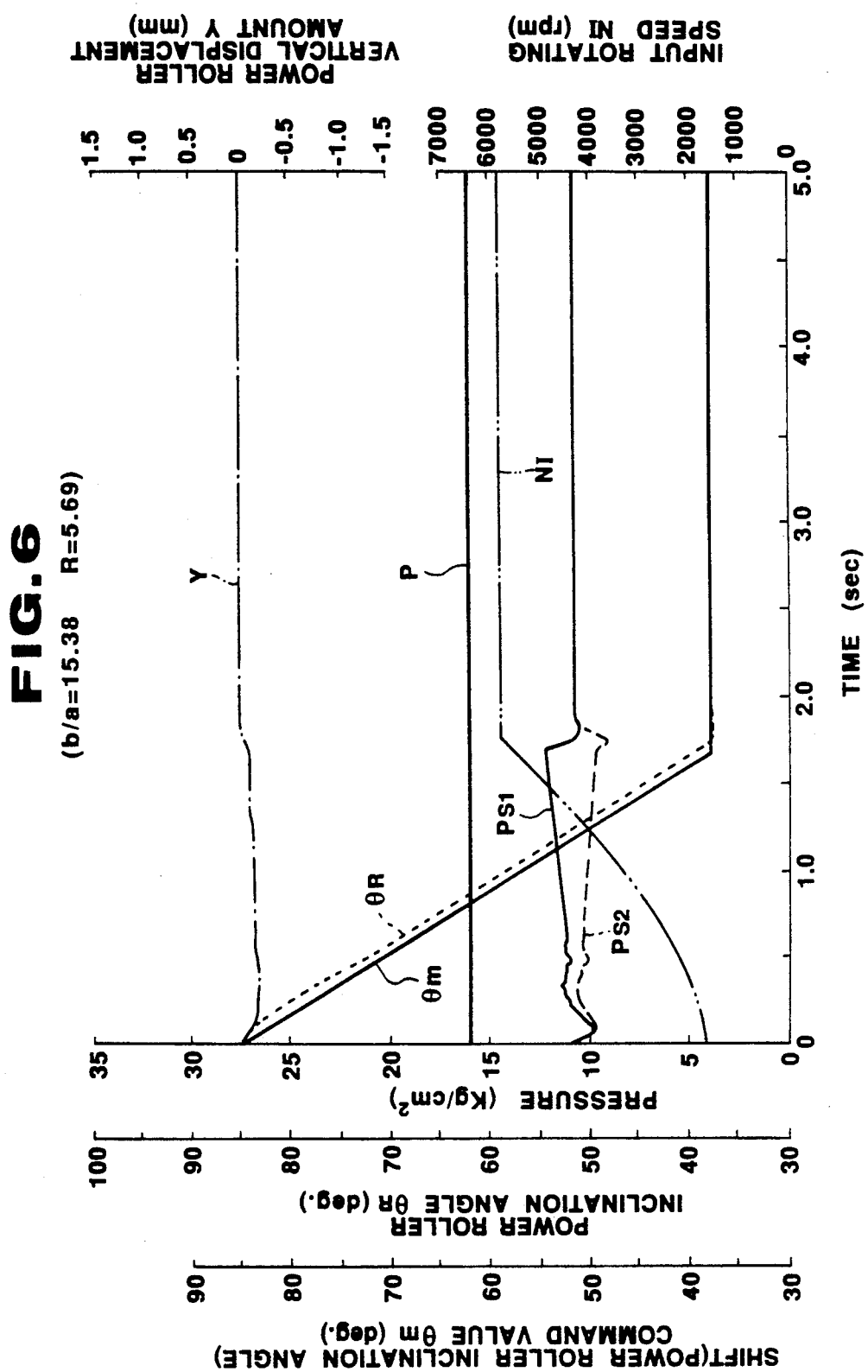
FIG. 6 is a view similar to FIG. 5, showing a 5th test result.
Figure 7:
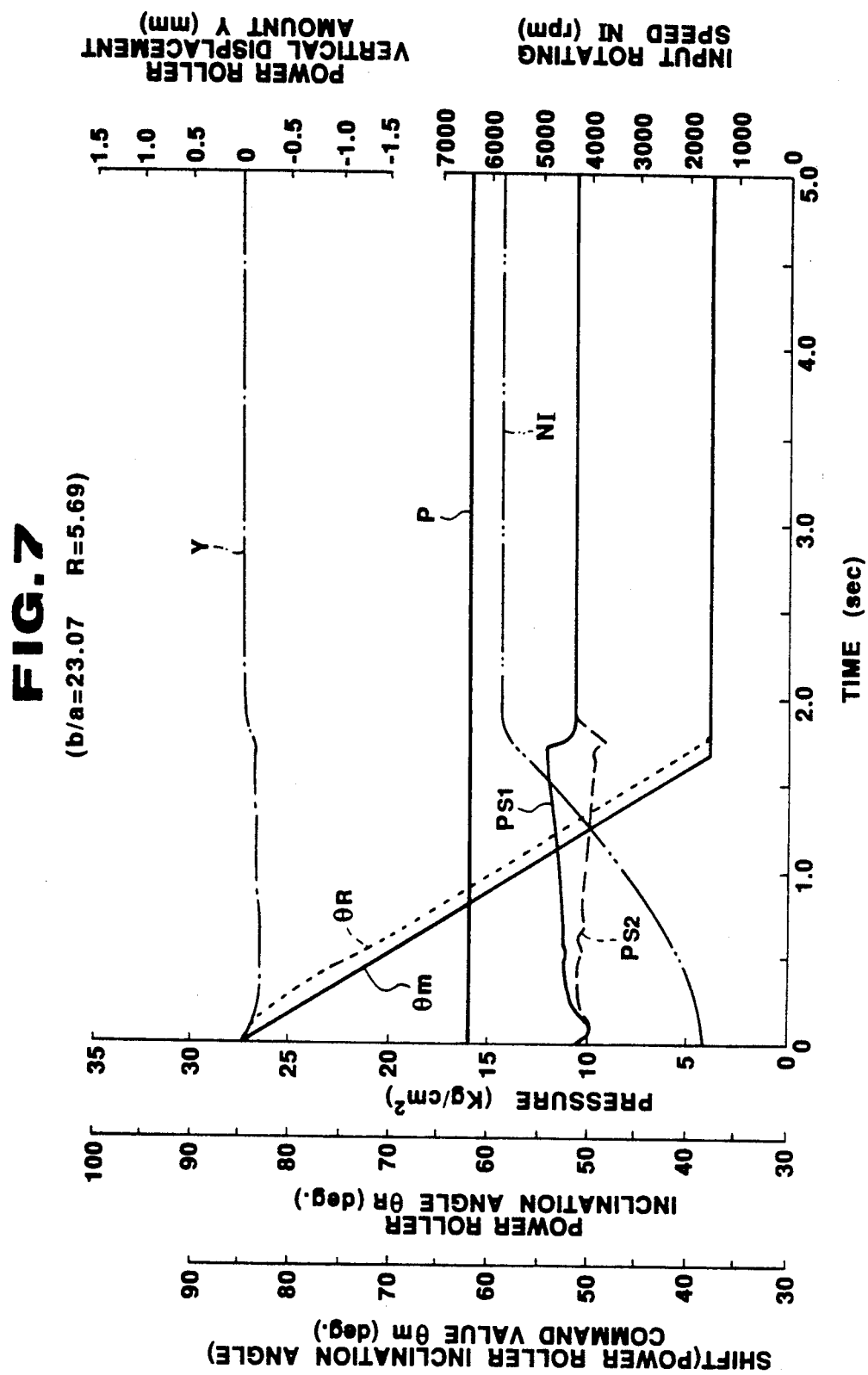
FIG. 7 is a view similar to FIG. 6, showing a 6th test result.
Figure 8:
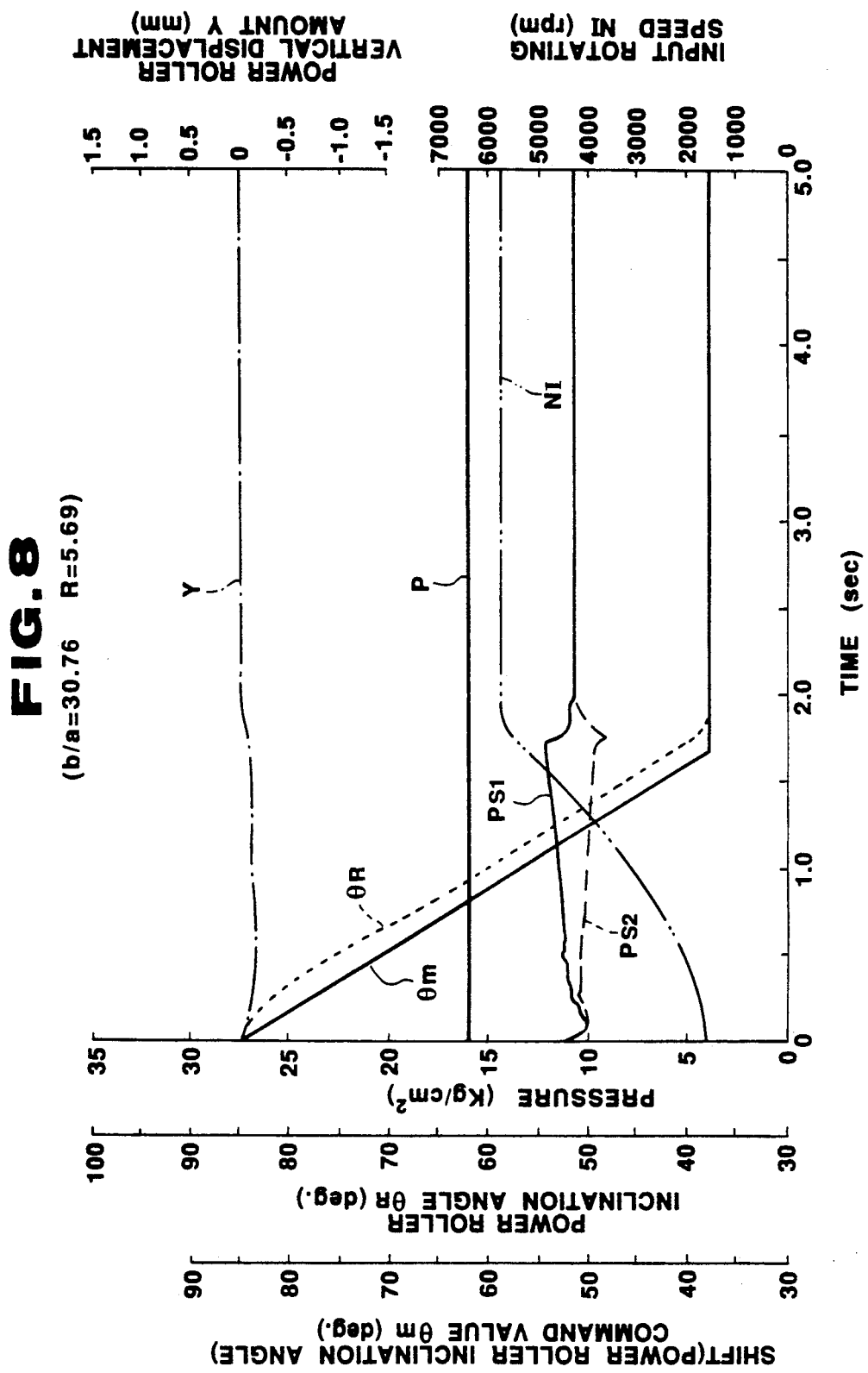
FIG. 8 is a view similar to FIG. 7, showing a 7th test result.
Figure 9:
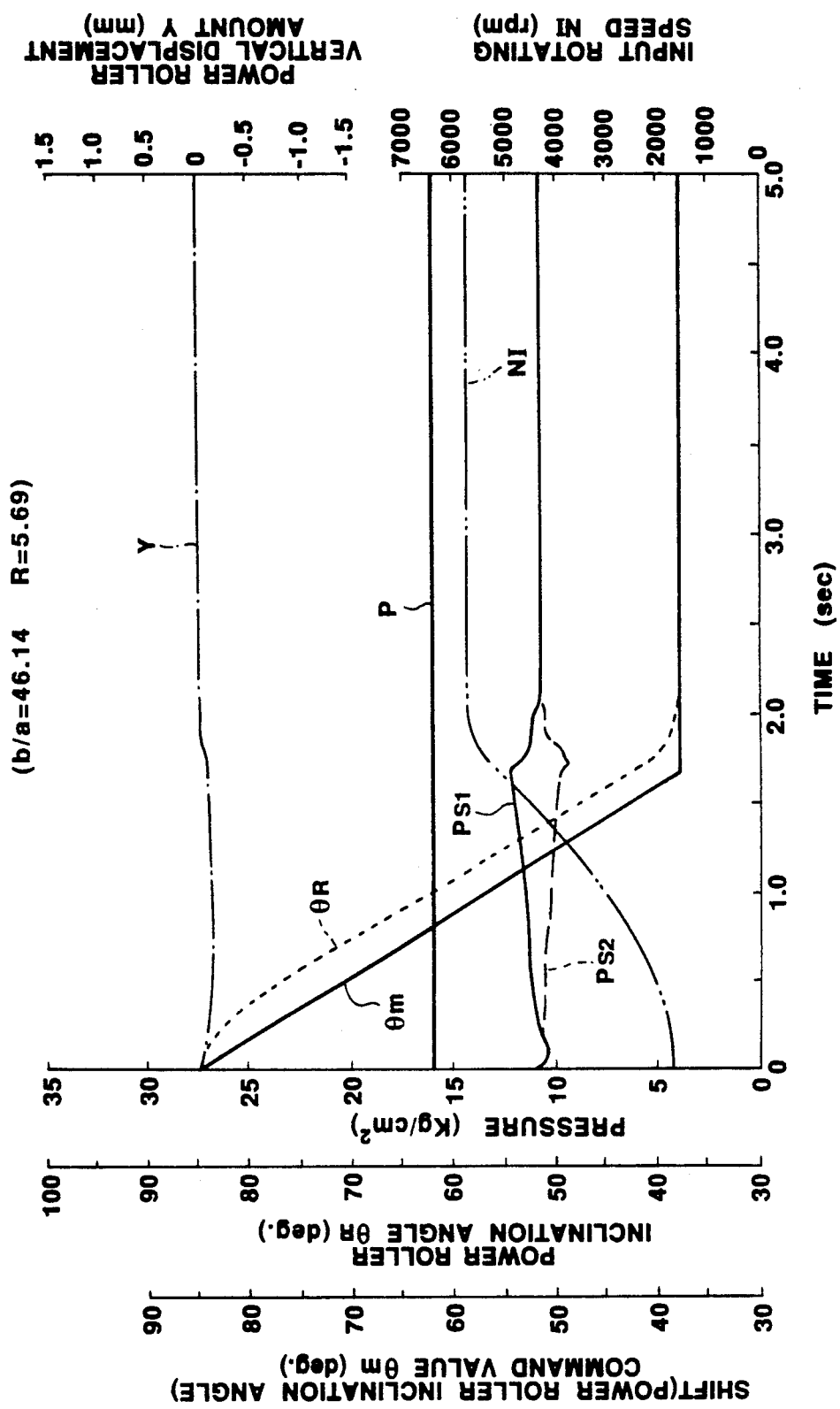
FIG. 9 is a view similar to FIG. 8, showing an 8th test result.
Figure 10:
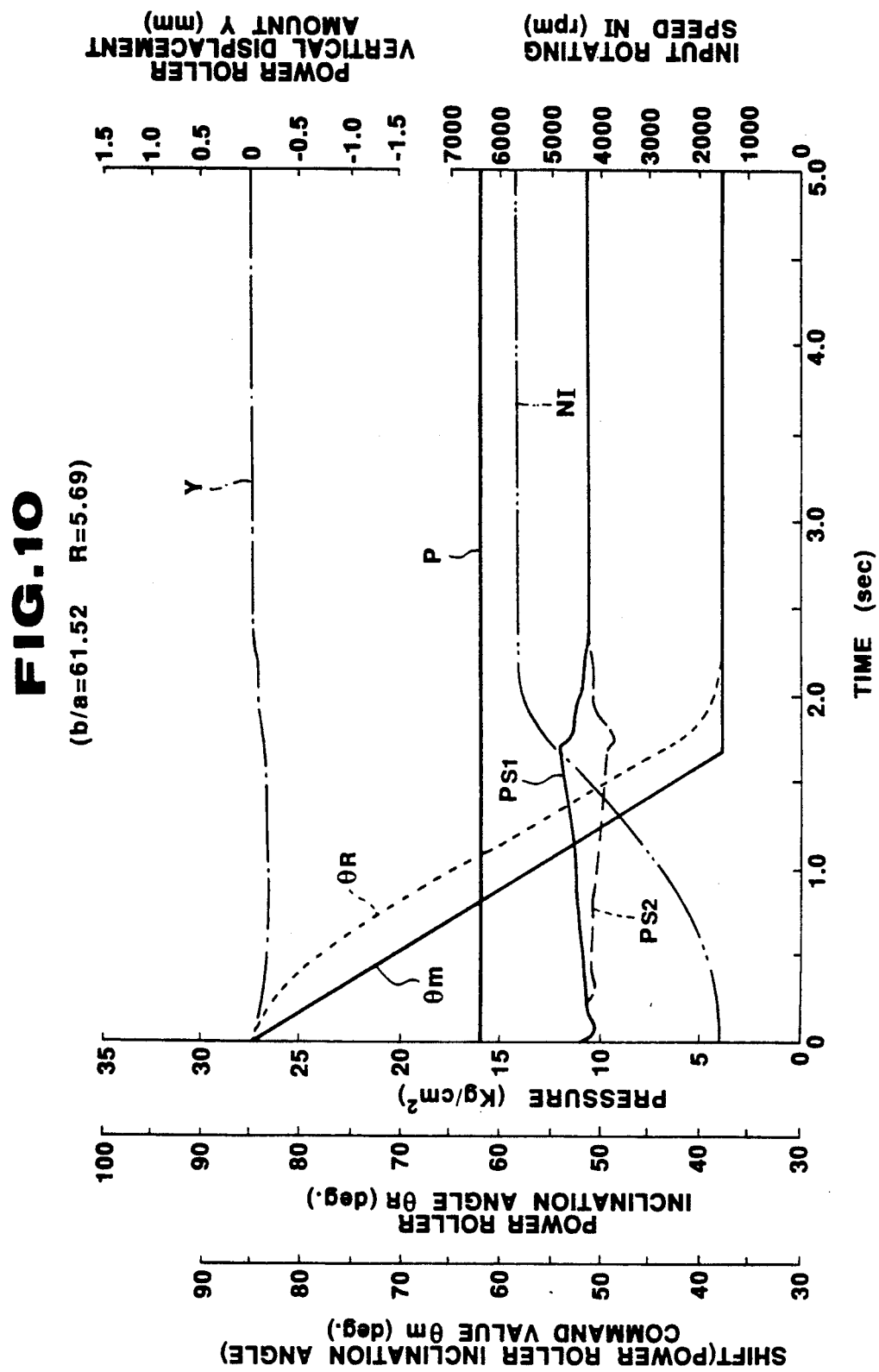
FIG. 10 is a view similar to FIG. 9, showing a 9th test result.
Figure 11:
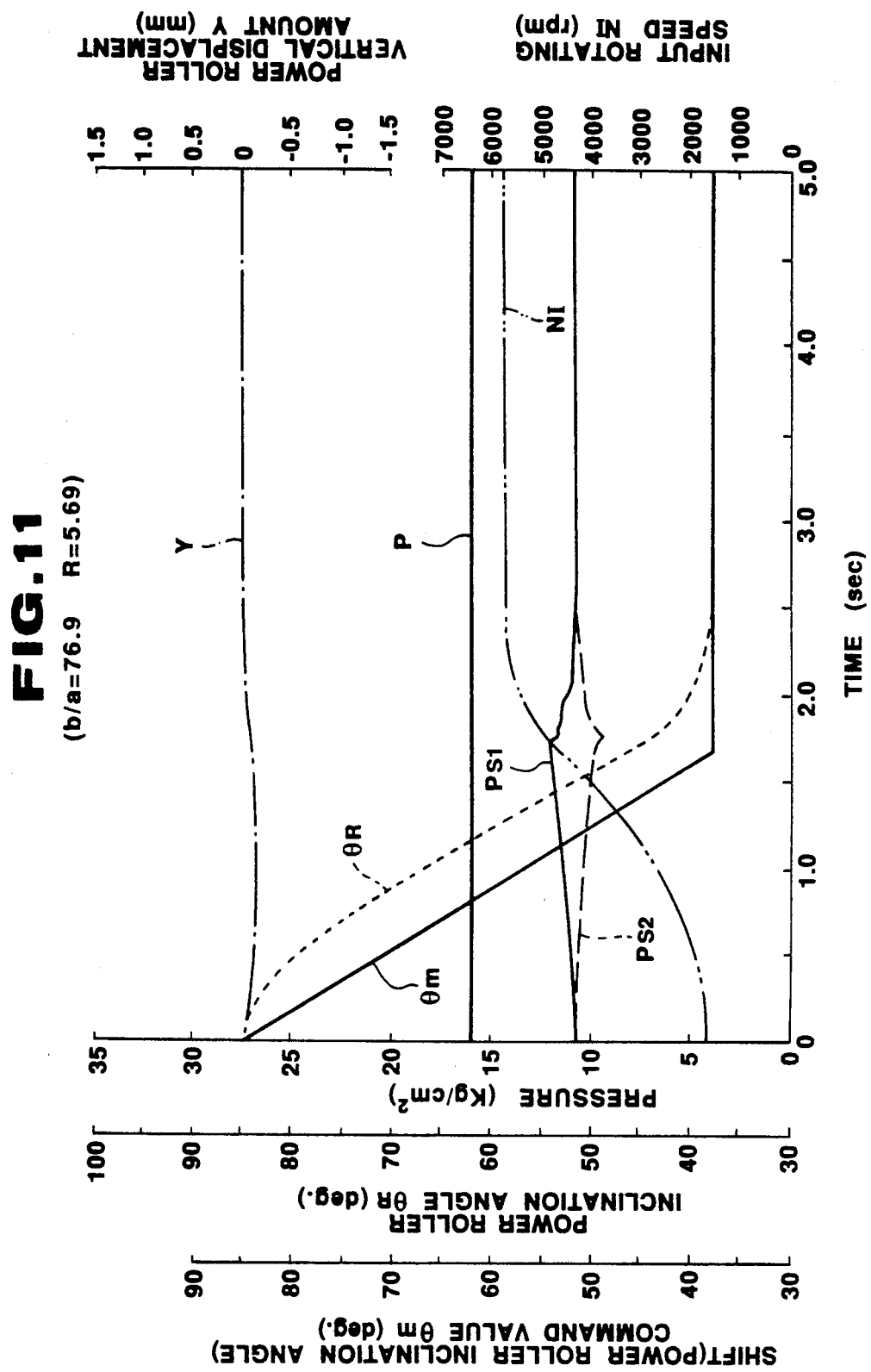
FIG. 11 is a view similar to FIG. 10, showing a 10th test result.
Figure 12:
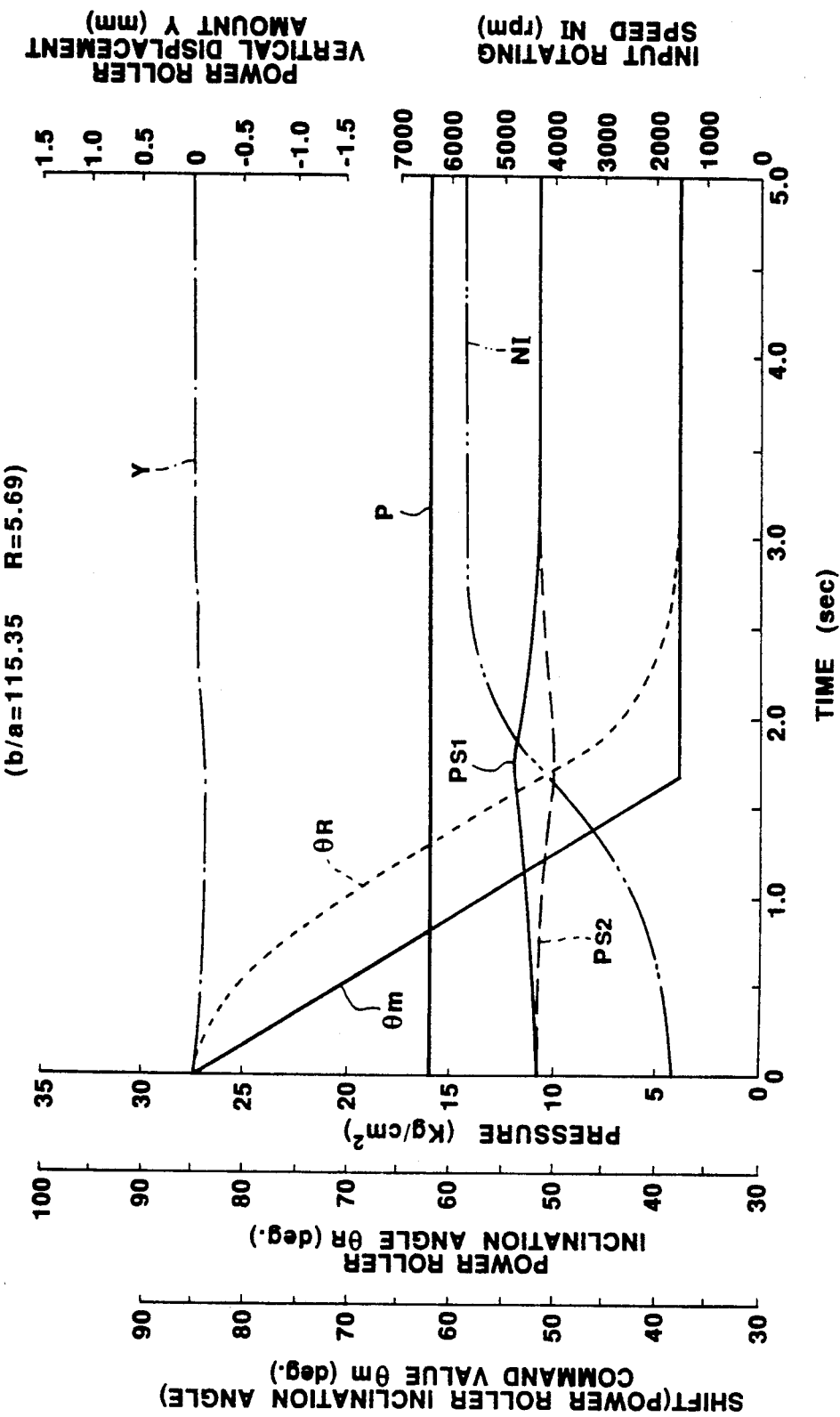
FIG. 12 is a view similar to FIG. 11, showing an 11th test result.
Figure 13:
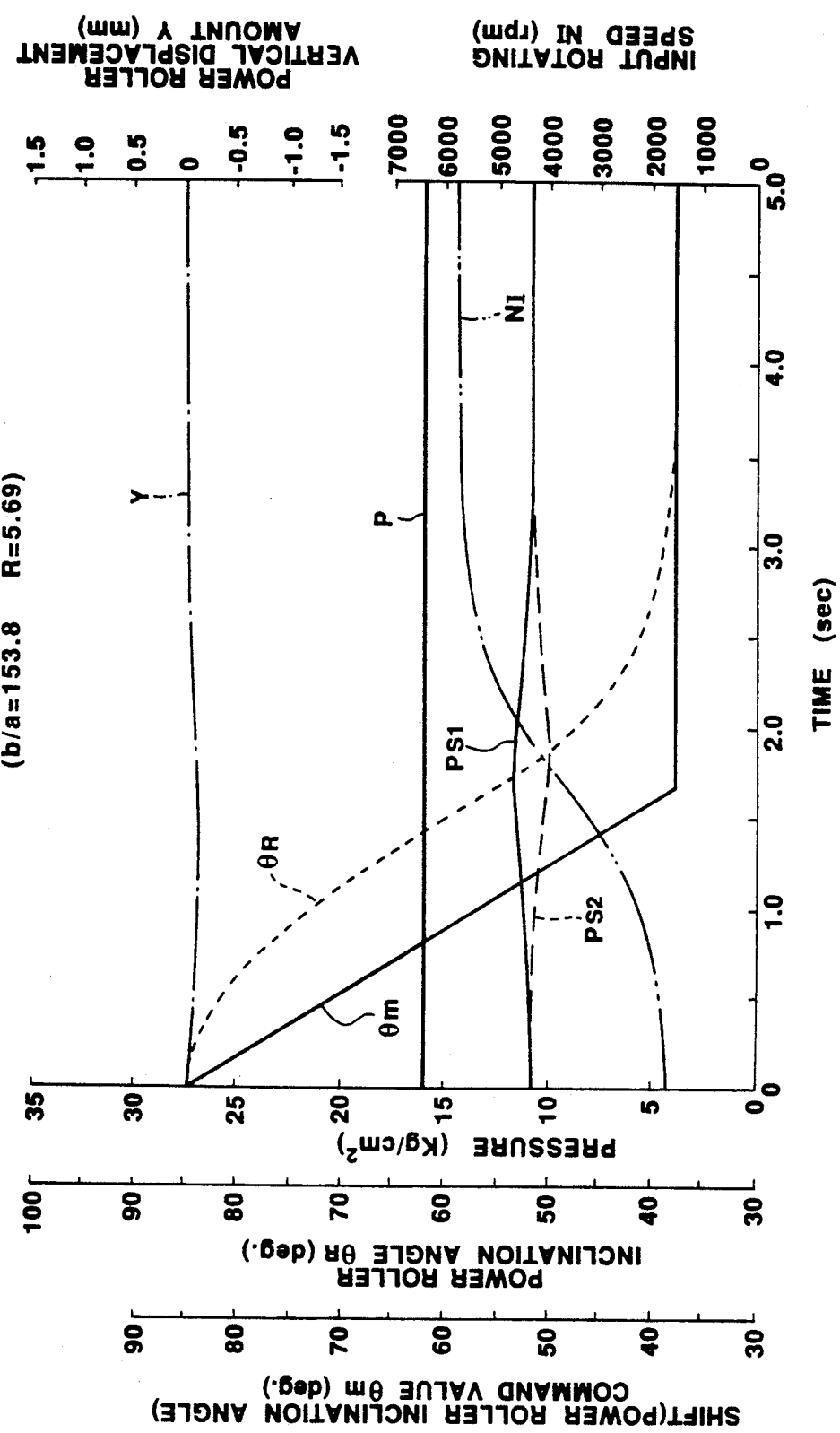
FIG. 13 is a view similar to FIG. 12, showing a 12th test result.
Figure 14:
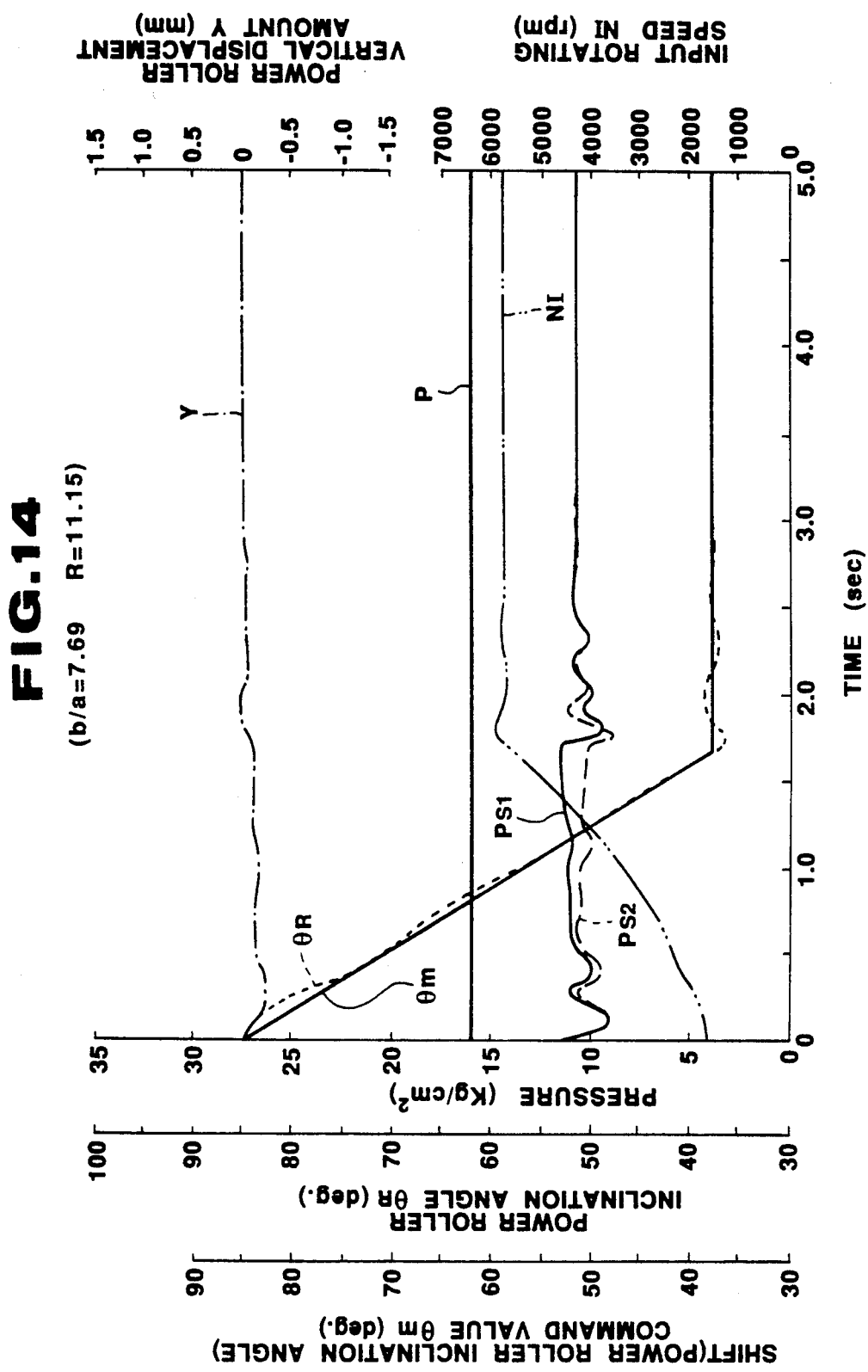
FIG. 14 is a view similar to FIG. 13, showing a 13th test result.
Figure 15:
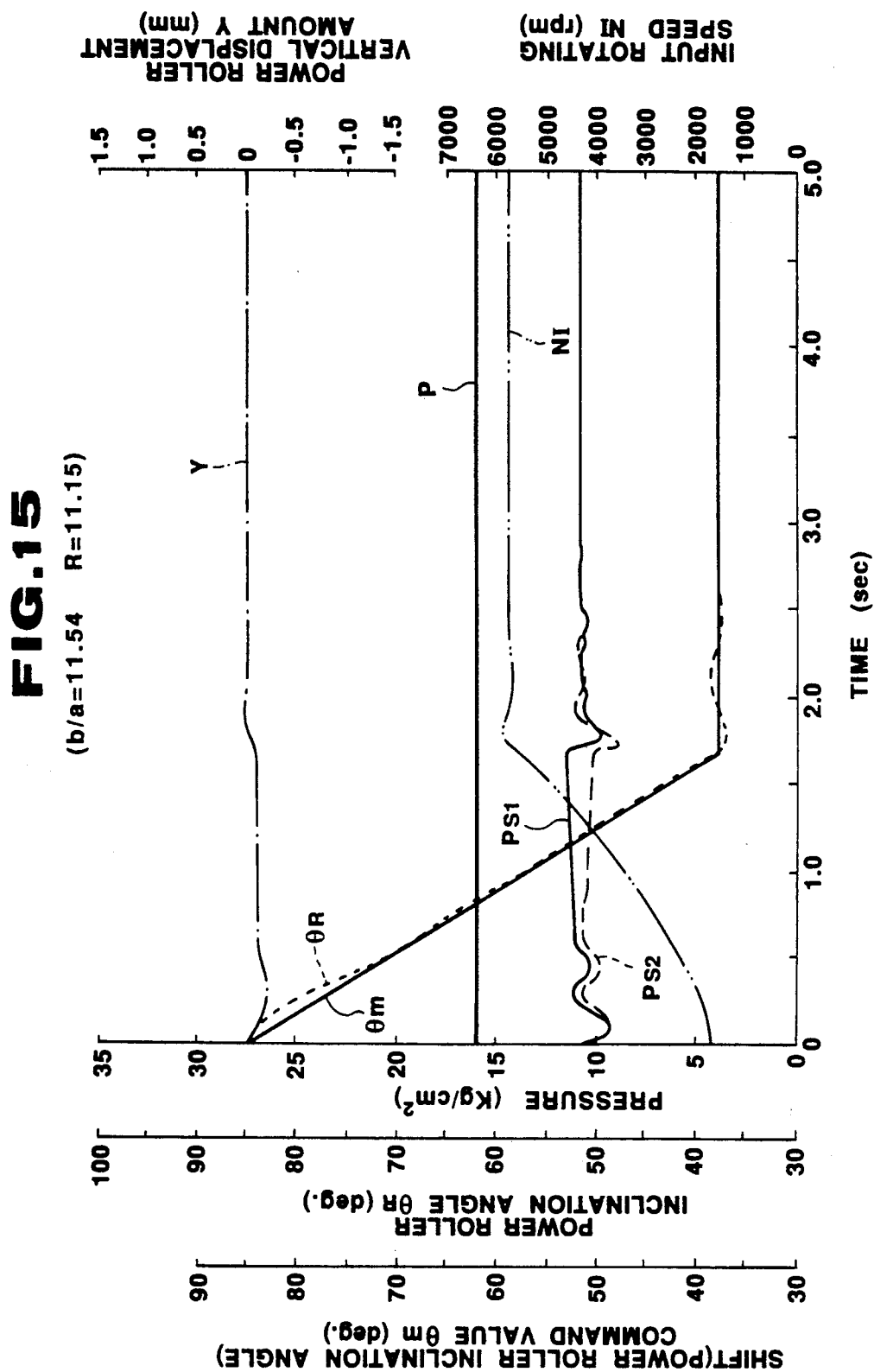
FIG. 15 is a view similar to FIG. 14, showing a 14th test result.
Figure 16:
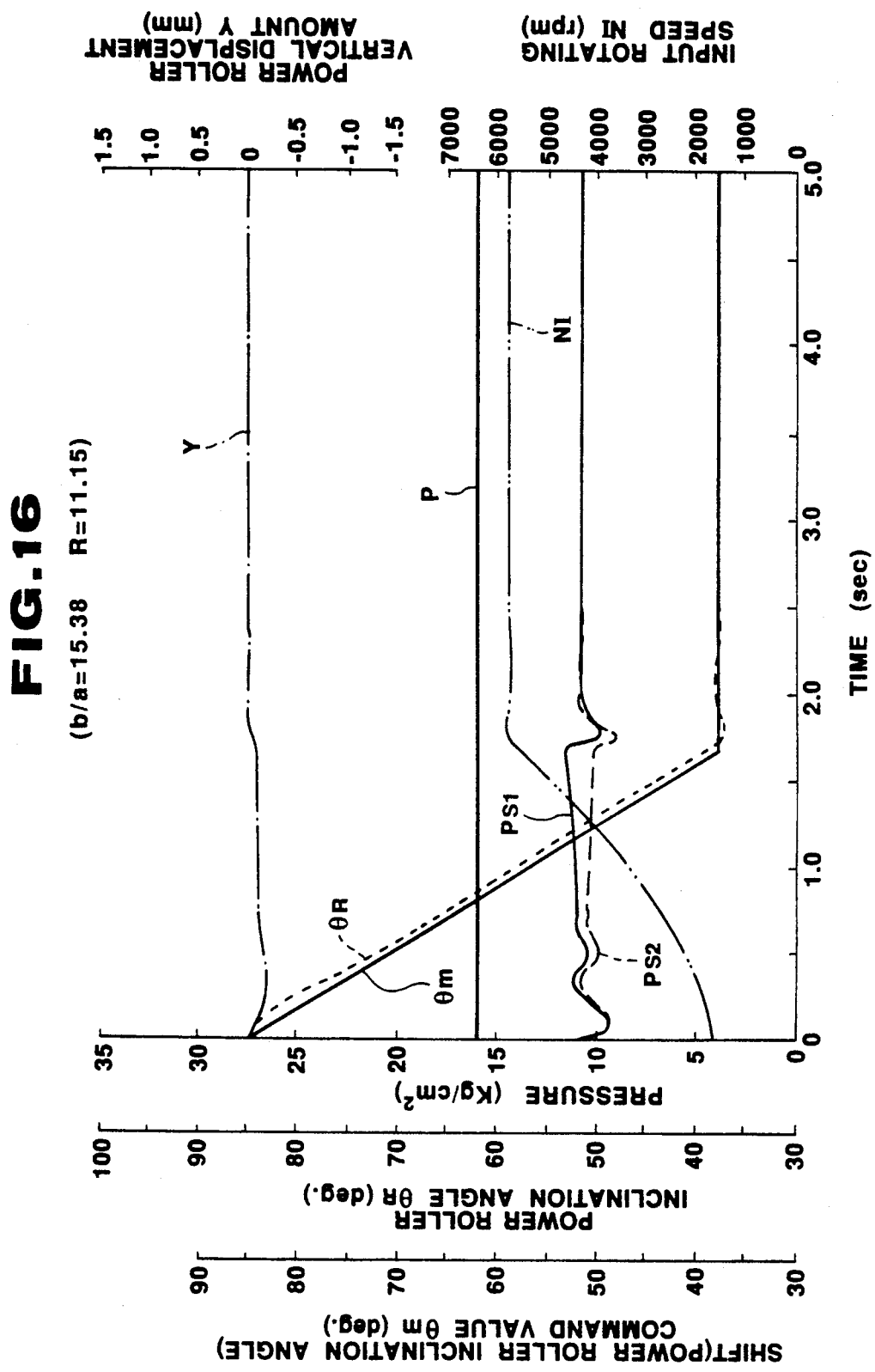
FIG. 16 is a view similar to FIG. 15, showing a 15th test result.
Figure 17:
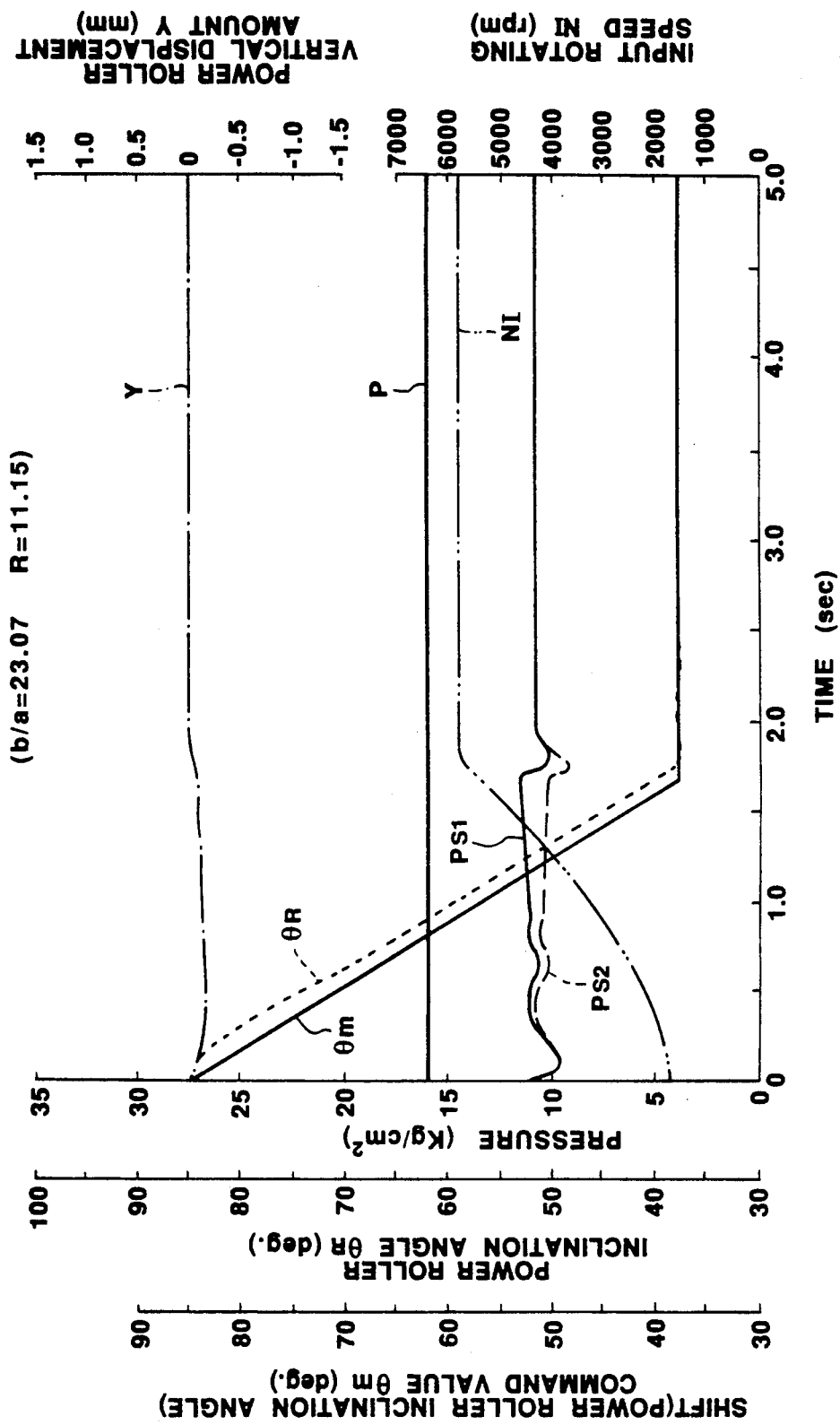
FIG. 17 is a view similar to FIG. 16, showing a 16th test result.
Figure 18:
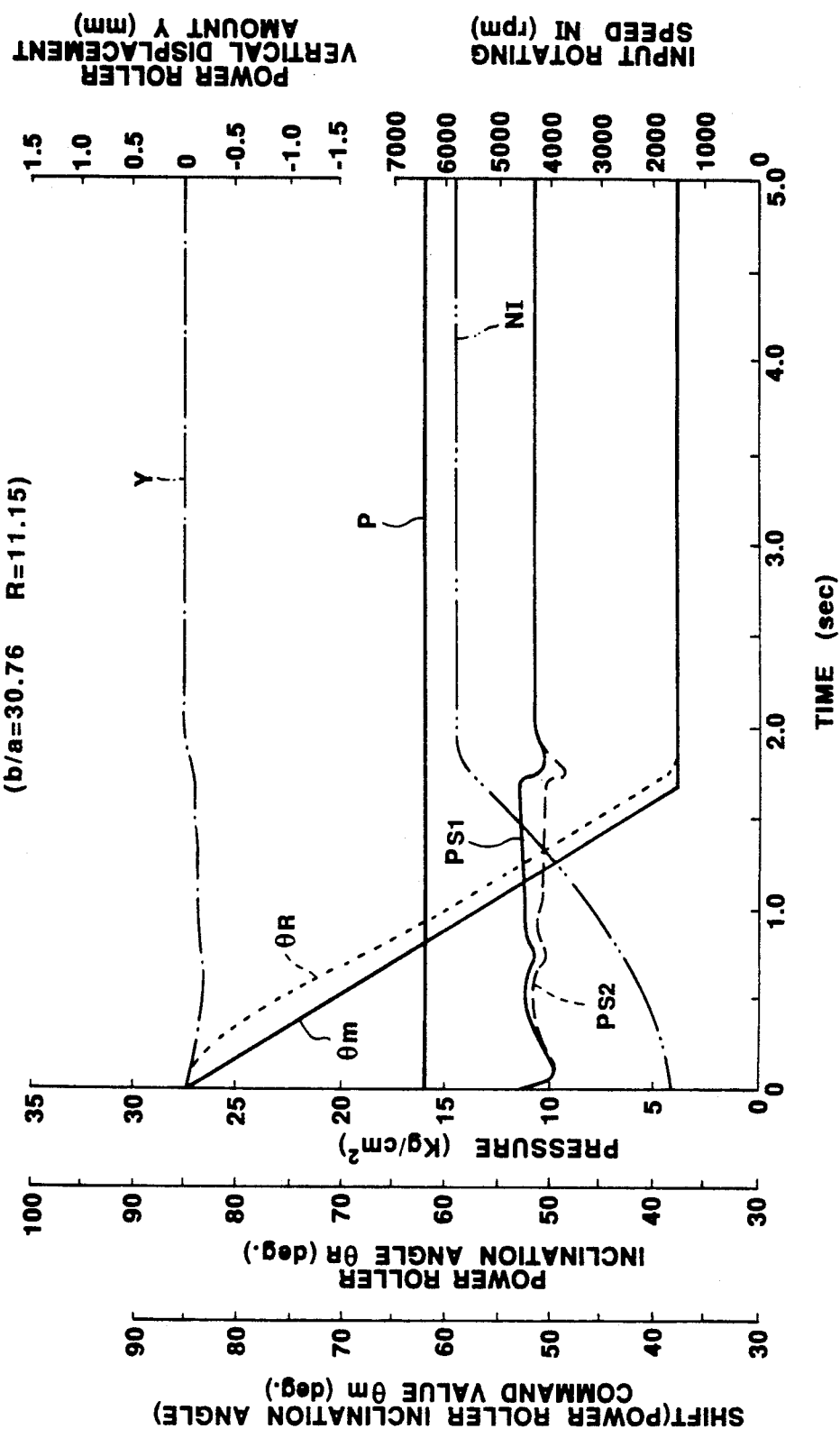
FIG. 18 is a view similar to FIG. 17, showing a 17th test result.
Figure 19:
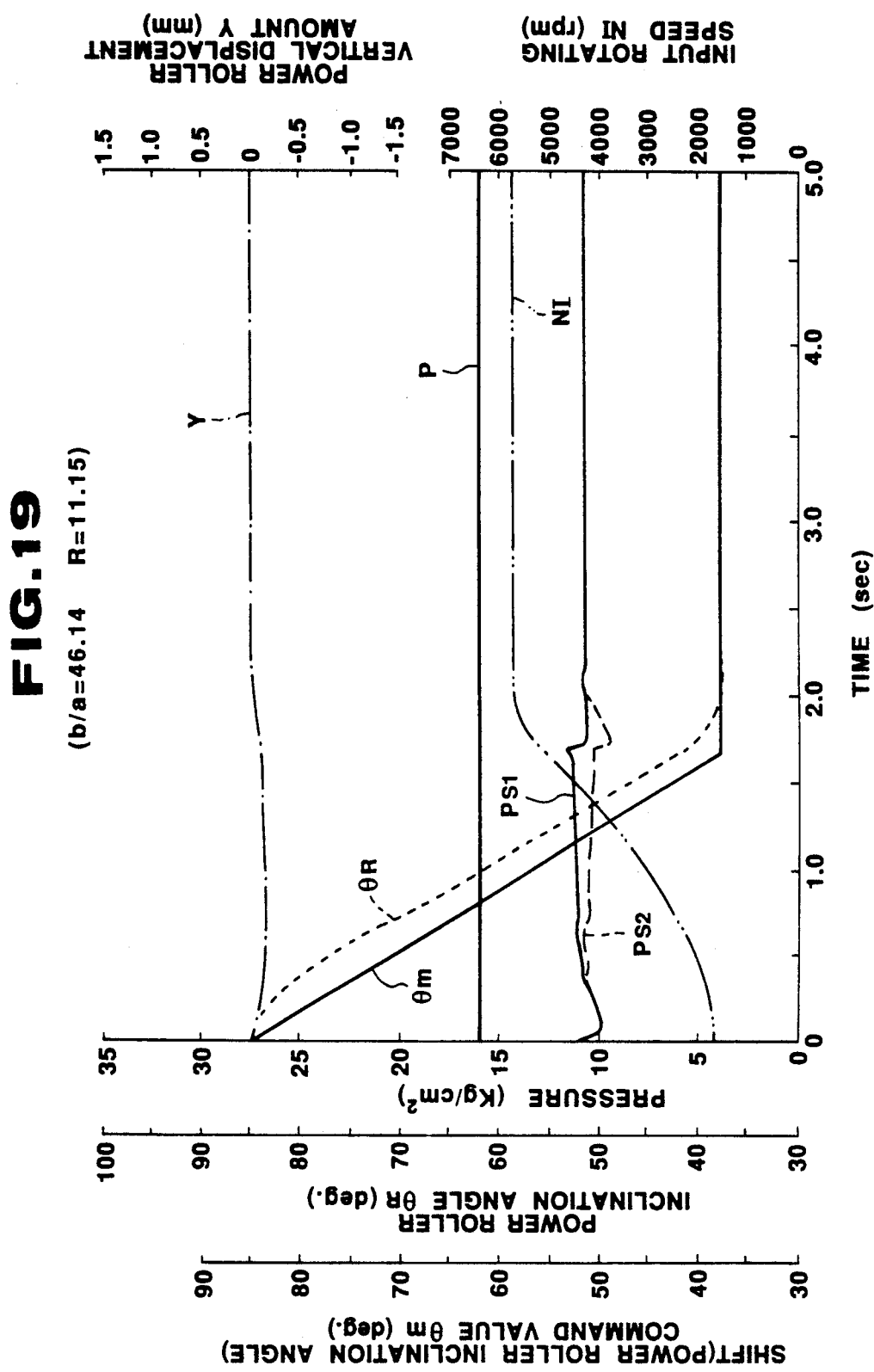
FIG. 19 is a view similar to FIG. 18, showing an 18th test result.
Figure 20:
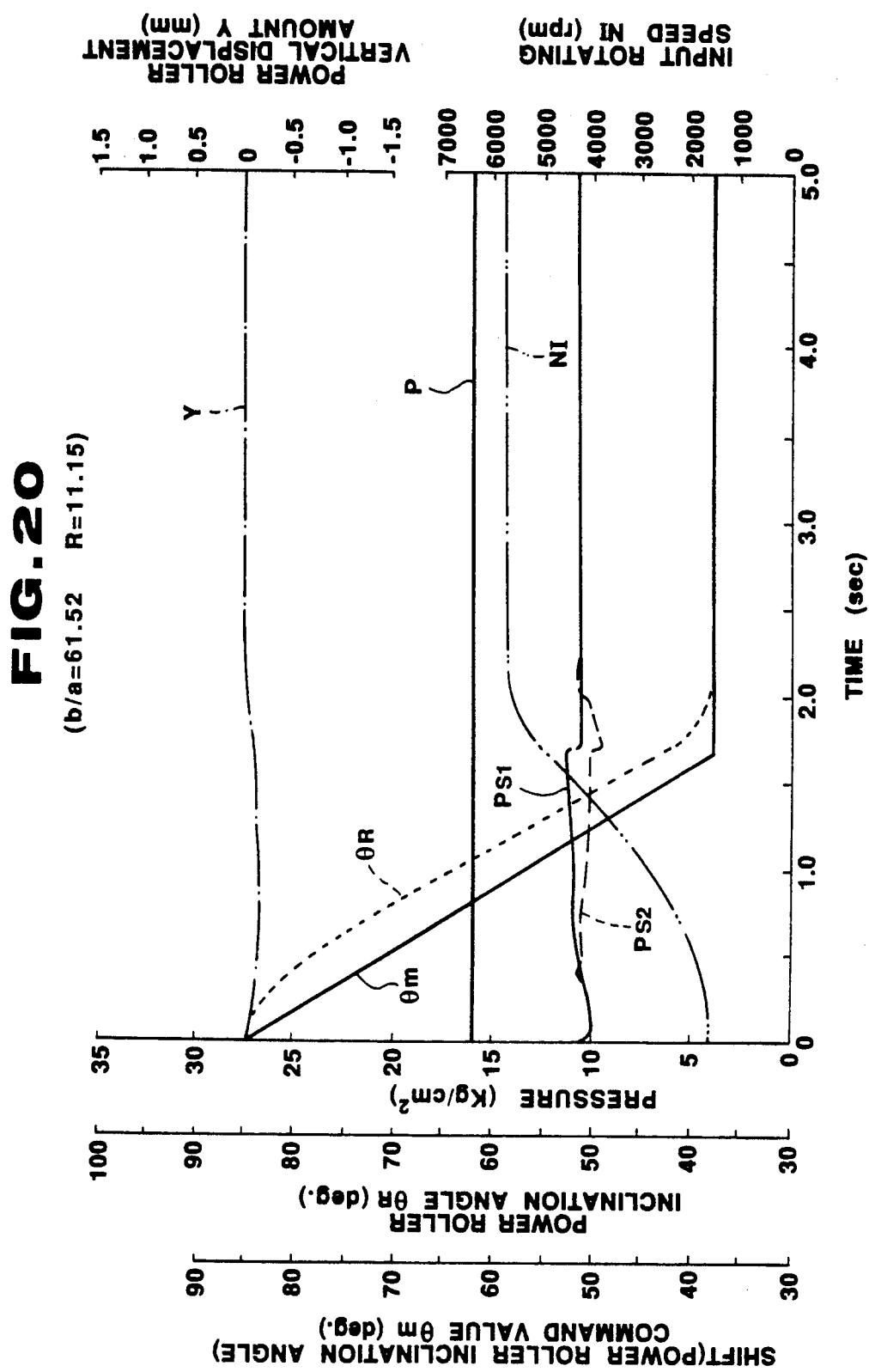
FIG. 20 is a view similar to FIG. 19, showing a 19th test result.
Figure 21:
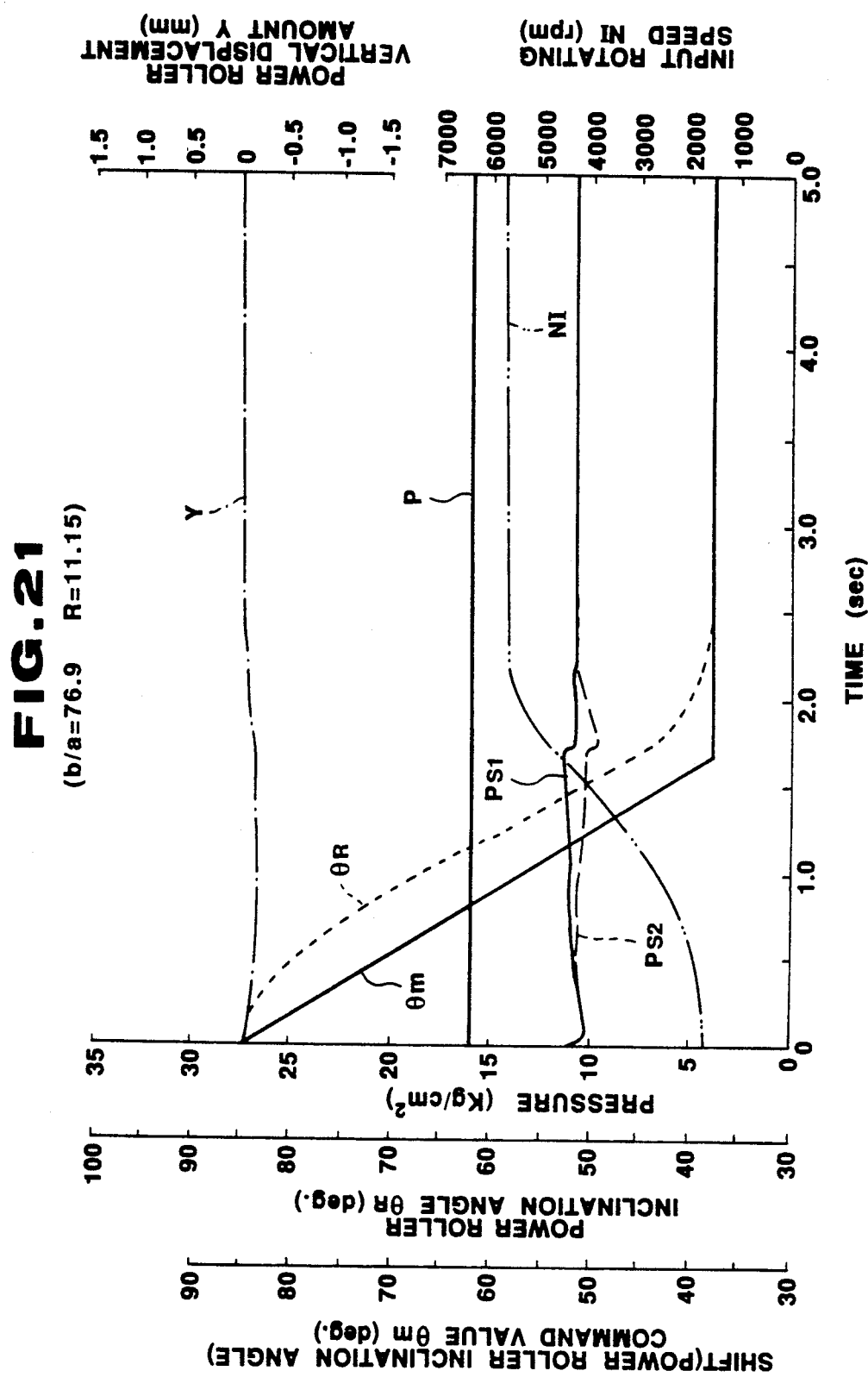
FIG. 21 is a view similar to FIG. 20, showing a 20th test result.
Figure 22:
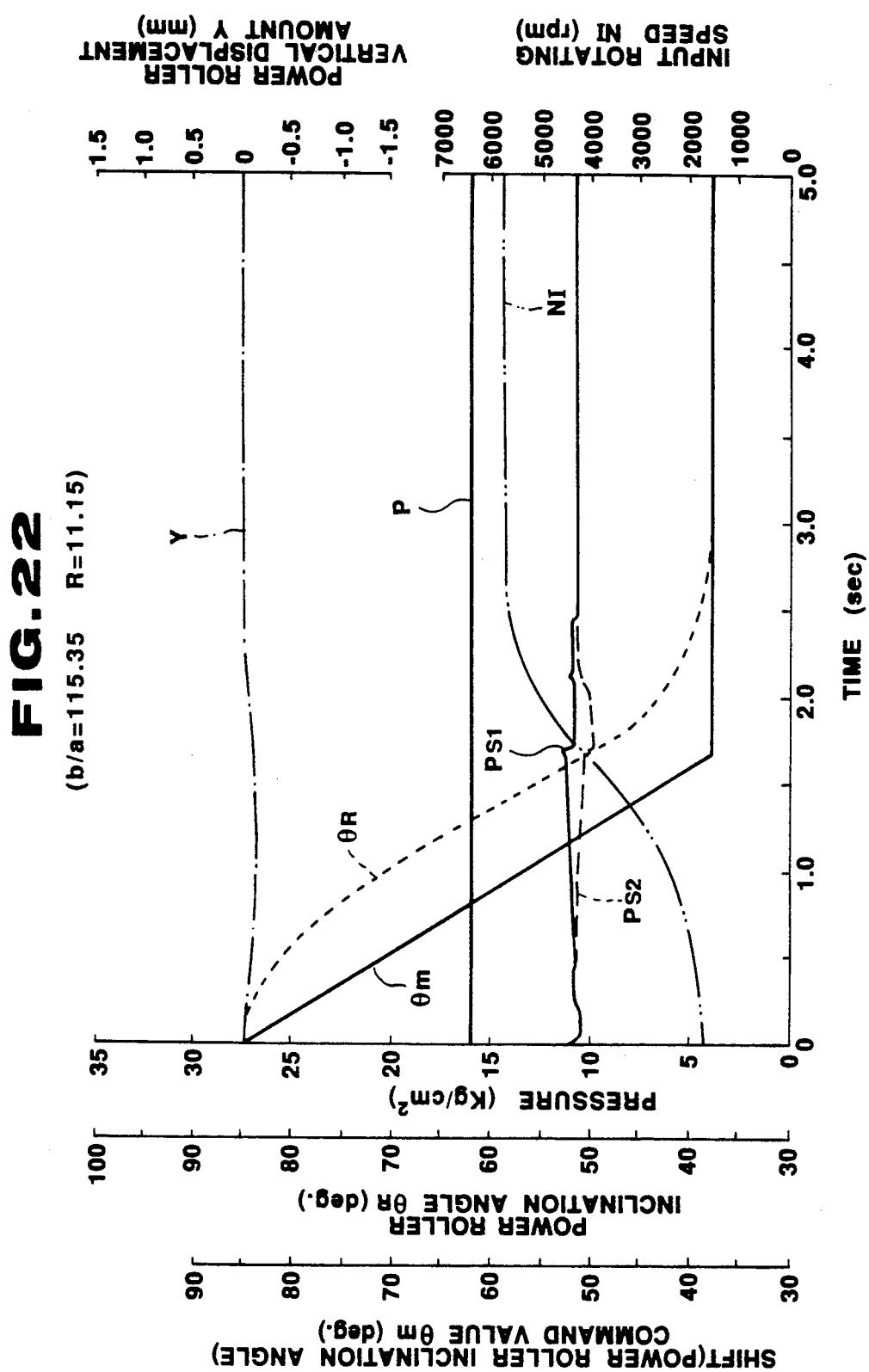
FIG. 22 is a view similar to FIG. 21, showing a 21st test result.
Figure 23:
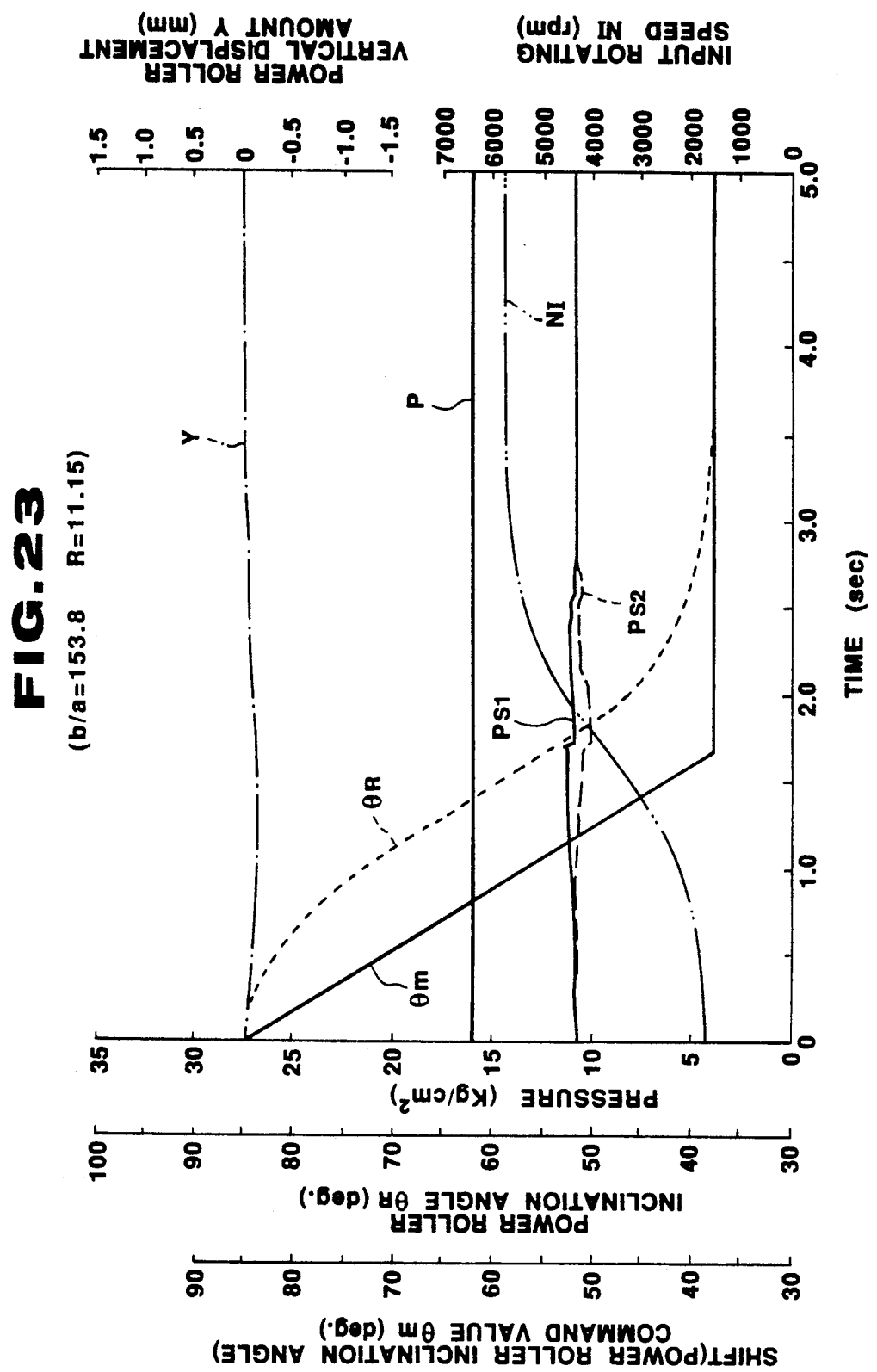
FIG. 23 is a view similar to FIG. 22, showing a 22nd test result.
Figure 24:
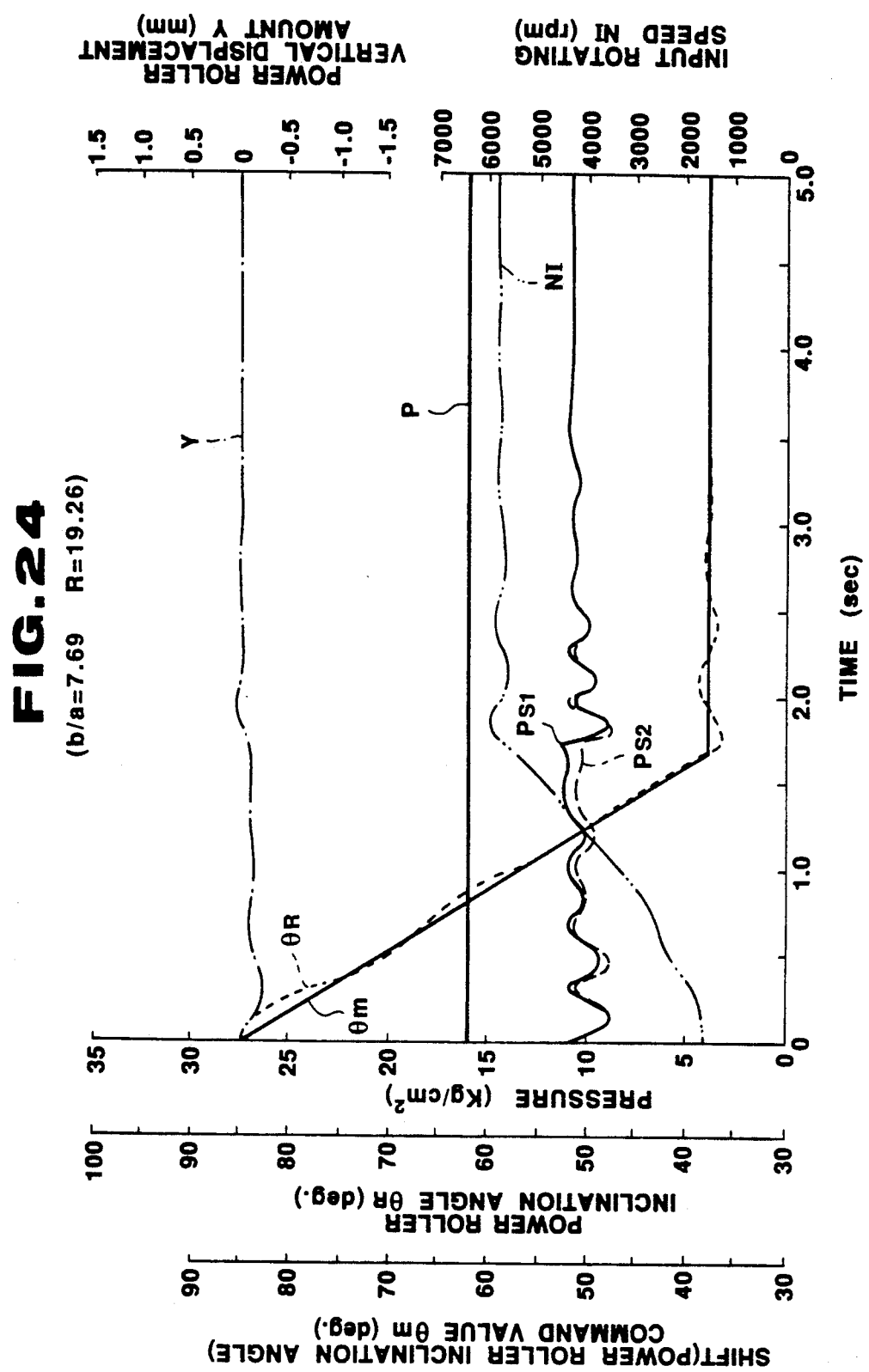
FIG. 24 is a view similar to FIG. 23, showing a 23rd test result.
Figure 25:
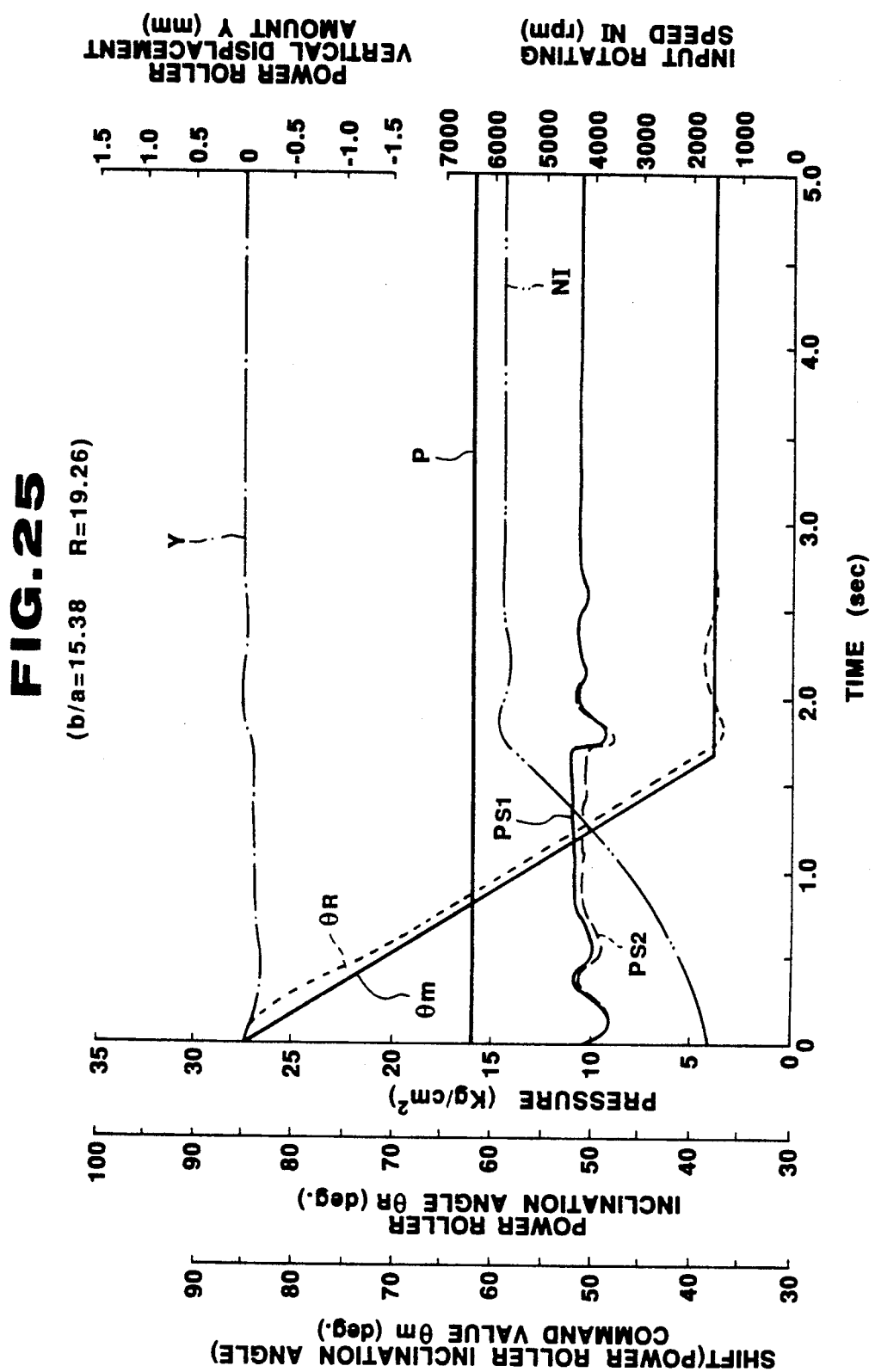
FIG. 25 is a view similar to FIG. 24, showing a 24th test result.
Figure 26:
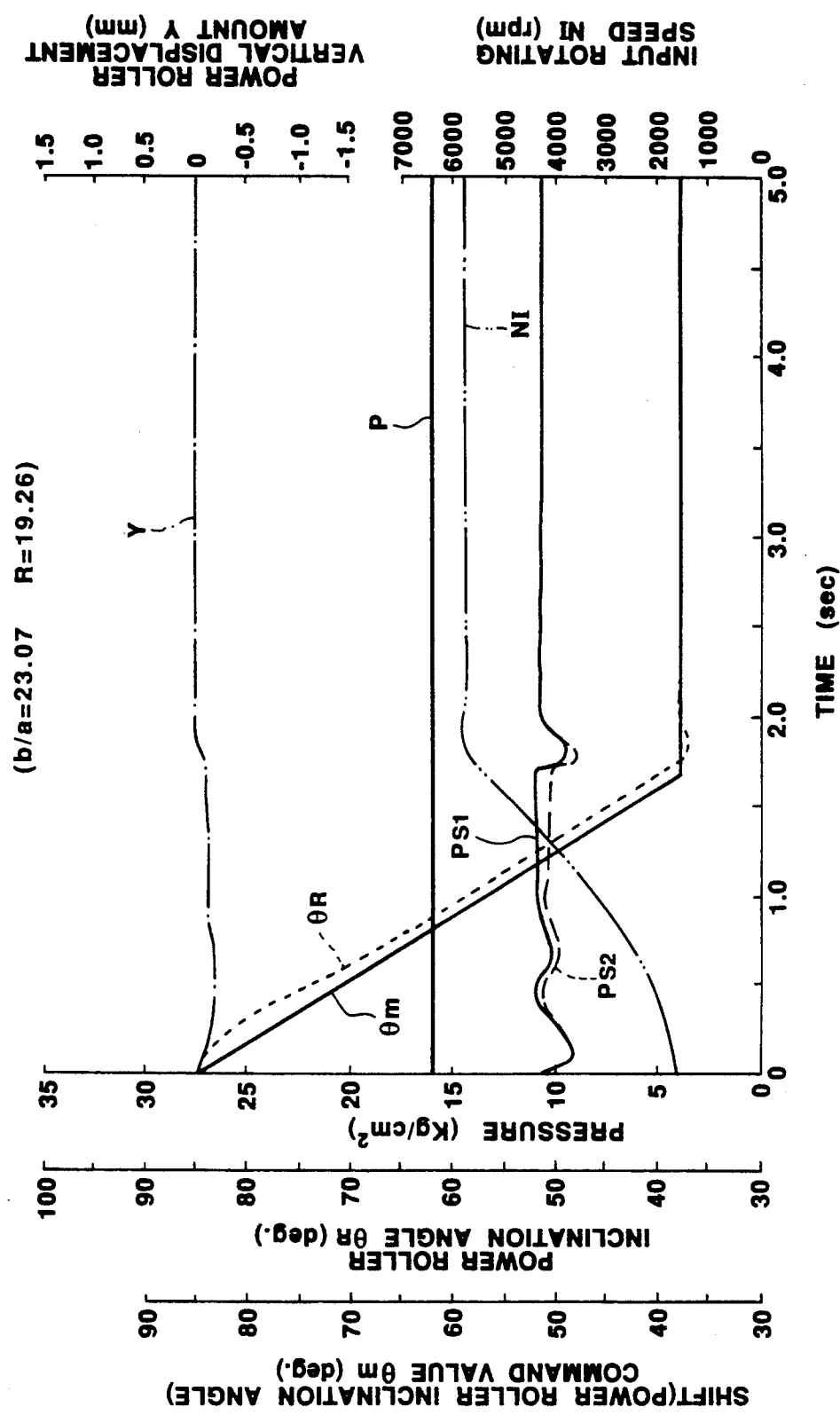
FIG. 26 is a view similar to FIG. 25, showing a 25th test result.
Figure 27:
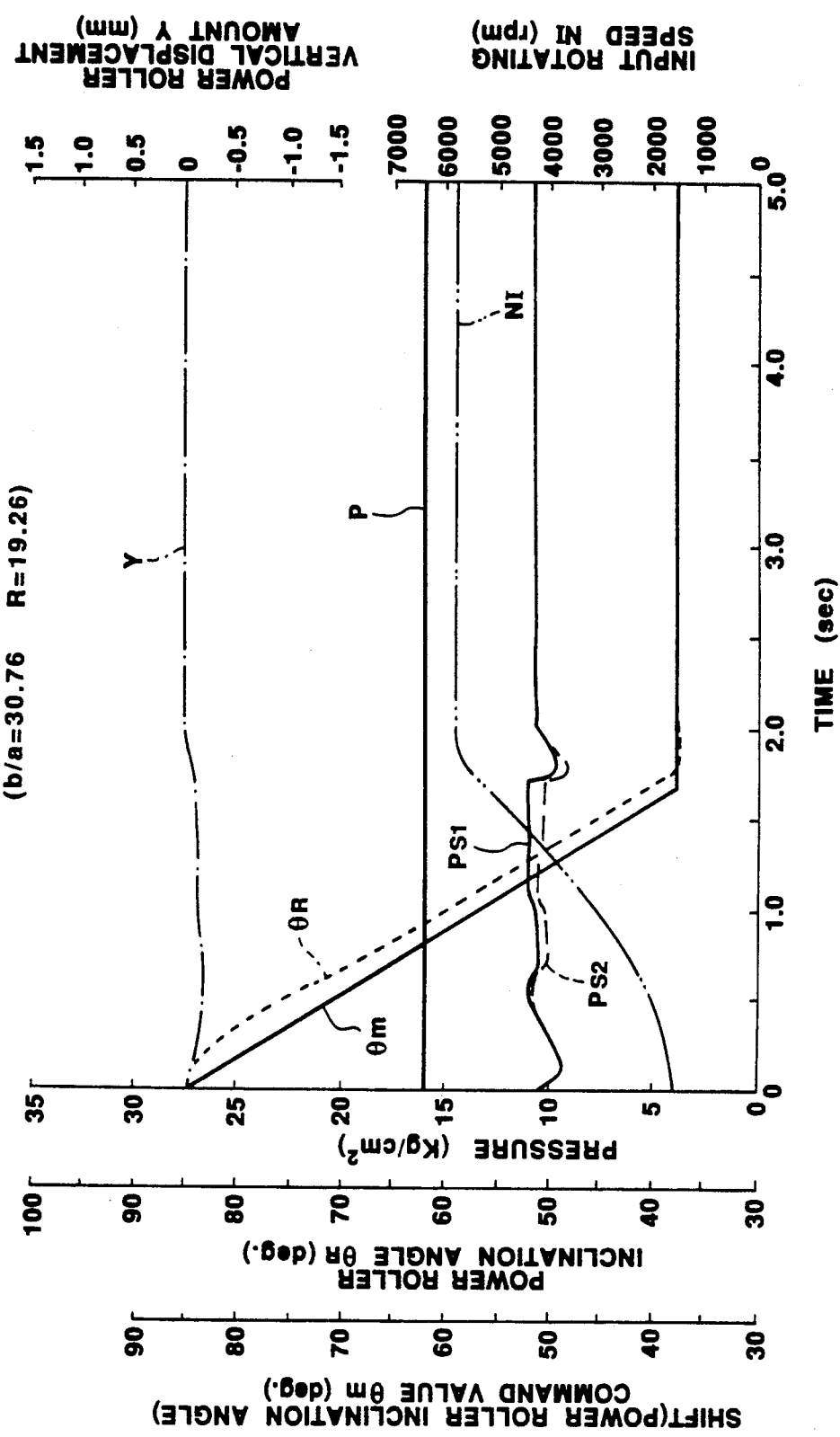
FIG. 27 is a view similar to FIG. 26, showing a 26th test result.
Figure 28:
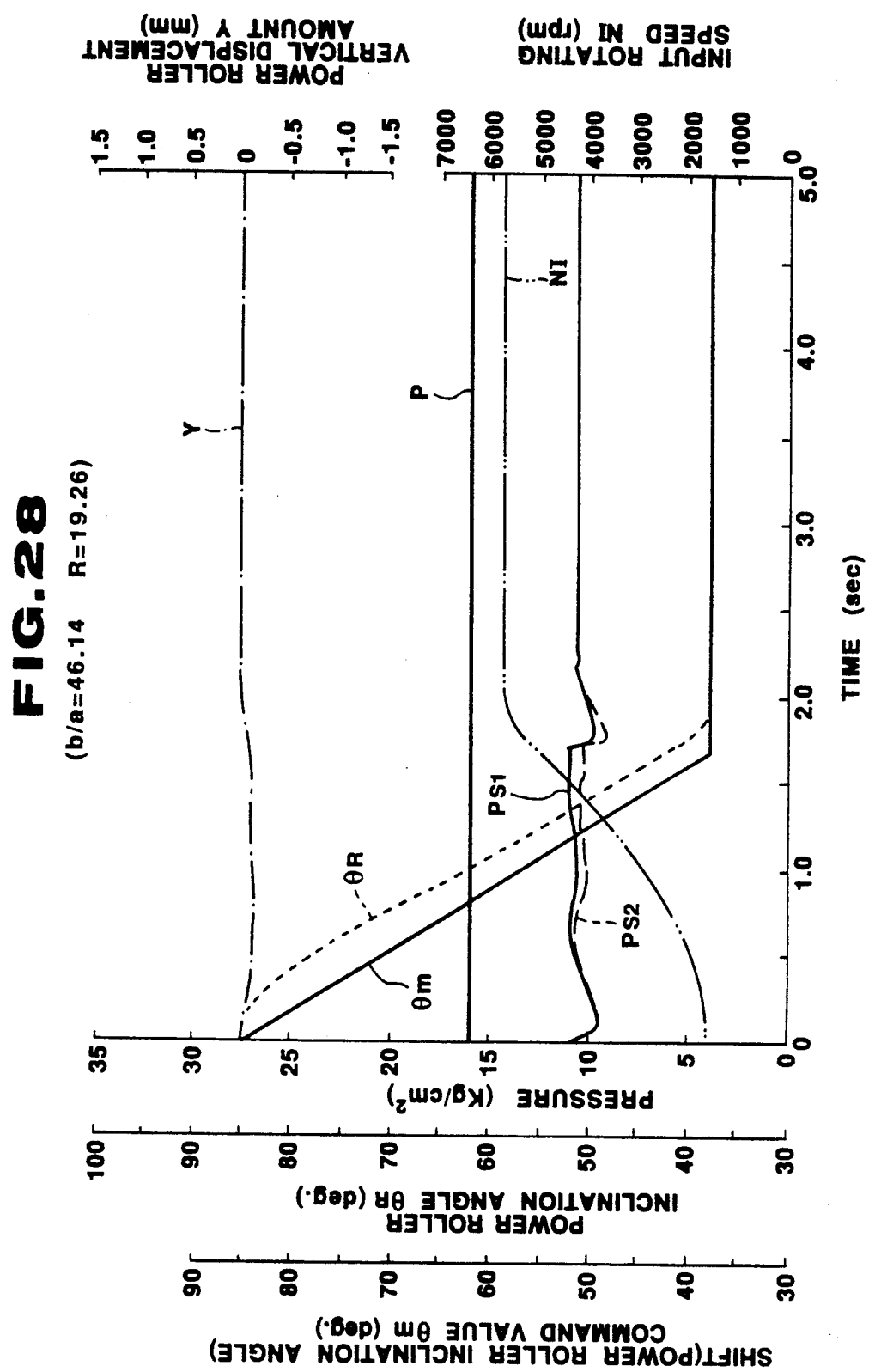
FIG. 28 is a view similar to FIG. 27, showing a 27th test result.
Figure 29:
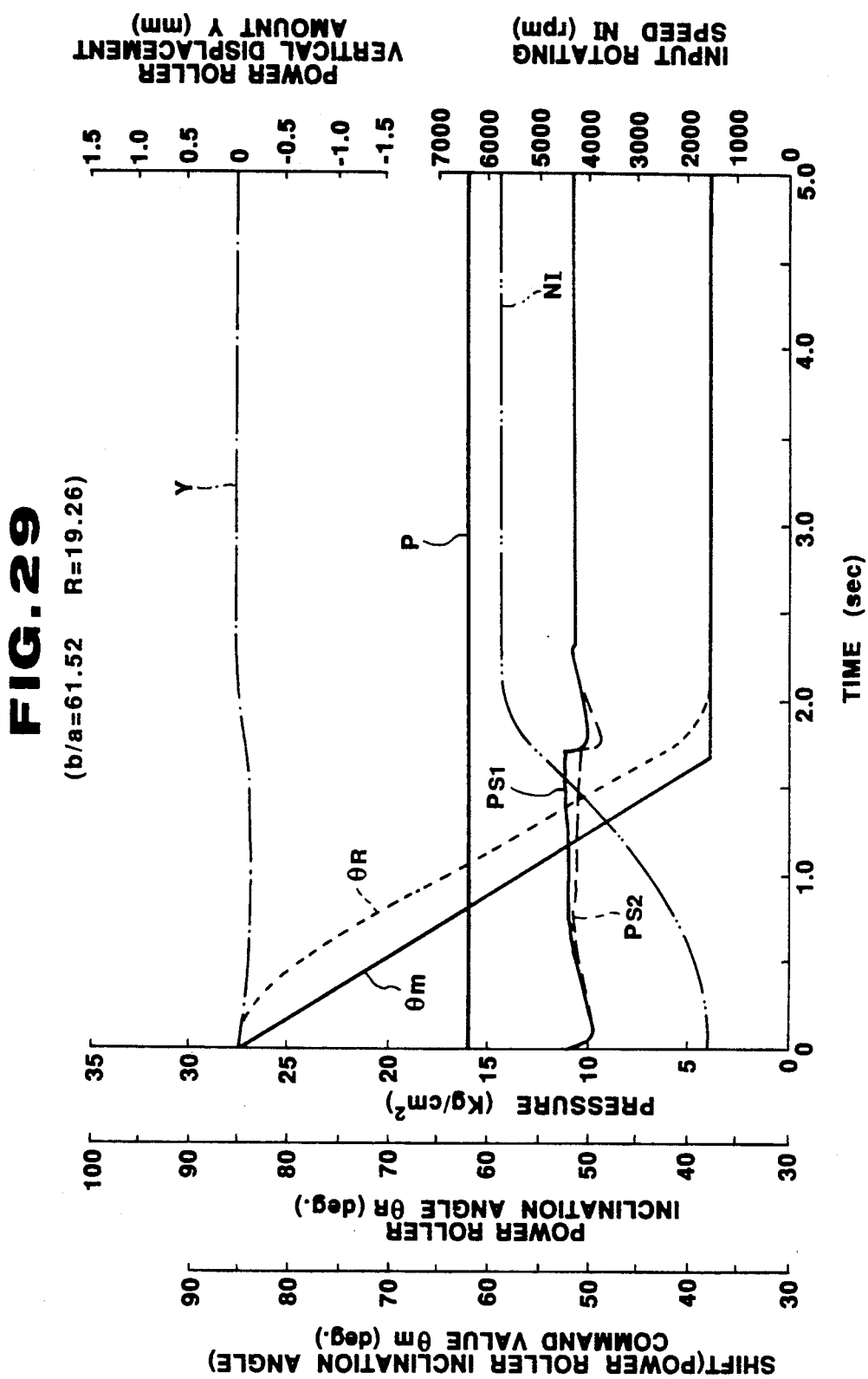
FIG. 29 is a view similar to FIG. 28, showing a 28th test result.
Figure 30:
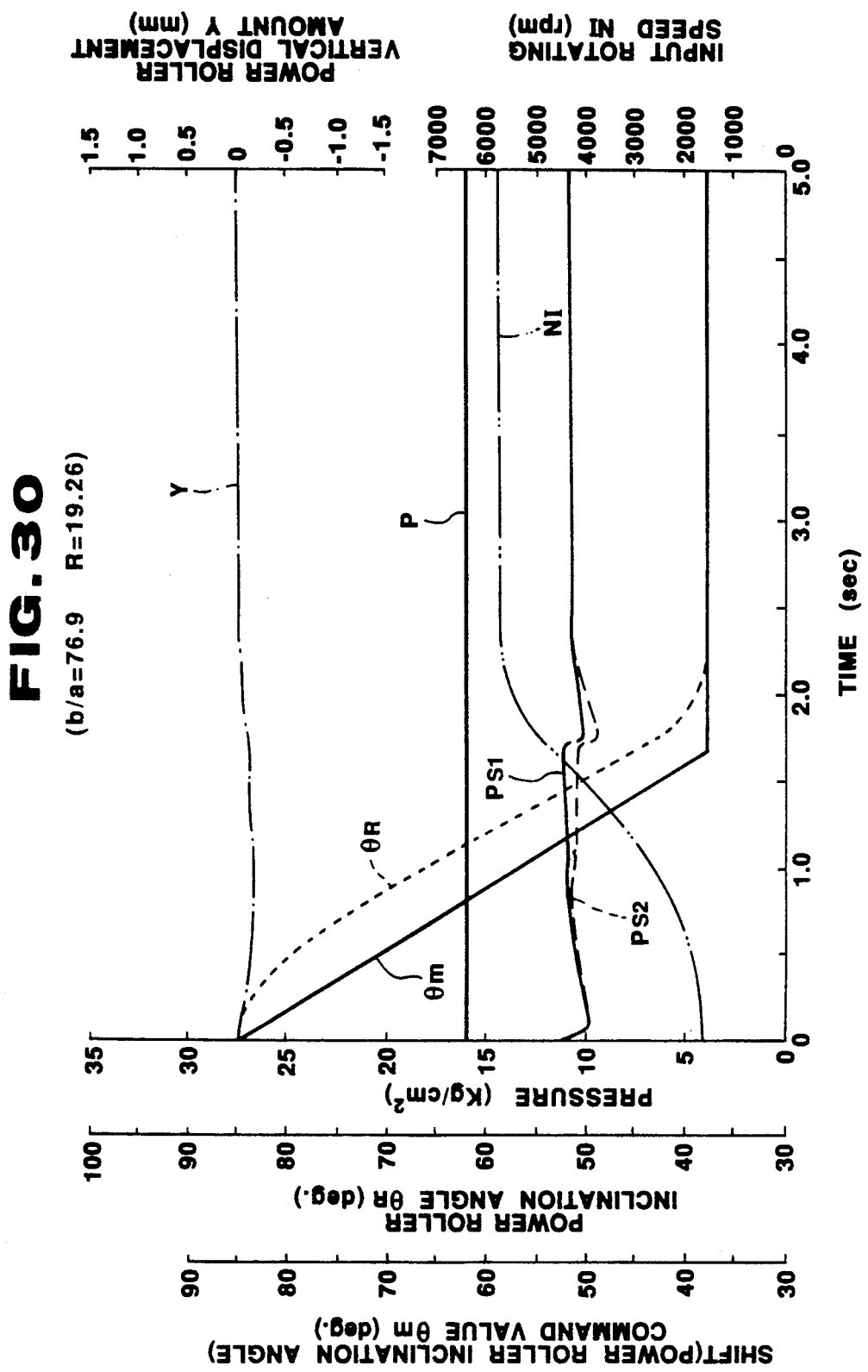
FIG. 30 is a view similar to FIG. 29, showing a 29th test result.
Figure 31:
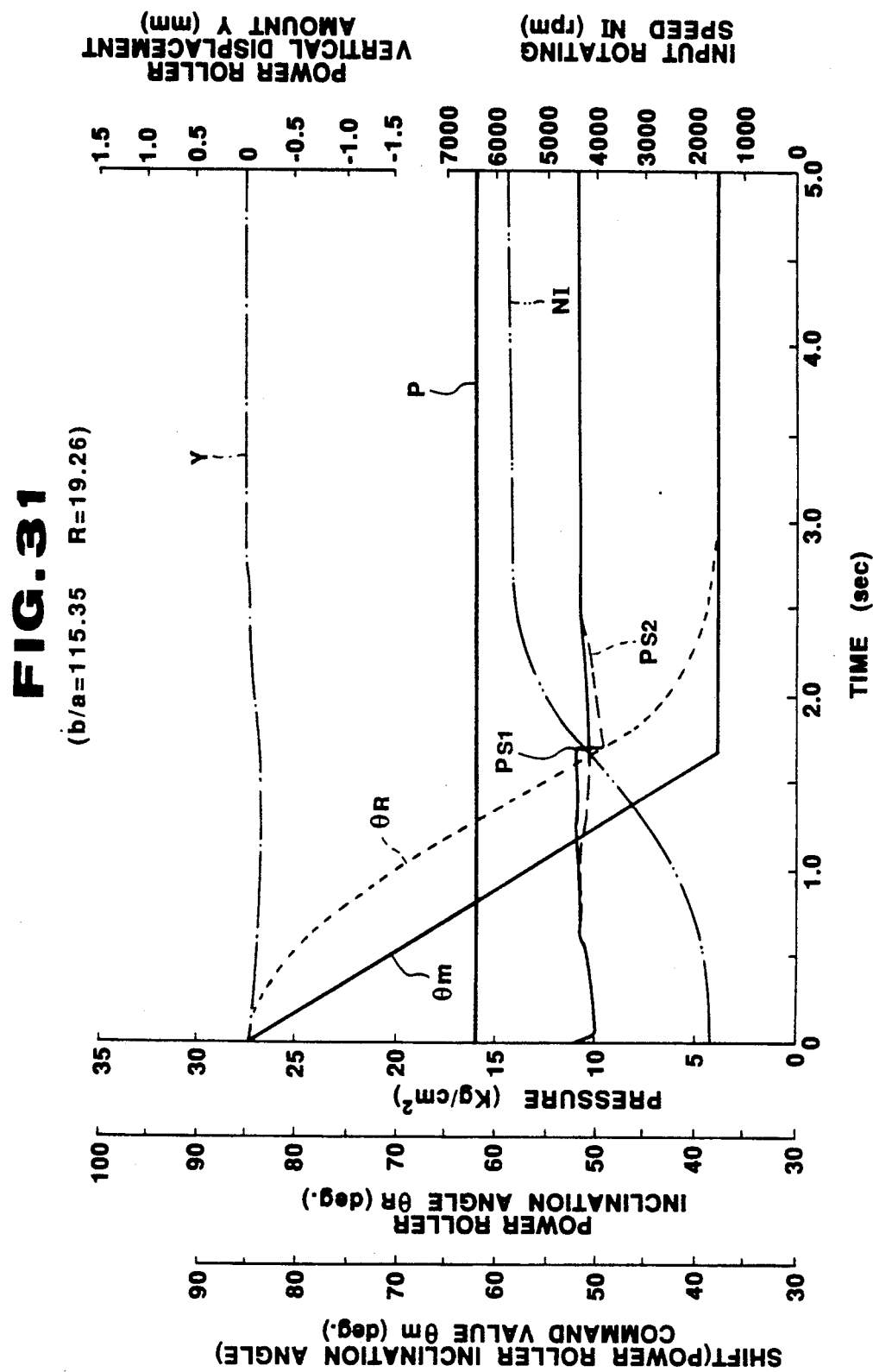
FIG. 31 is a view similar to FIG. 30, showing a 30th test result.
Figure 32:
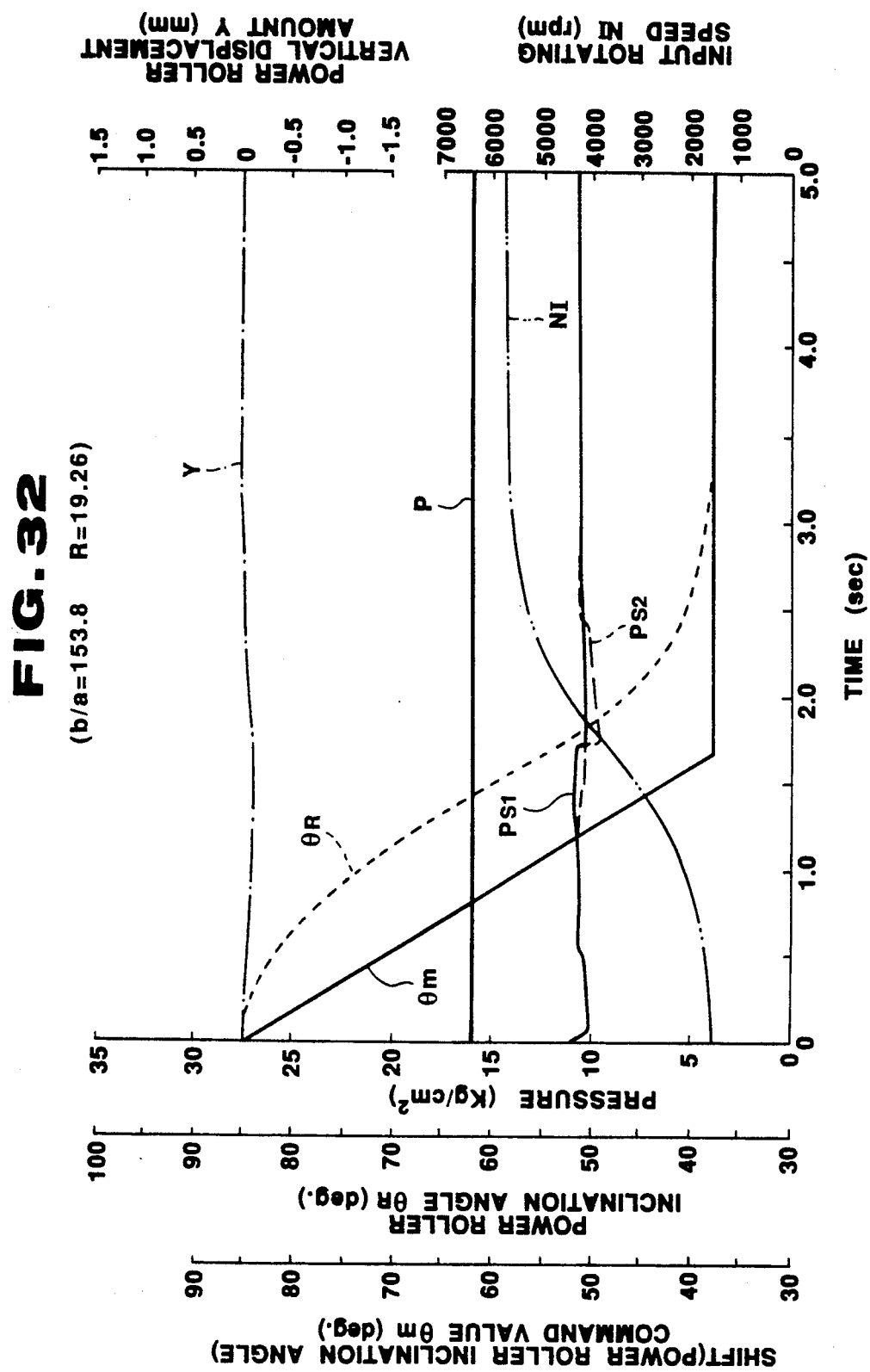
FIG. 32 is a view similar to FIG. 31, showing a 31st test result.
Figure 33:
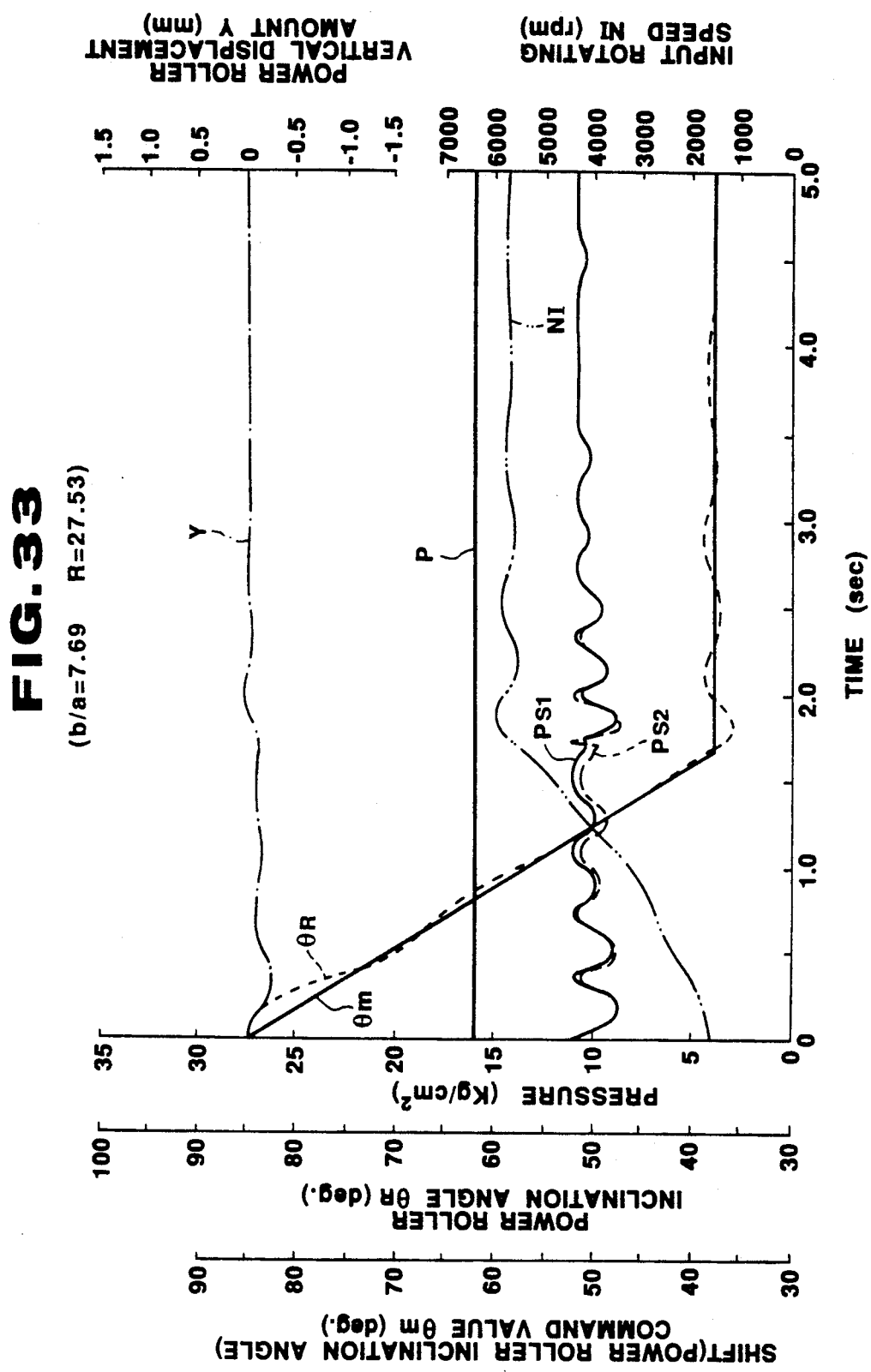
FIG. 33 is a view similar to FIG. 32, showing a 32nd test result.
Figure 34:
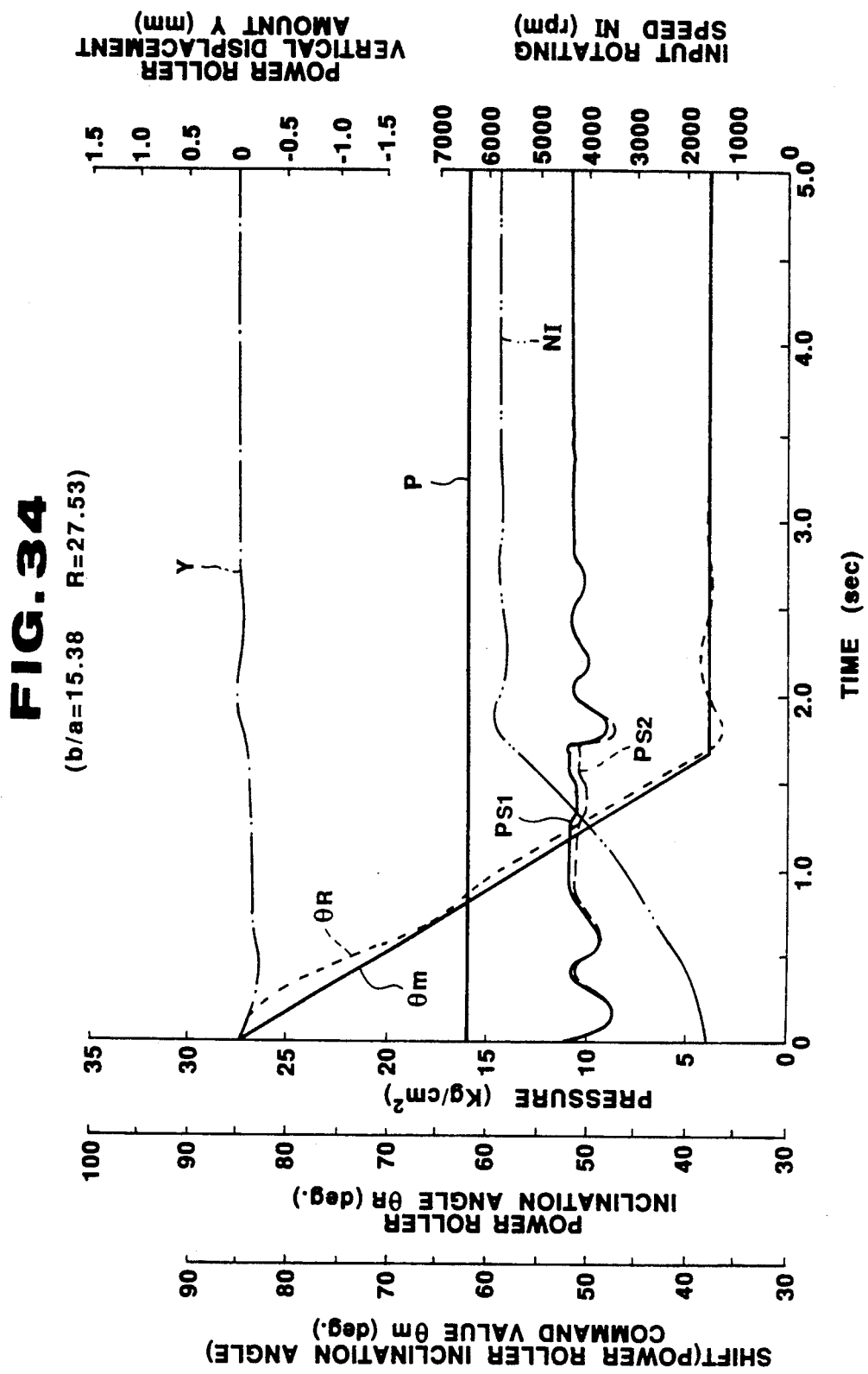
FIG. 34 is a view similar to FIG. 33, showing a 33rd test result.
Figure 35:
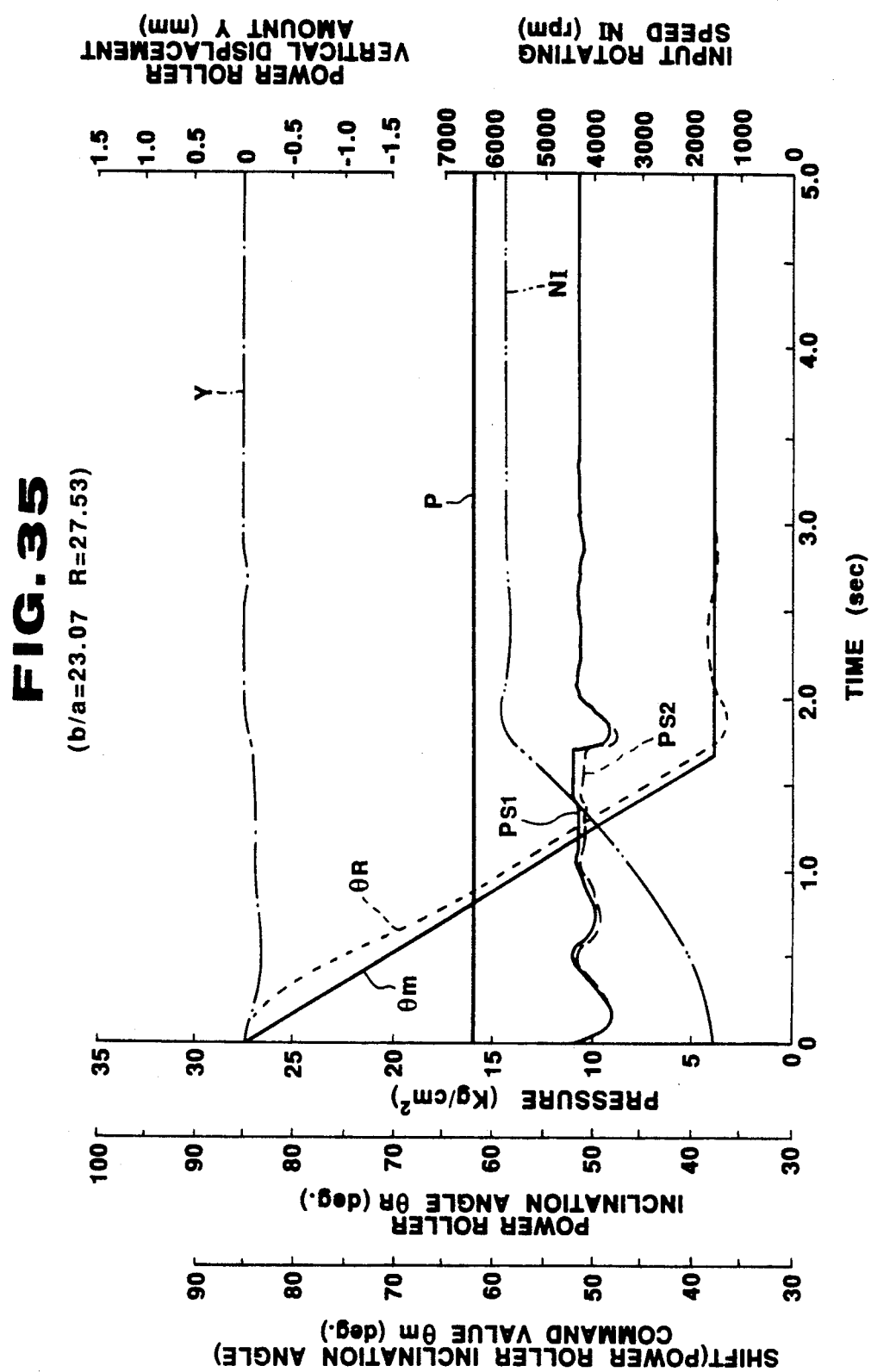
FIG. 35 is a view similar to FIG. 34, showing a 34th test result.
Figure 36:
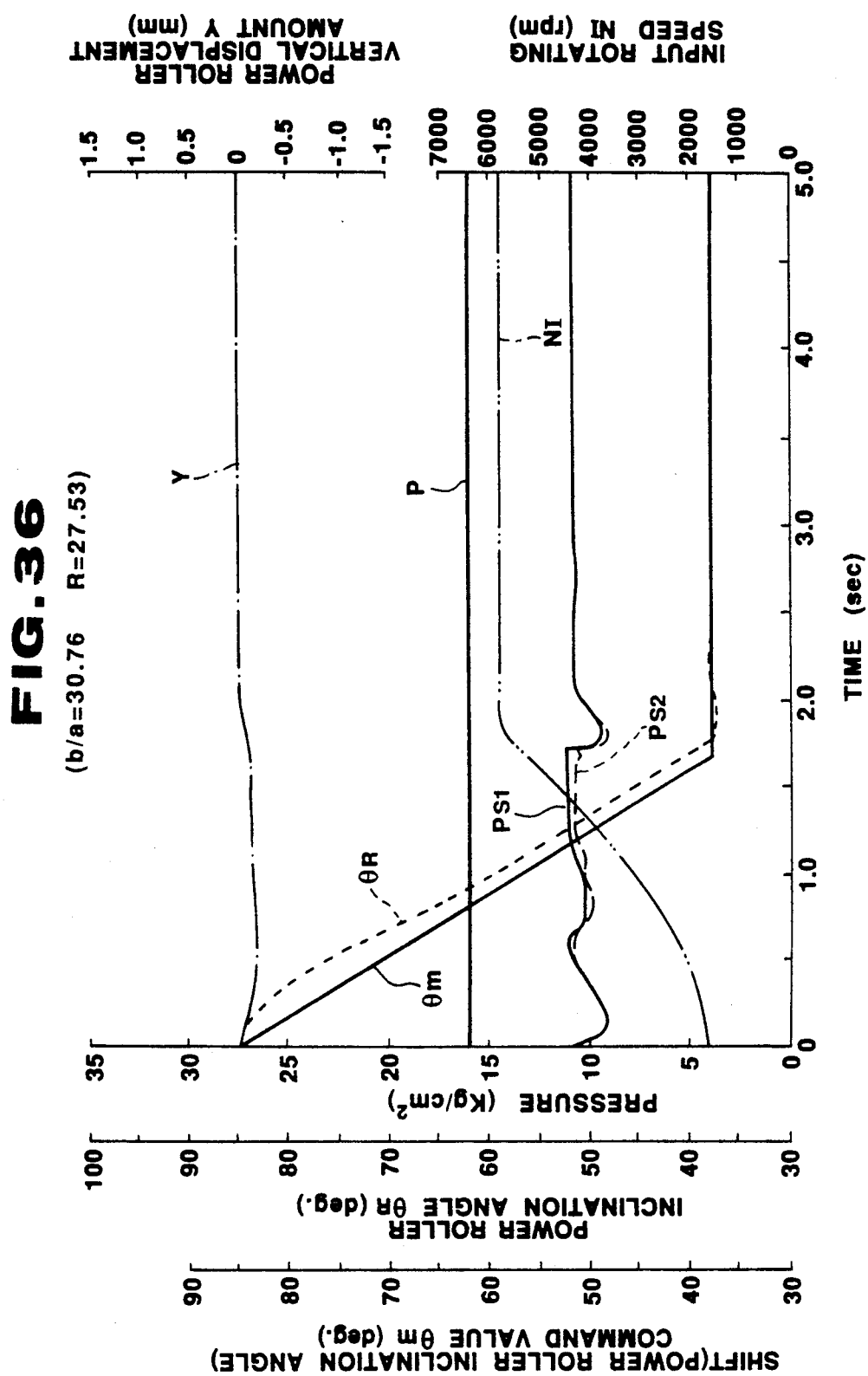
FIG. 36 is a view similar to FIG. 35, showing a 35th test result.
Figure 37:
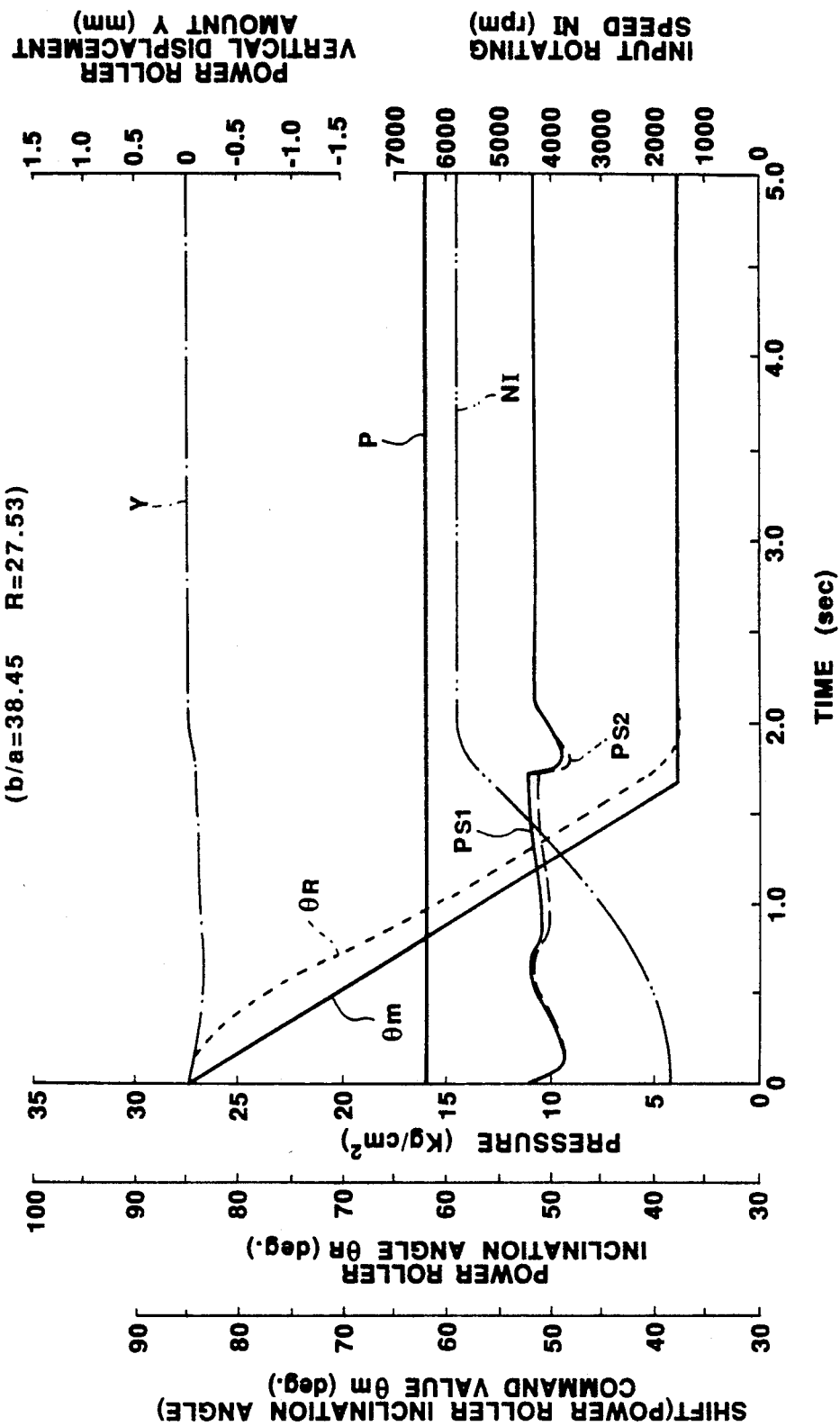
FIG. 37 is a view similar to FIG. 36, showing a 36th test result.
Figure 38:
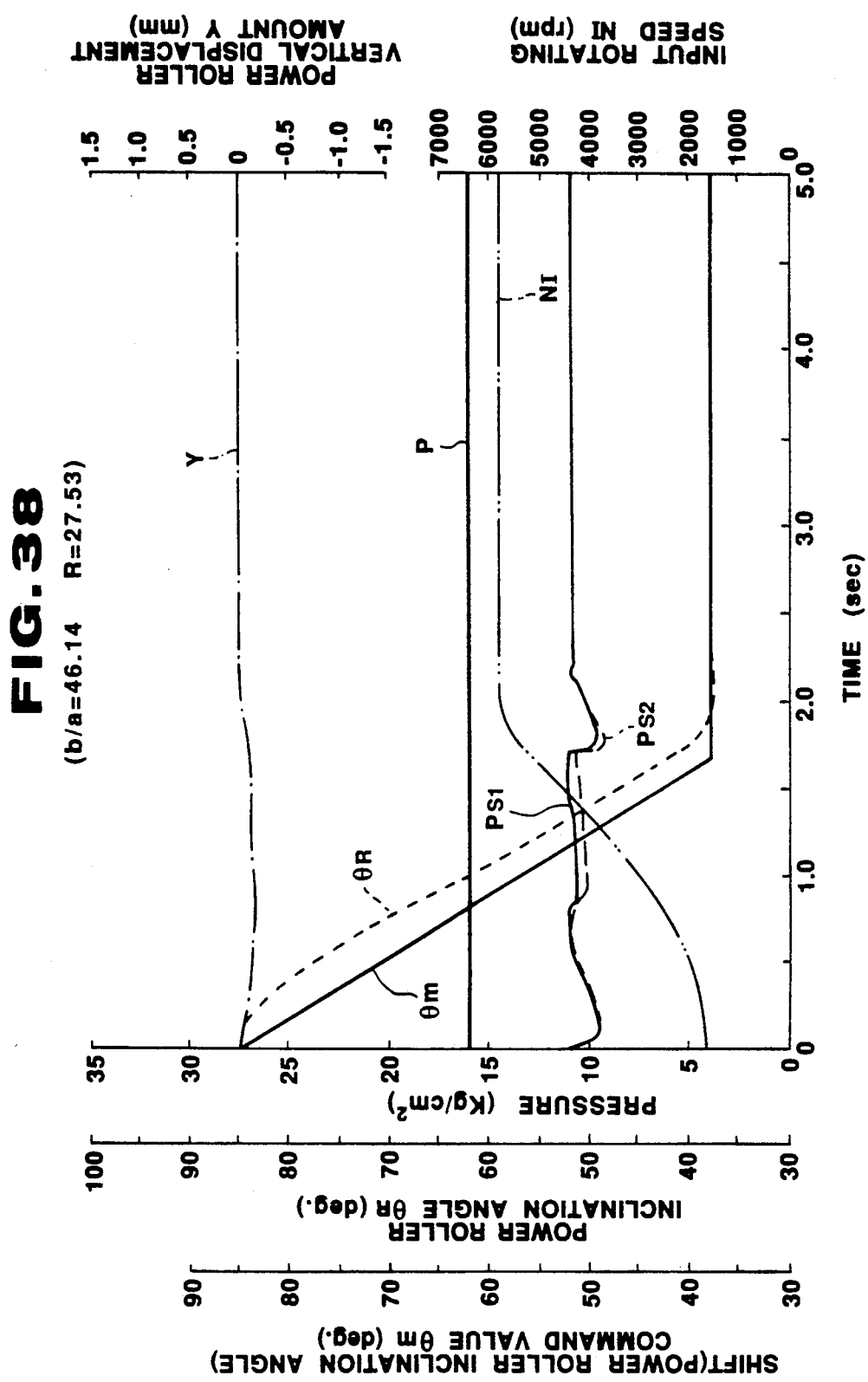
FIG. 38 is a view similar to FIG. 37, showing a 37th test result.
Figure 39:
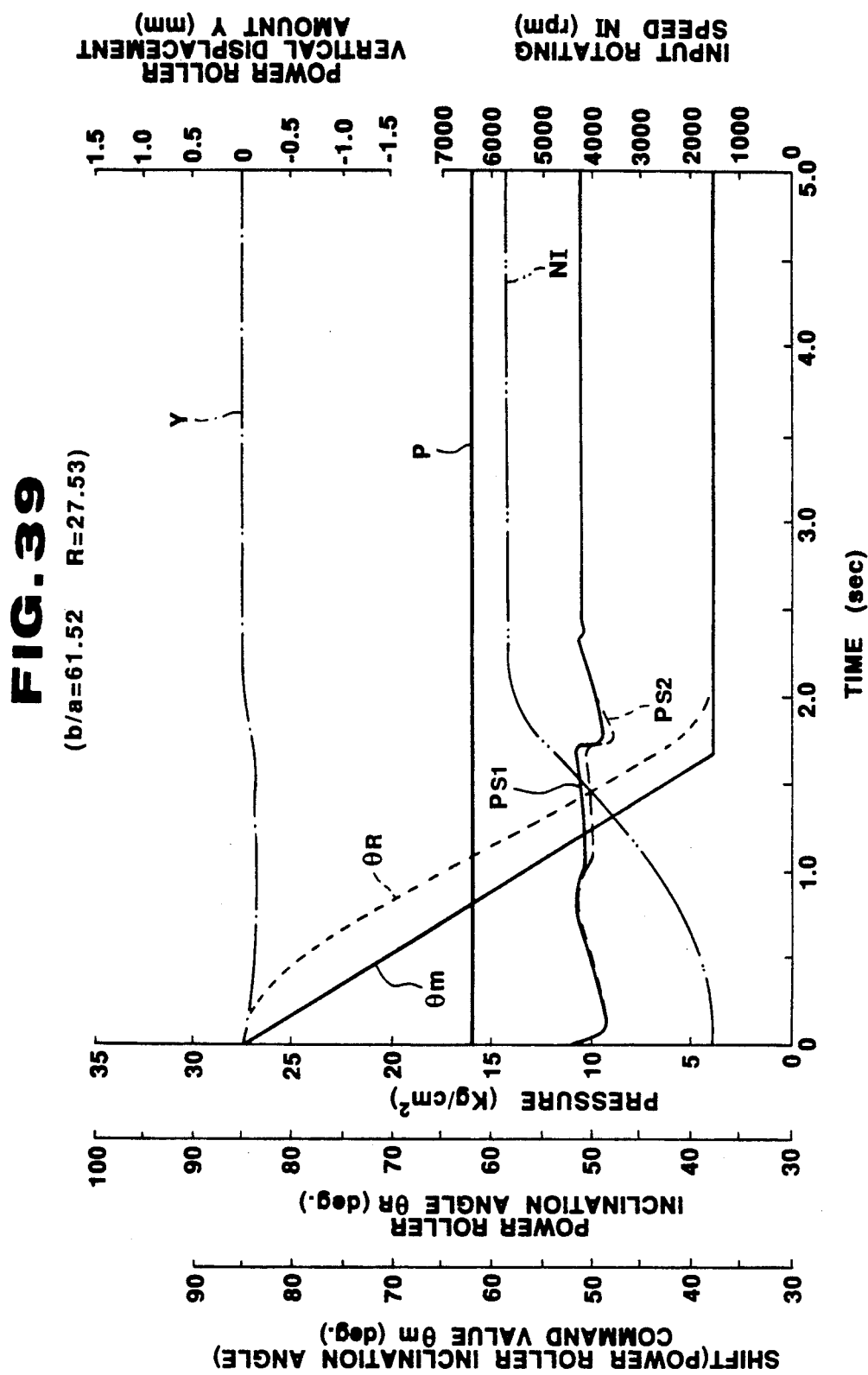
FIG. 39 is a view similar to FIG. 38, showing a 38th test result.
Figure 40:
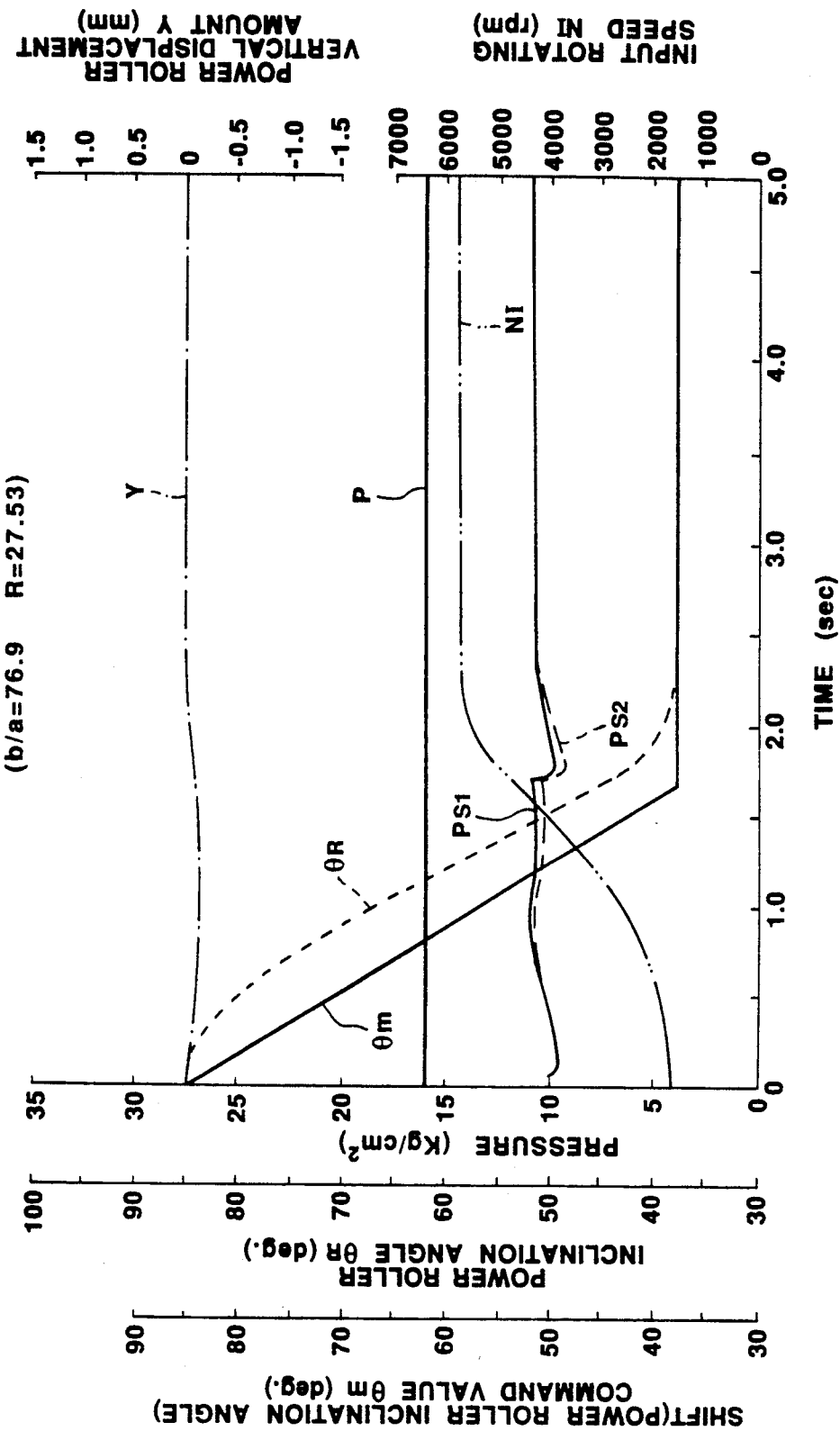
FIG. 40 is a view similar to FIG. 39, showing a 39th test result.
Figure 41:
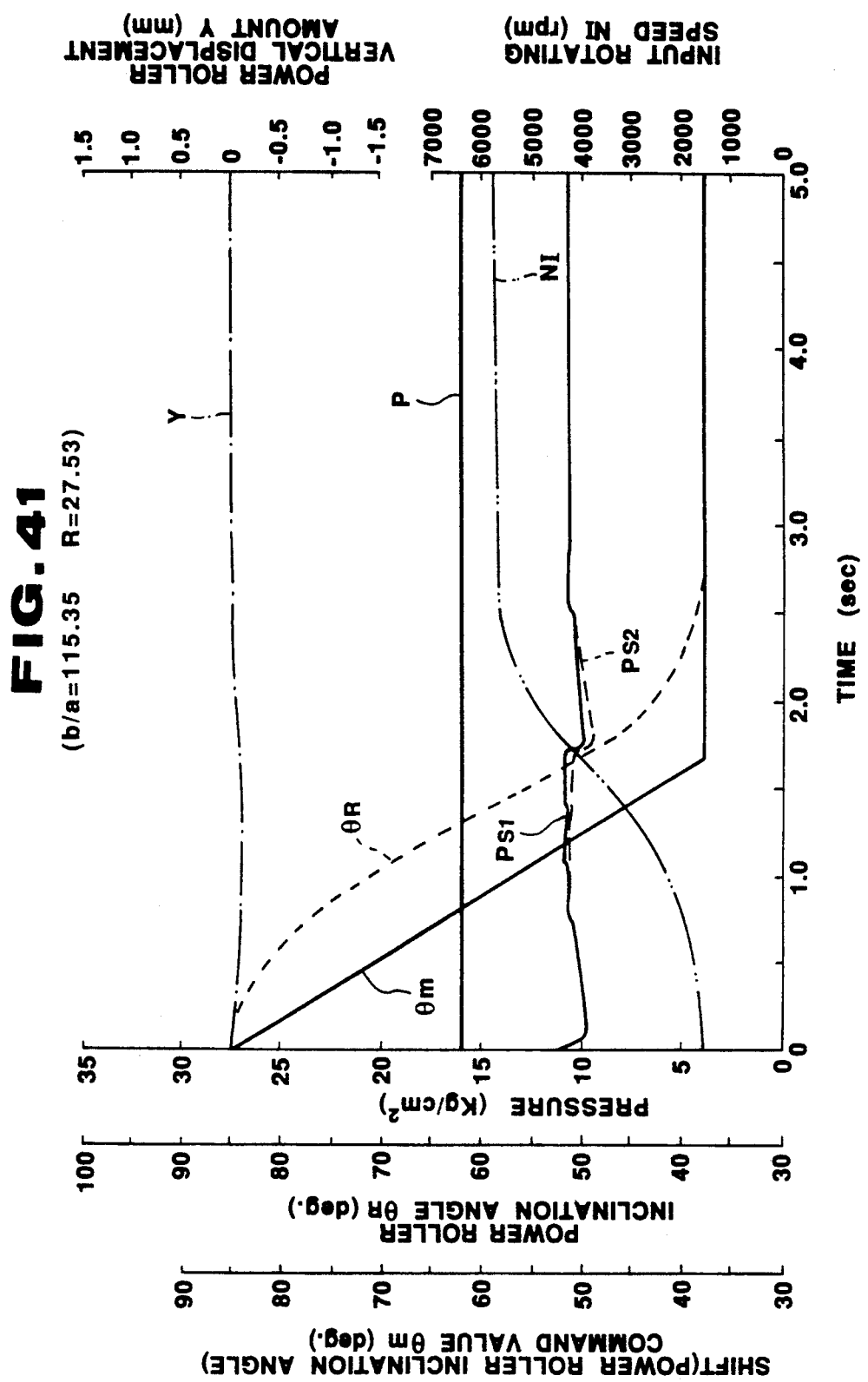
FIG. 41 is a view similar to FIG. 40, showing a 40th test result.
Figure 42:
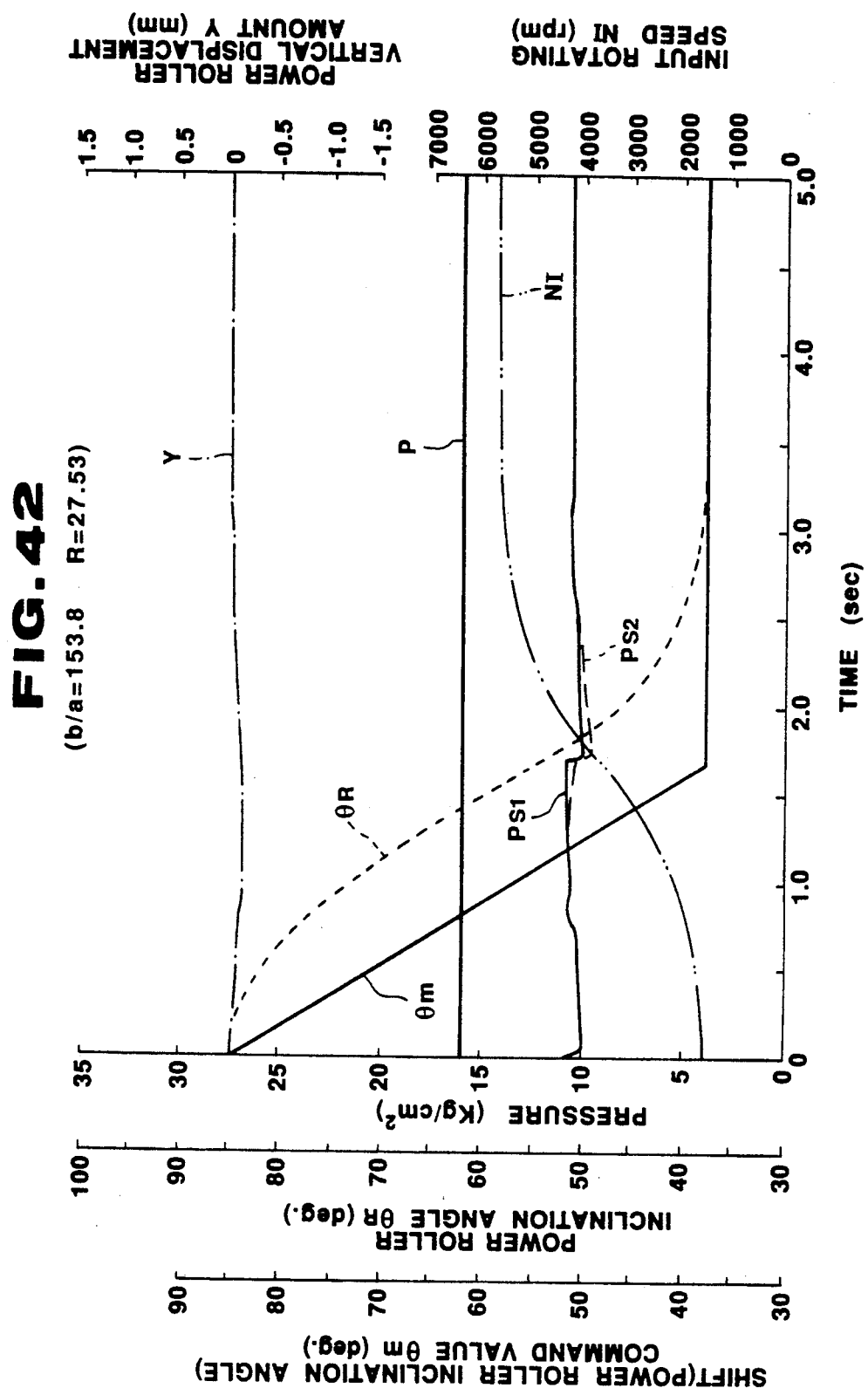
FIG. 42 is a view similar to FIG. 41, showing a 41st test result.
Figure 43:
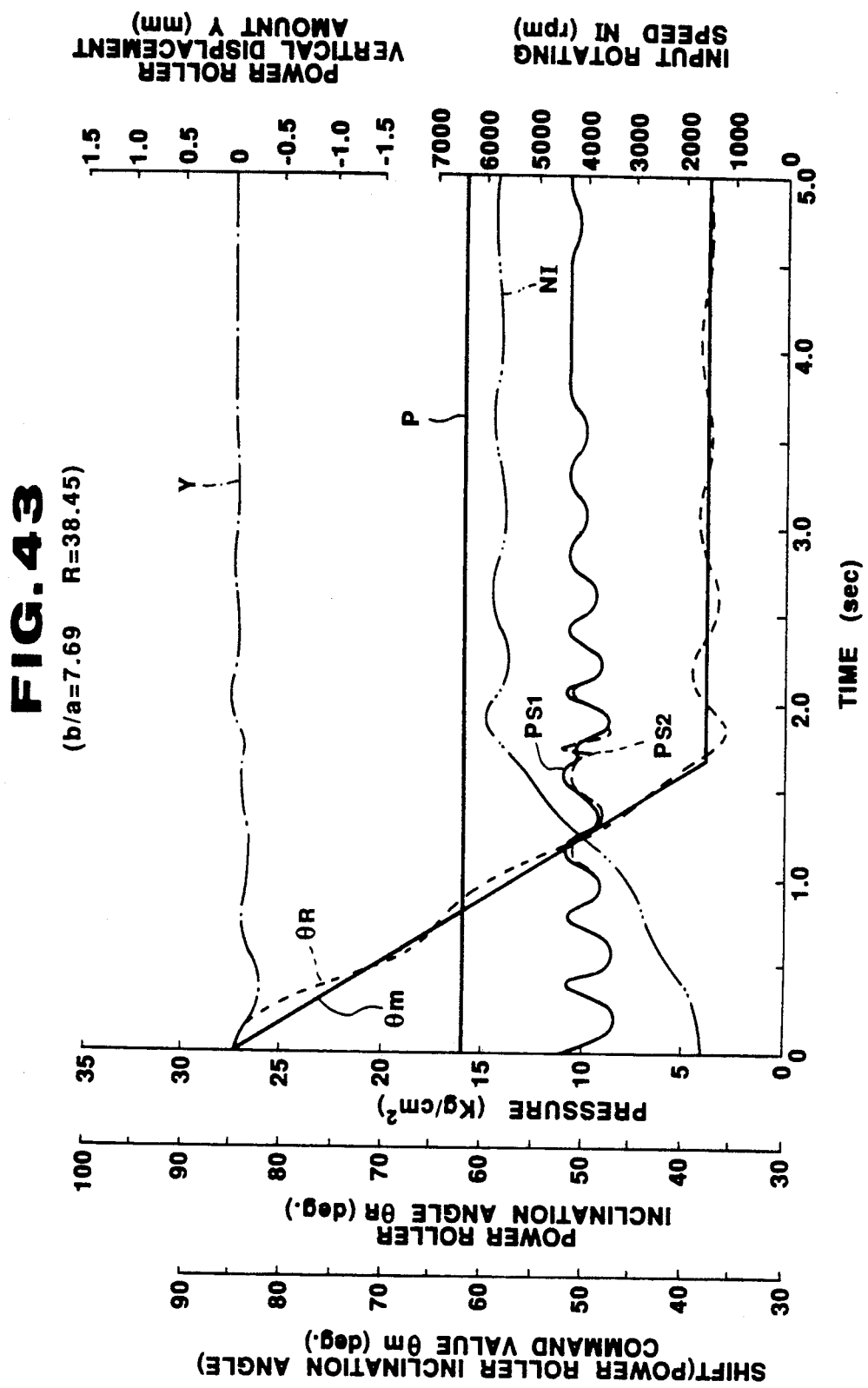
FIG. 43 is a view similar to FIG. 42, showing a 42nd test result.
Figure 44:
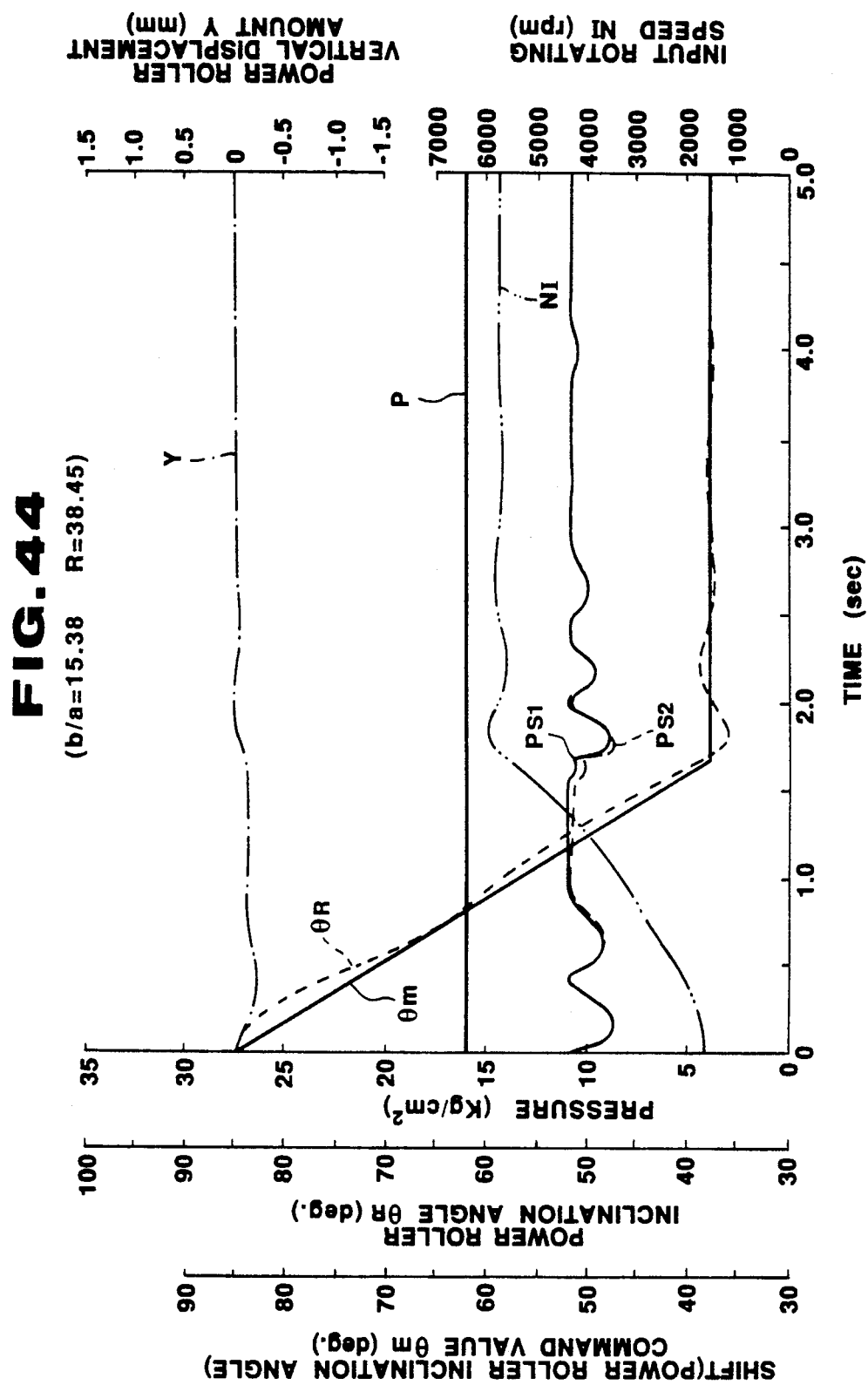
FIG. 44 is a view similar to FIG. 43, showing a 43rd test result.
Figure 45:
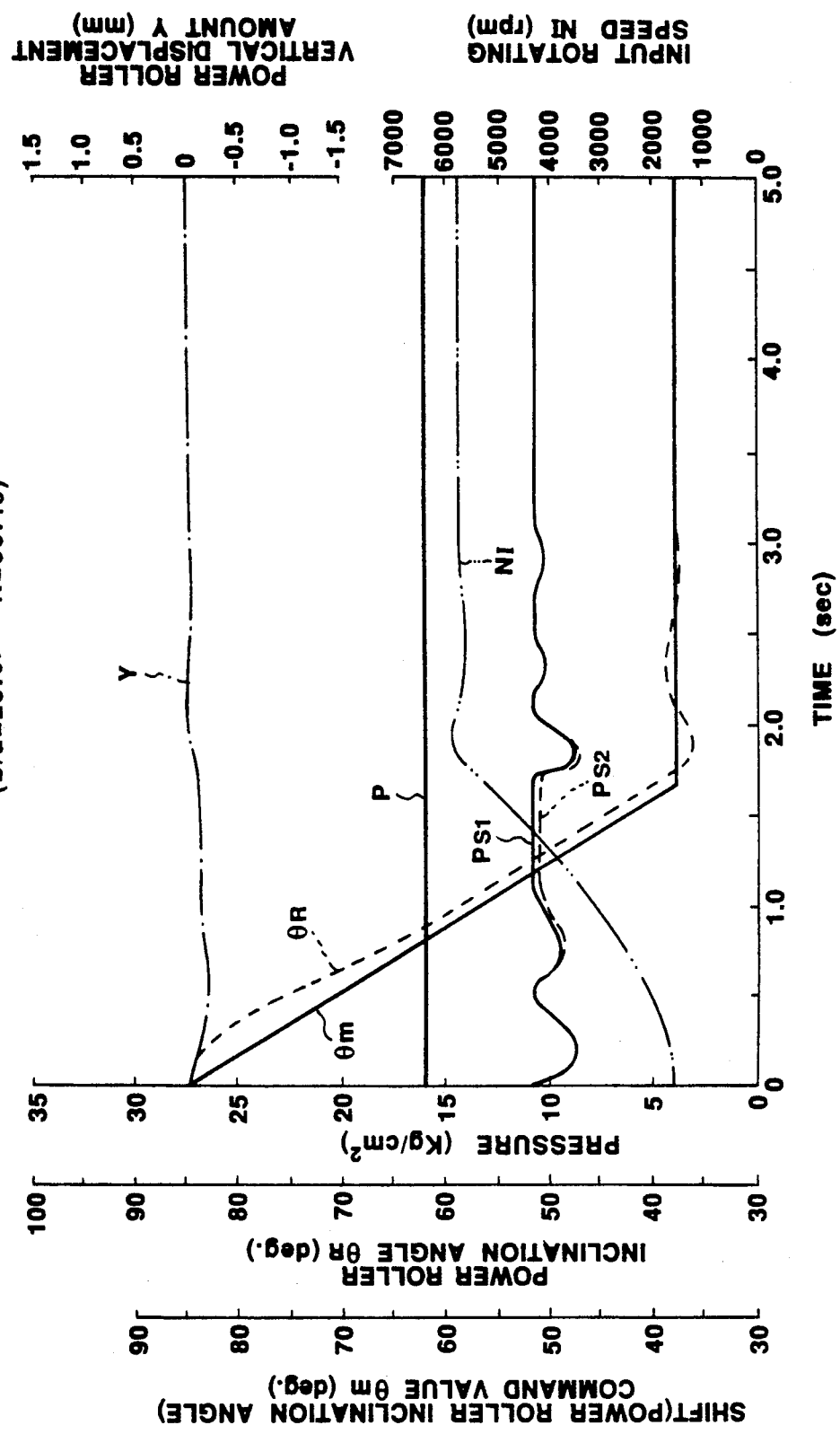
FIG. 45 is a view similar to FIG. 44, showing a 44th test result.
Figure 46:
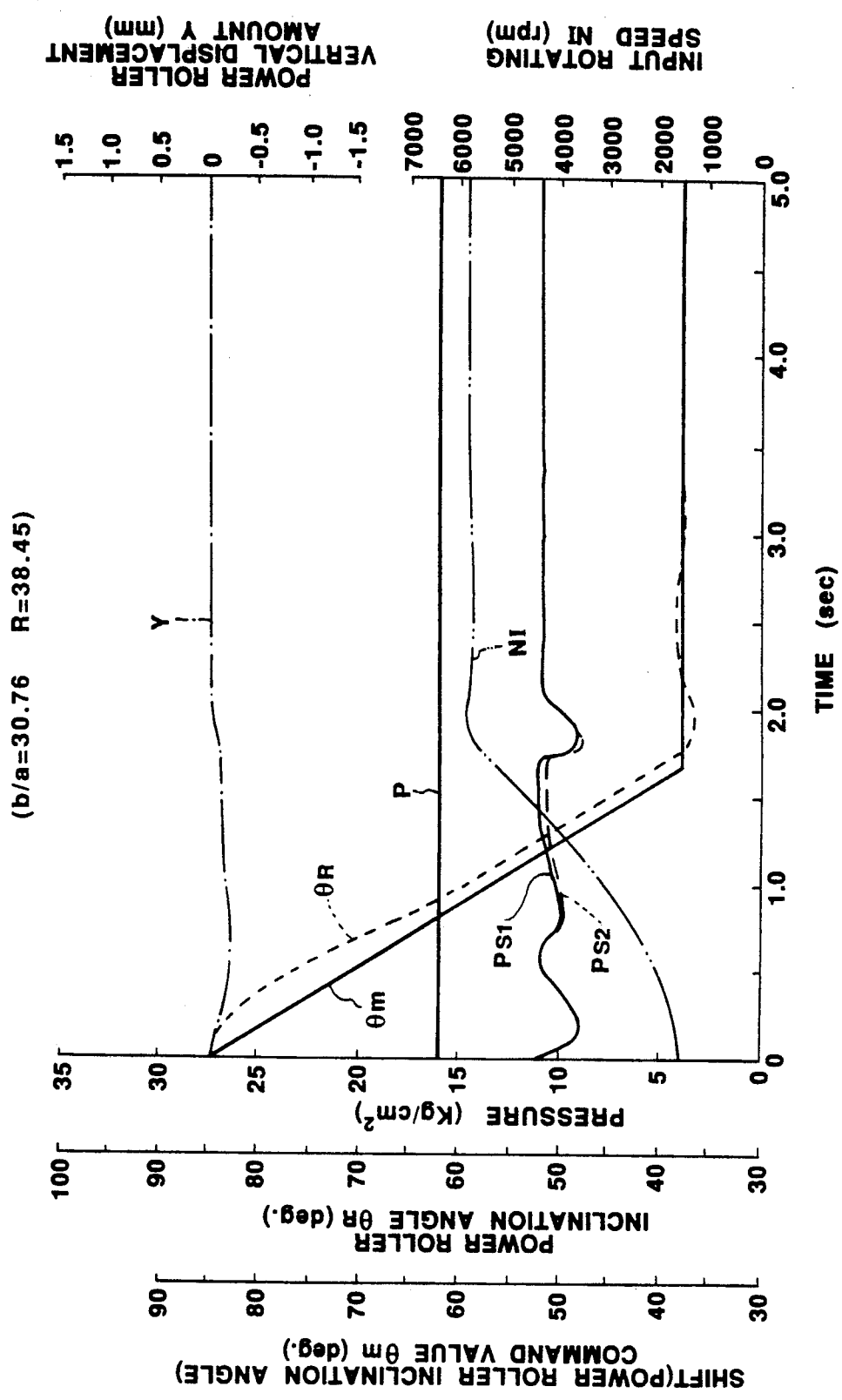
FIG. 46 is a view similar to FIG. 45, showing a 45th test result.
Figure 47:
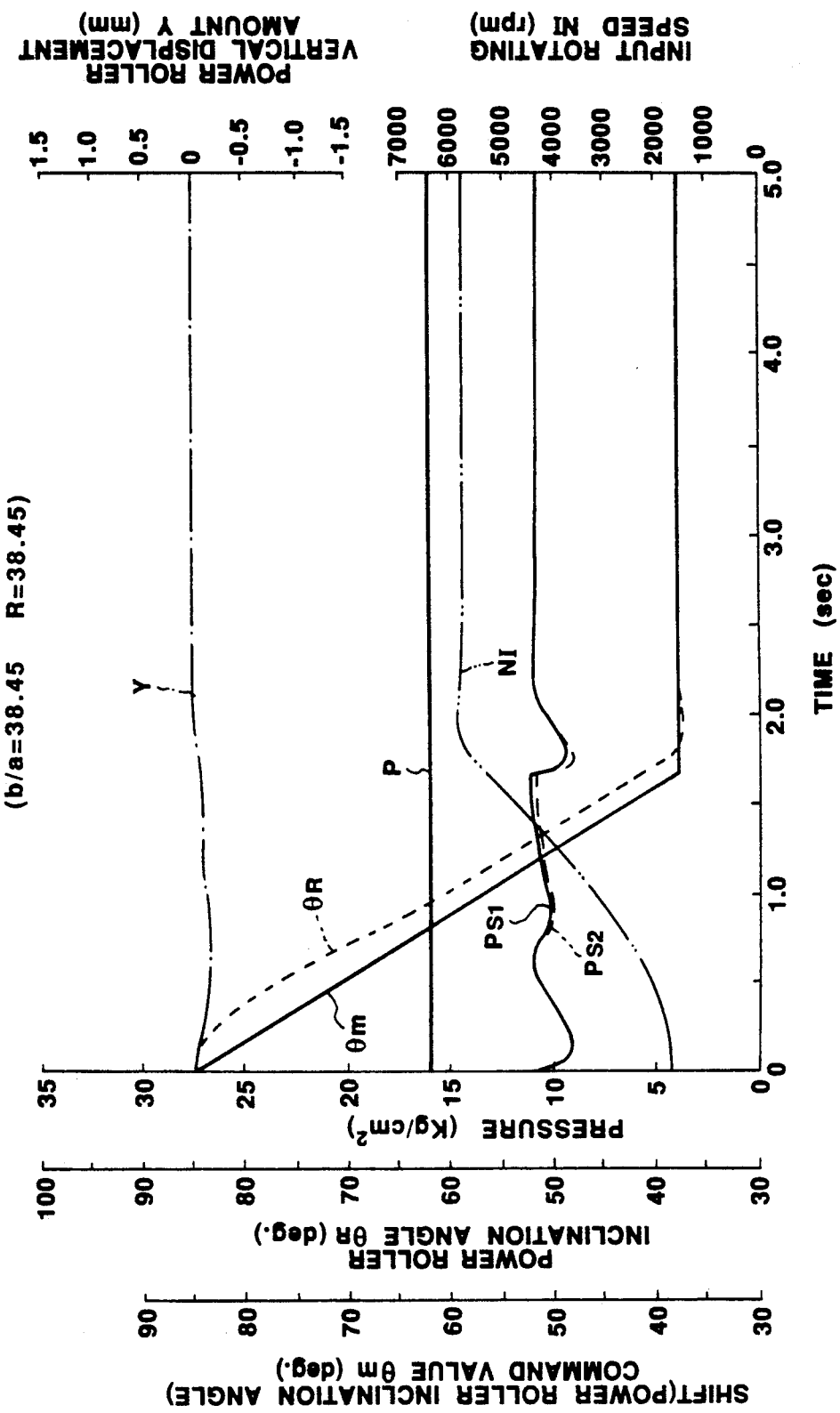
FIG. 47 is a view similar to FIG. 46, showing a 46th test result.
Figure 48:
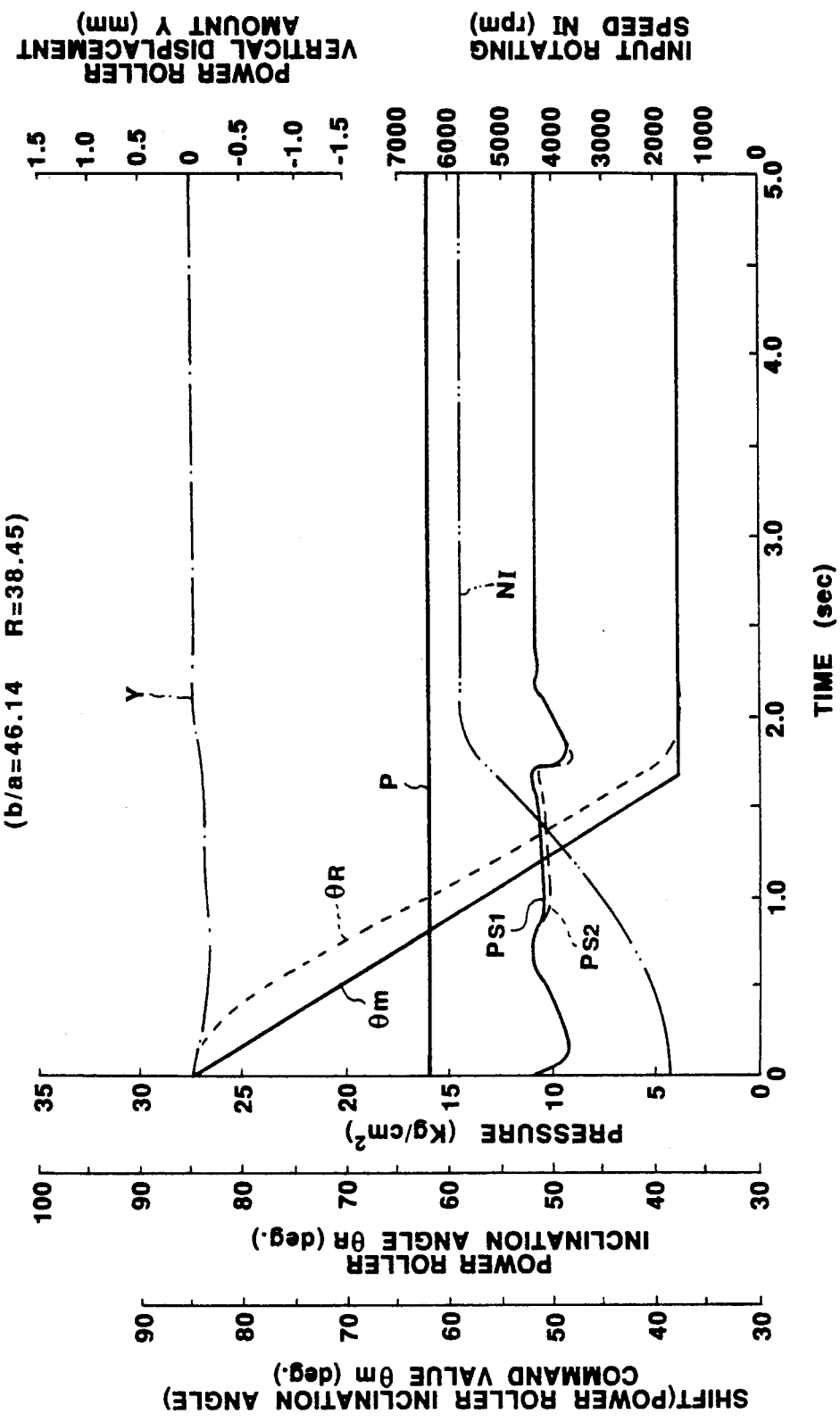
FIG. 48 is a view similar to FIG. 47, showing a 47th test result.
Figure 49:
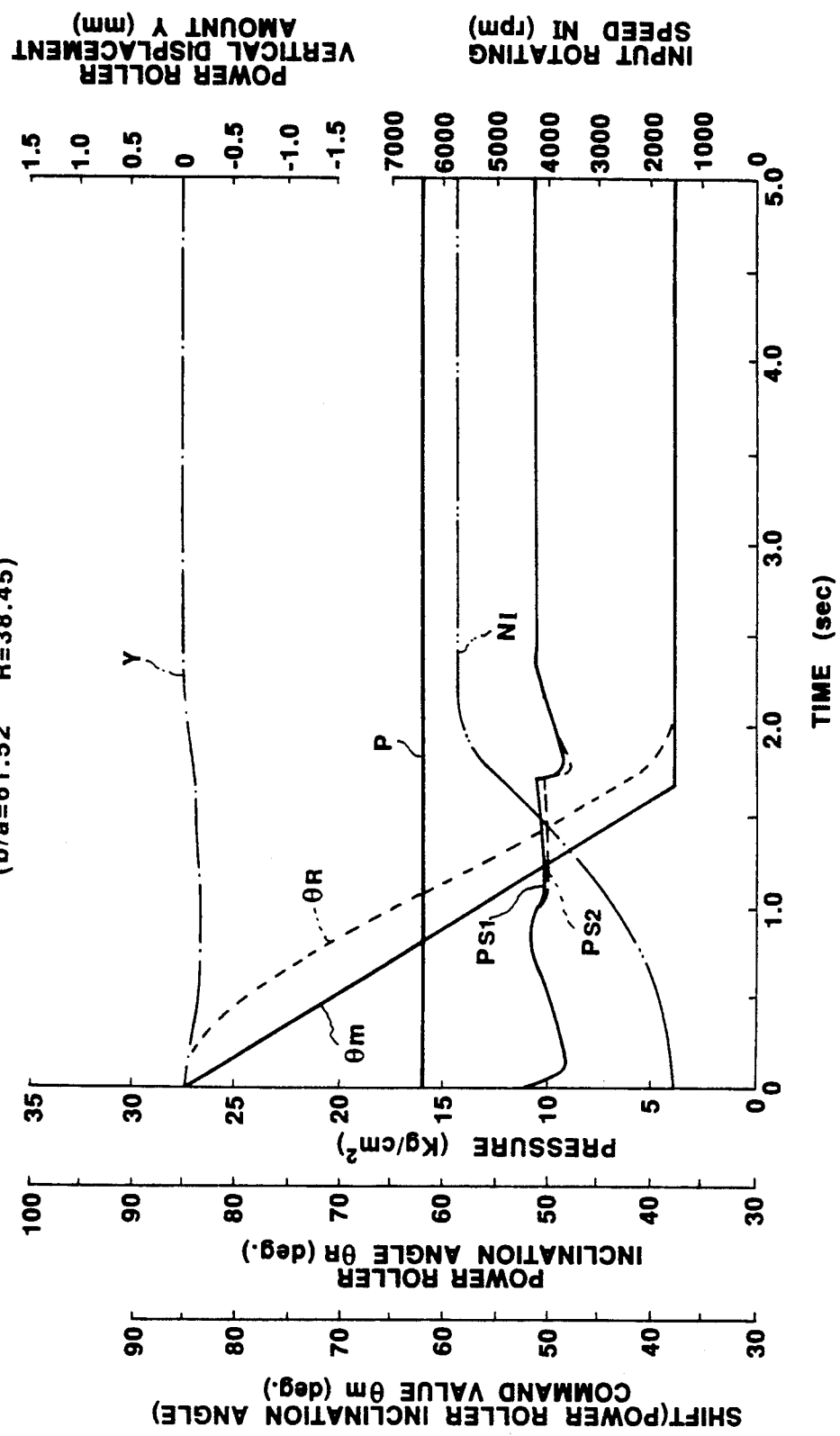
FIG. 49 is a view similar to FIG. 48, showing a 48th test result.
Figure 50:
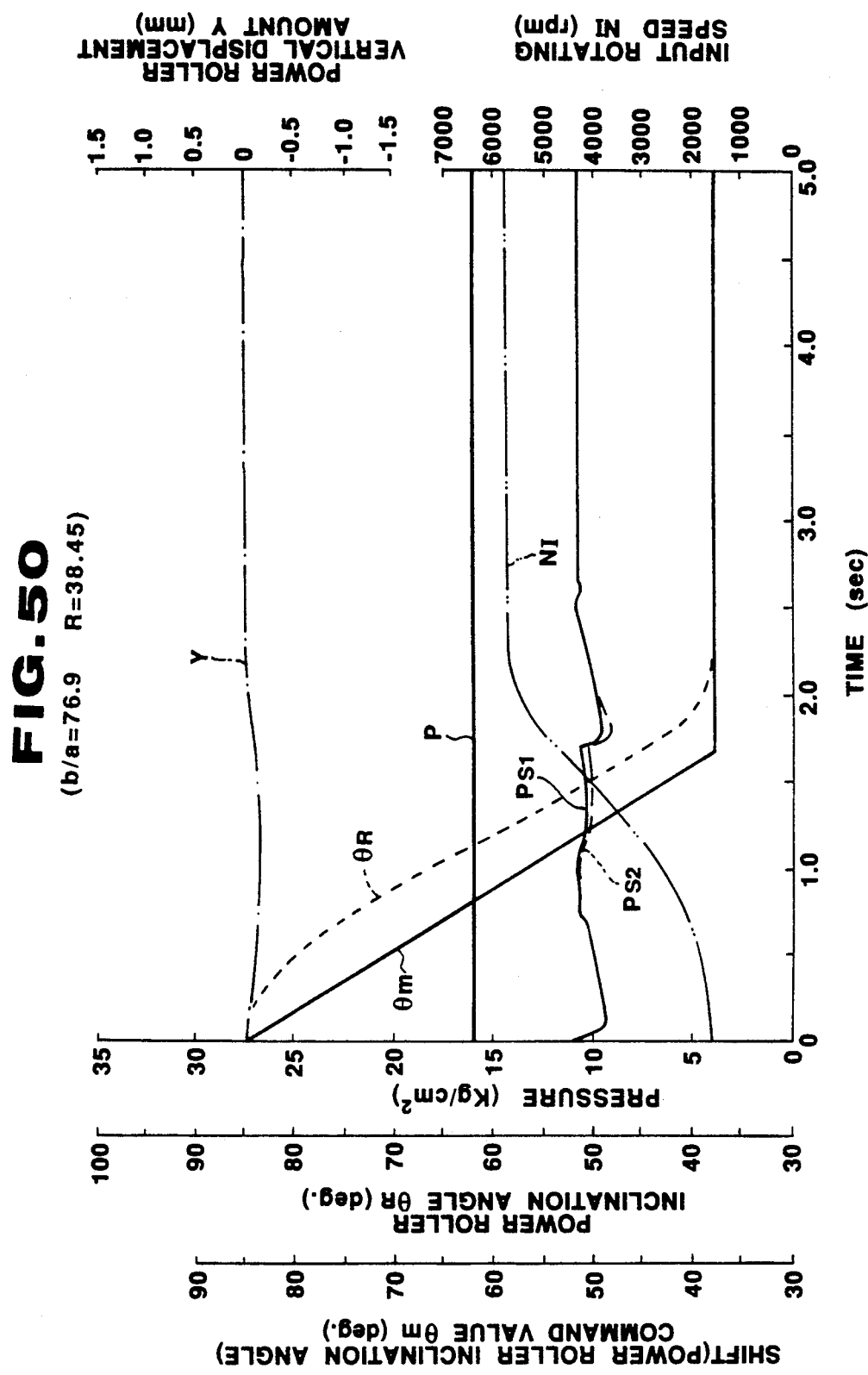
FIG. 50 is a view similar to FIG. 49, showing a 49th test result.
Figure 51:
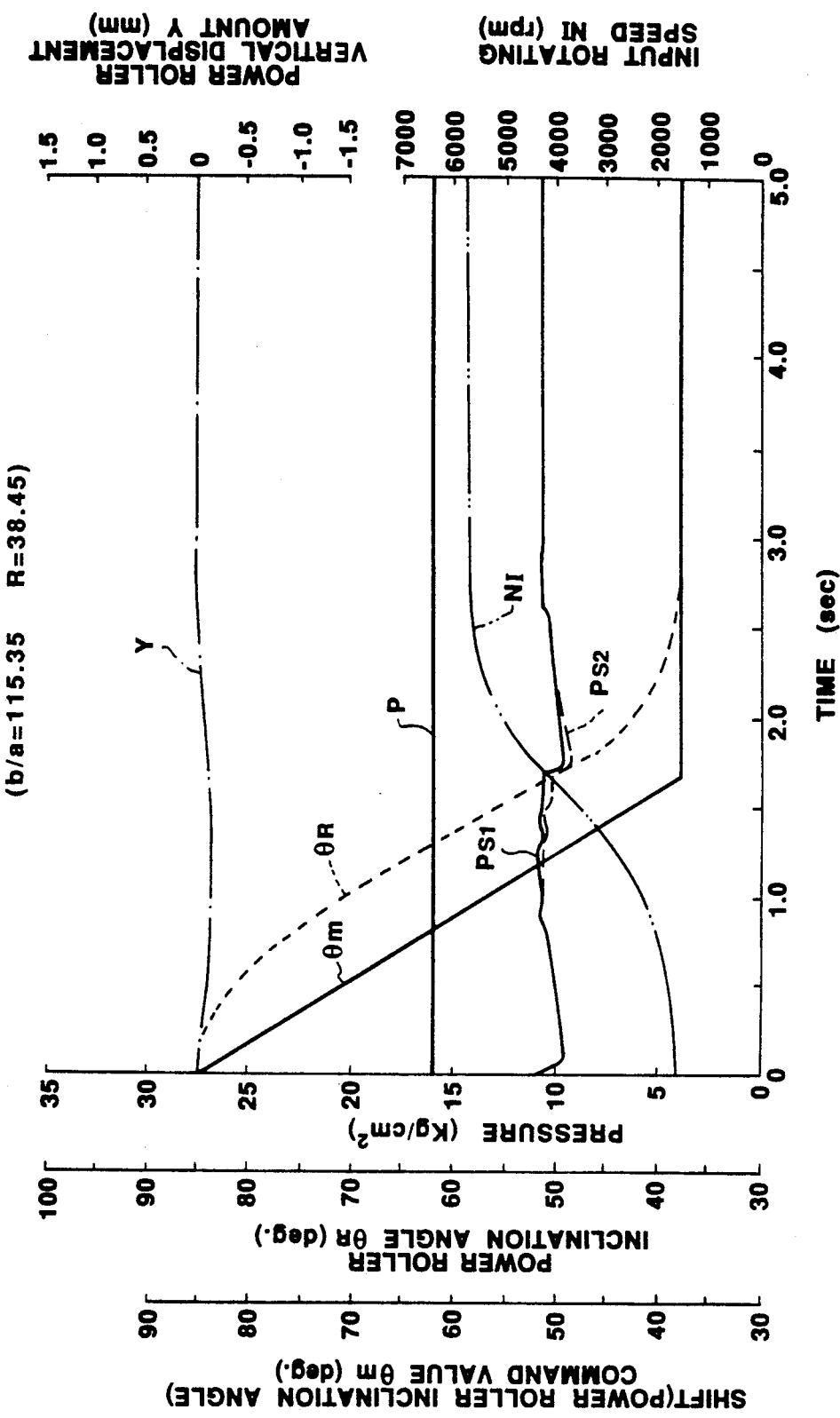
FIG. 51 is a view similar to FIG. 50, showing a 50th test result.
Figure 52:
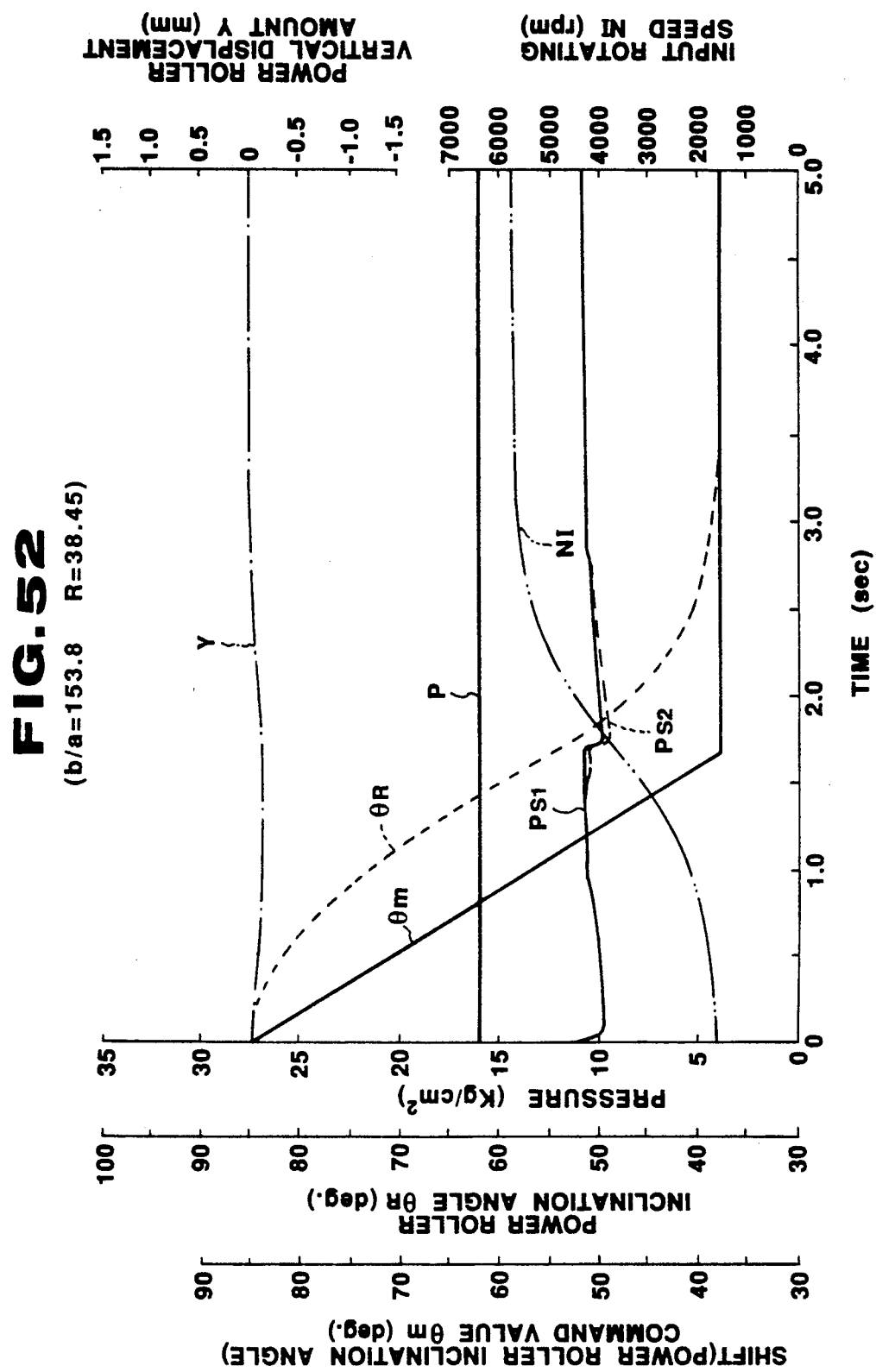
FIG. 52 is a view similar to FIG. 51, showing a 51st test result.
Figure 65:
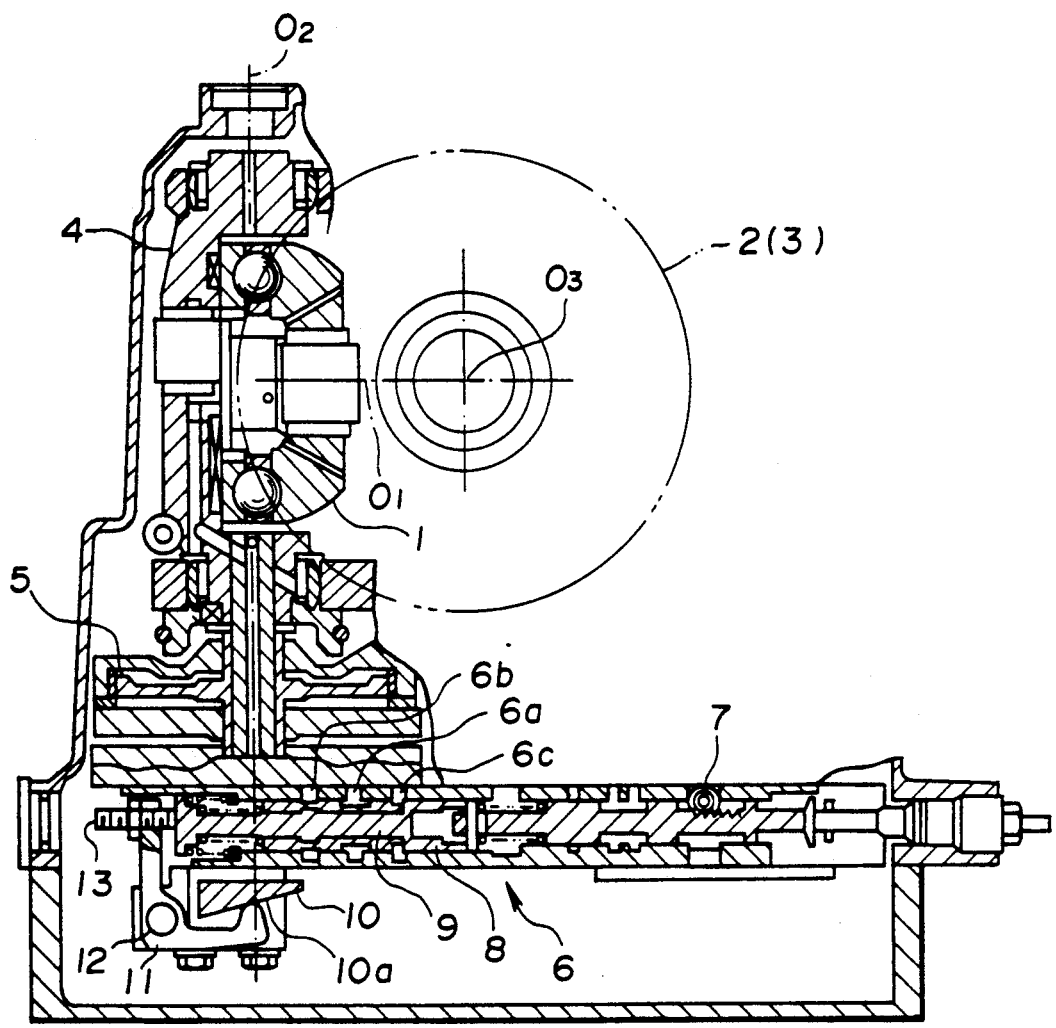
FIG. 65 is a view similar to FIG. 64, taken along the line 65—65 in FIG. 64.
Figure 66:
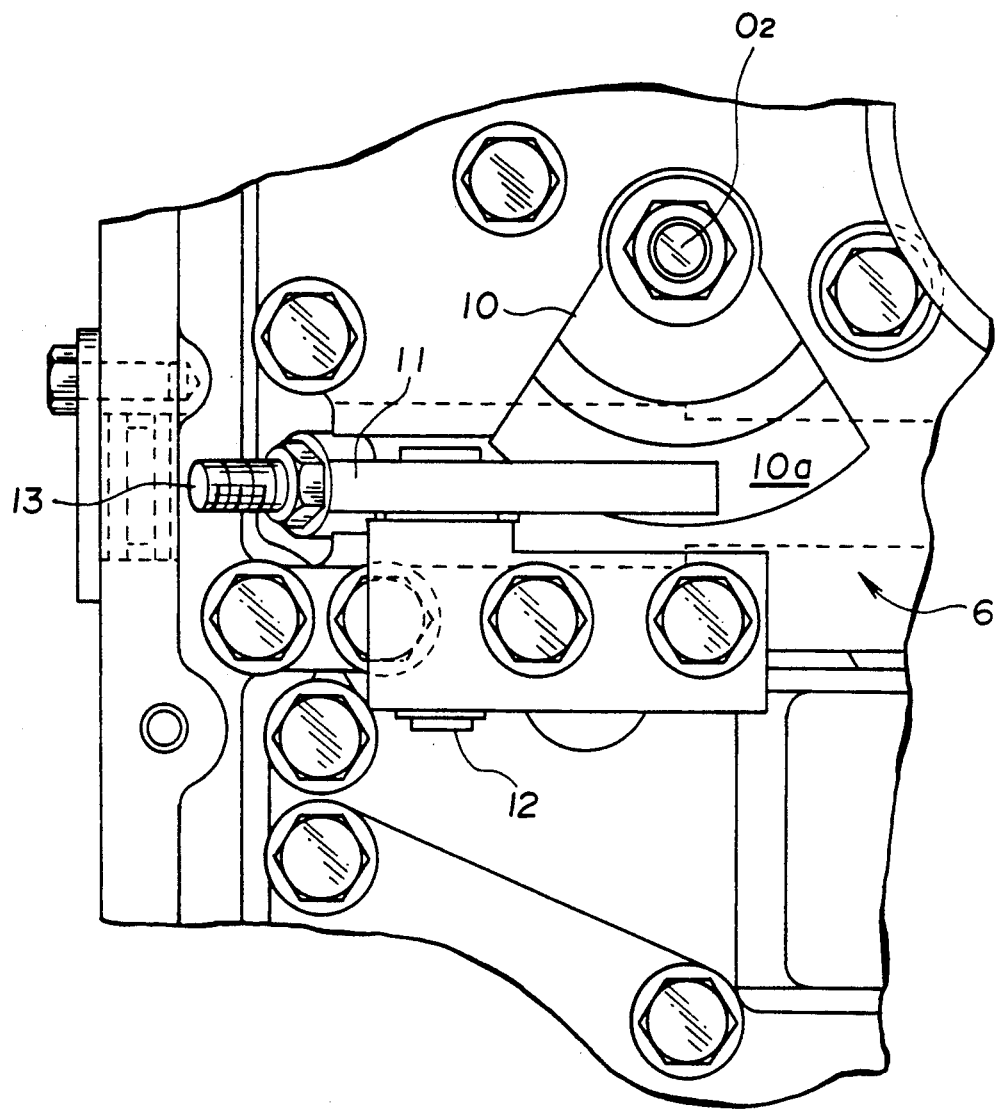
FIG. 66 is a fragmentary plan view showing a bottom of the known transmission as shown in FIG. 65.

Referring to the drawings, a preferred embodiment of the present invention will be described. FIG. 1 shows a shift control valve, generally designated by 6, which is used in the present invention. This valve 6 having substantially the same structure as the known valve as shown in FIG. 65 is an overlap type shift control valve wherein valve port parts of an input sleeve valve body 8 and a feedback spool valve body 9 engage or overlap each other in a balance state thereof as indicated by α. The shift control valve 6 of this type has an improved sealing performance at valve ports thereof due to the engagement length α, thereby avoiding a constant leakage of hydraulic fluid even in the balance state, resulting in a reduced energy loss of an engine for driving an oil pump.

Factors pertinent to shift control performances such as responsability and hunting will be considered. These factors are a set condition of a feedback system comprising the power roller, precess cam, link, and shift control valve which are described hereinbefore, a specific gravity $\rho$ kg/cm$^3$ of hydraulic fluid, a total pressure area A$_1$ cm$^2$ of a plurality of servo pistons, a radial clearance C$_r$ cm between valve bodies of the shift control valve 6 at the overlap portion thereof, an input pressure or line pressure P kg/cm$^2$ to the shift control valve 6, and an average area A$_2$ cm$^2$ of opening area variations of the inflow port and outflow port for 0.1 mm of a relative displacement between the valve bodies with respect to the balance state of the shift control valve 6.

First, the set condition of the feedback system will be described. There is a variation "a" of a feedback amount to the shift control valve 6 for 1 degree of an inclination of the power roller, and a variation "b" of the feedback amount to the shift control valve 6 for 1 mm of a displacement or offset variation of the power roller. Here, in order to make these conditions dimensionless, b/a is adopted as the set condition of the feedback system.

Next, the other factors $\rho$, A$_1$, C$_r$, P, and A$_2$ will be described. It is verified that the factors $\rho$, A$_1$, C$_r$, P, and A$_2$ can be divided into two groups which are reversely operative to each other with respect to the shift control function: $\rho$, A$_1$, and C$_r$ which increase hunting but improve responsibility with an increase in a value thereof, respectively, and P, and A$_2$ which restrain hunting but deteriorate responsibility with an increase in a value thereof, respectively. Based on such a pattern, a parameter $R = \sqrt{\rho \cdot A_1} \cdot \sqrt{C_r}/\sqrt{P \cdot A_2}$ is established which is obtained by making the two groups of factors dimensionless by a putting them in a numerator and a denominator. Here, the factors $\rho$, A$_1$, C$_r$, P, and A$_2$ serve as a dimensionless parameter to be handled together.

FIGS. 2-52 are time charts of shift operation showing test results obtained in different combinations of b/a and R: FIGS. 2-13 are time charts wherein R=5.69, and b/a is variable; FIGS. 14-23 are time charts wherein R=11.15, and b/a is variable; FIGS. 24-32 are time charts wherein R=19.26, and b/a is variable; FIGS. 33-42 are time charts wherein R=27.53, and b/a is variable; And FIGS. 43-52 are time charts wherein R=38.45, and b/a is variable. In FIGS. 2-52, Y designates a vertical (i.e., in the offset direction) displacement of the power roller, $\theta_m$ designates a command value of the speed ratio or inclination of the power roller, $\theta_R$ designates the inclination of the power roller or actual speed ratio, P designates a line pressure, P$_{S1}$, P$_{S2}$ designate pressure values within chambers on both sides of each servo piston, respectively, and N$_1$ designates an input rotating speed of a transmission.

Figure 53:
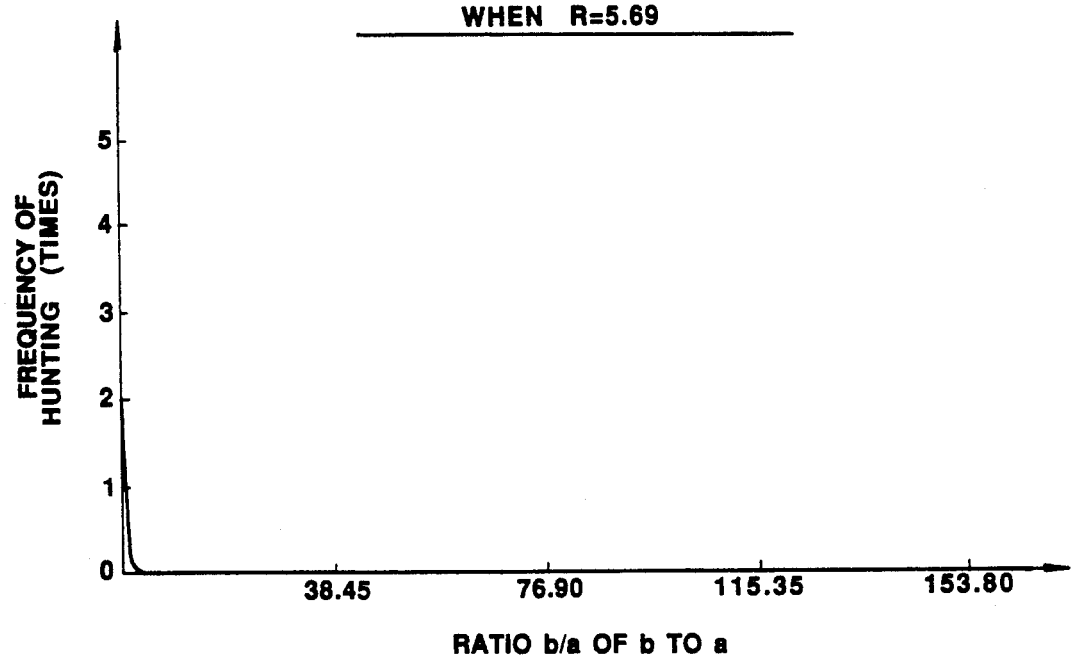
FIG. 53 is a diagrammatic view showing a 1st hunting generation pattern derived from the above test results.
Figure 54:
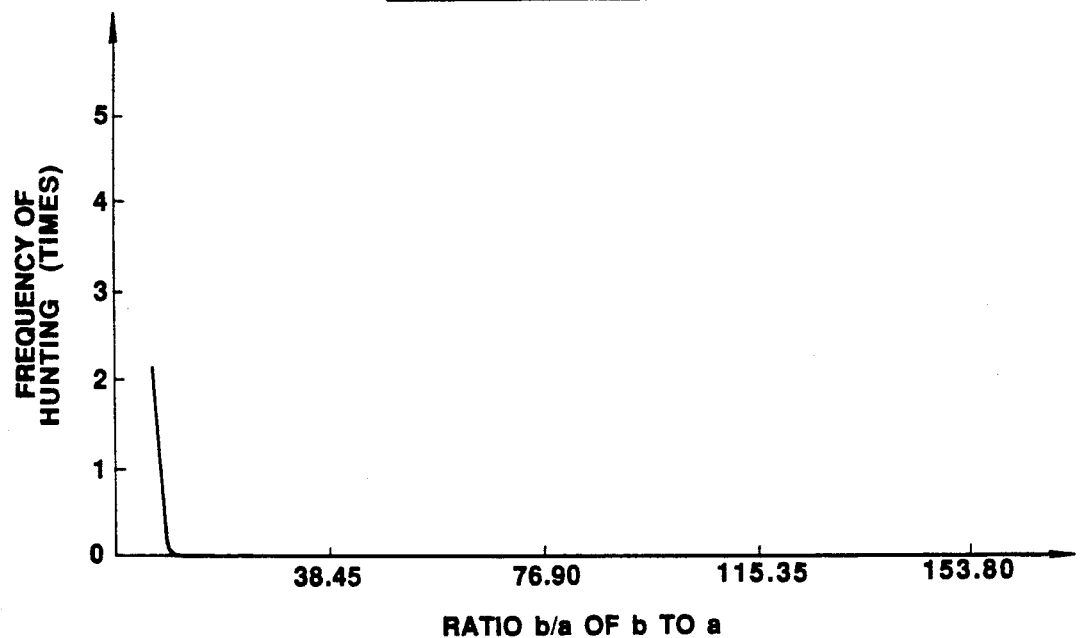
FIG. 54 is a view similar to FIG. 53, showing a 2nd hunting generation pattern derived from the above test results.
Figure 55:
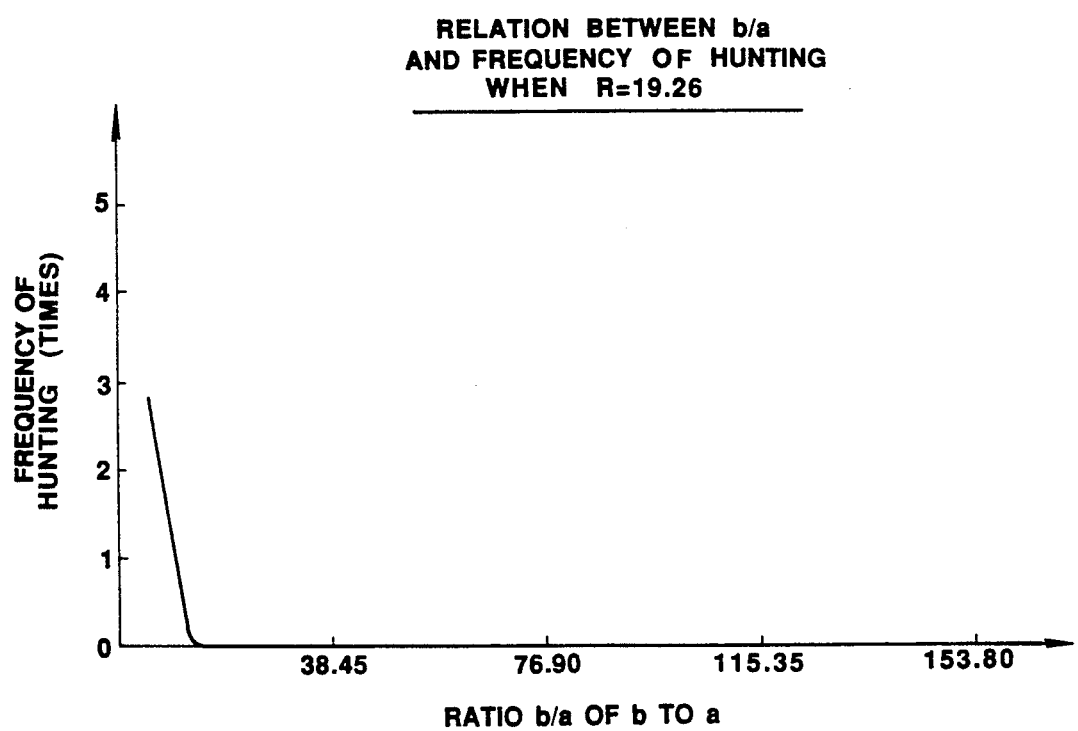
FIG. 55 is a view similar to FIG. 54, showing a 3rd hunting generation pattern derived from the above test results.
Figure 56:
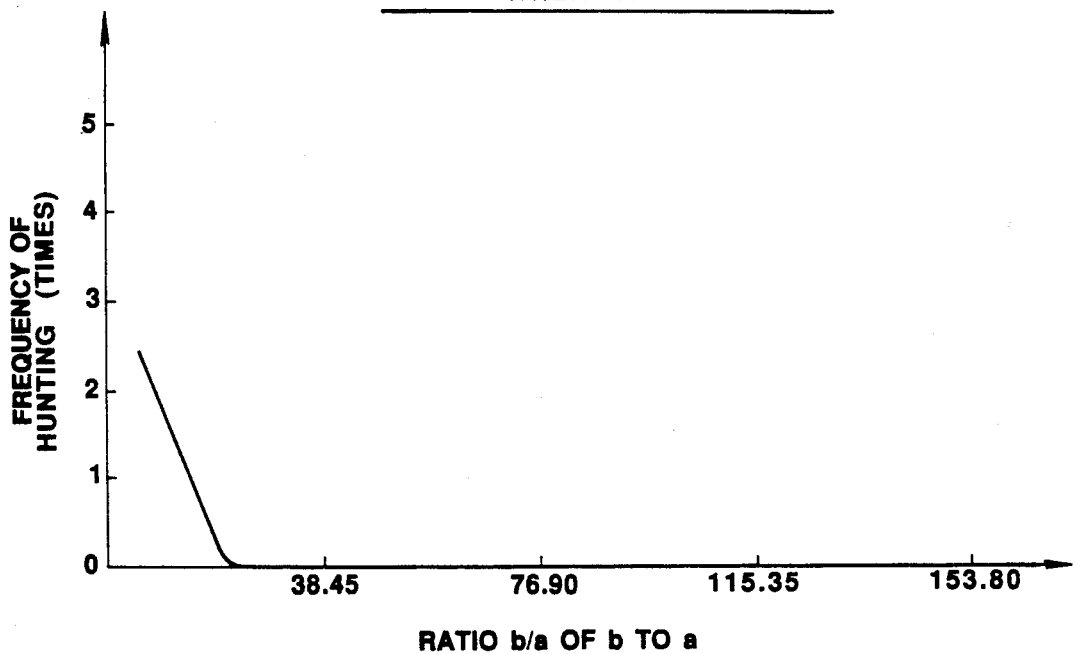
FIG. 56 is a view similar to FIG. 55, showing a 4th hunting generation pattern derived from the above test results.
Figure 57:
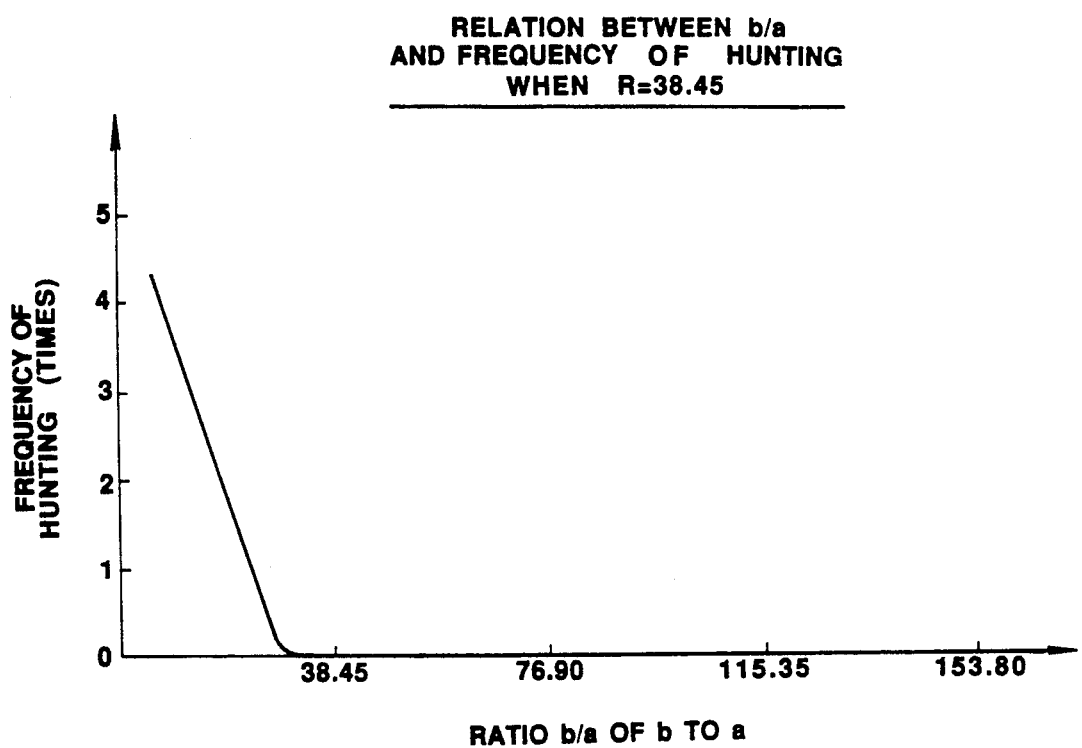
FIG. 57 is a view similar to FIG. 56, showing a 5th hunting generation pattern derived from the above test results.

The relationship between the number of huntings produced until the speed ratio converges on the command value and b/a is derived from these test results: When R=5.69, the relationship is as shown in FIG. 53; When R=11.15, the relationship is as shown in FIG. 54; When R=19.26, the relationship is as shown in FIG. 55; When R=27.53, the relationship is as shown in FIG. 56; And when R=38.45, the relationship is as shown in FIG. 57. Note that in view of a measurement error, it is judged that no hunting is produced when the speed ratio is within ±2% with respect to the command value.

Figure 58:
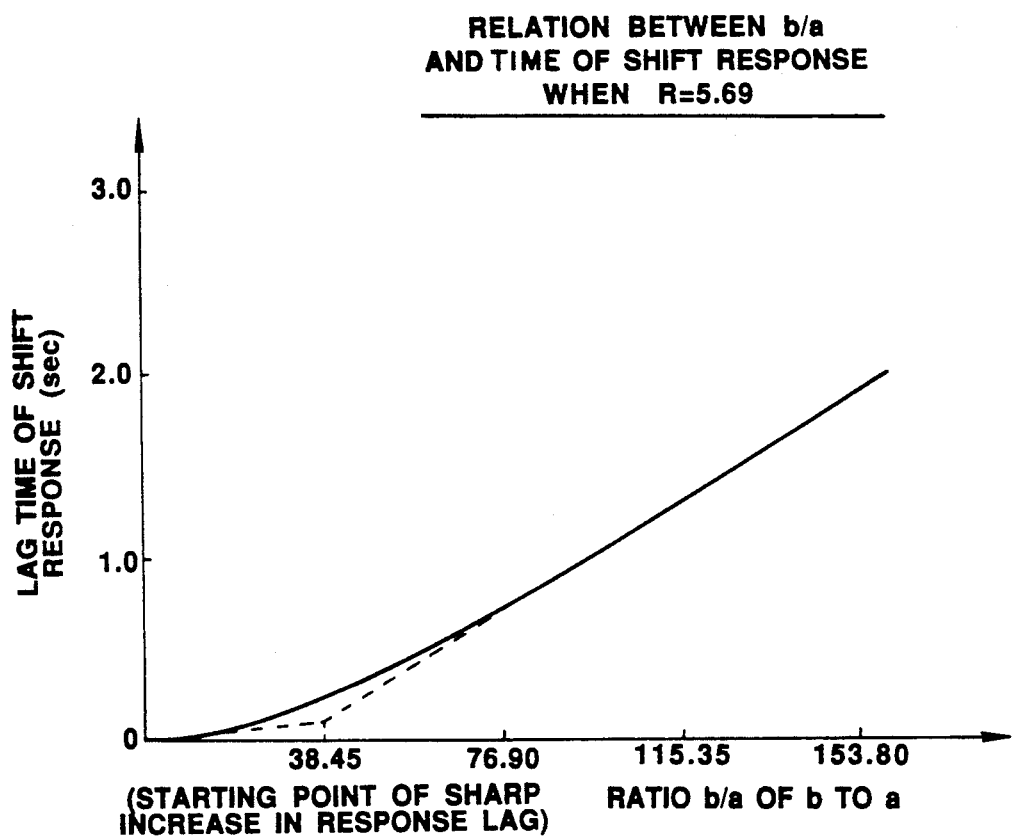
FIG. 58 is a view similar to FIG. 57, showing a 1st response lag pattern derived from the above test results.
Figure 59:
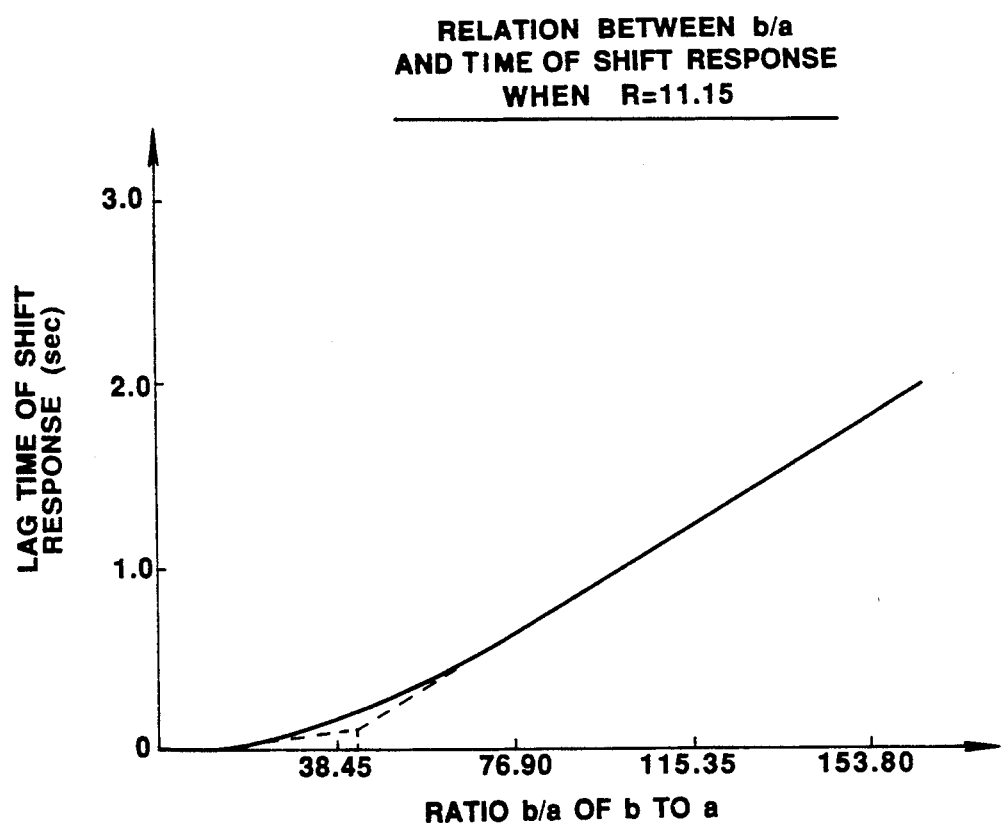
FIG. 59 is a view similar to FIG. 58, showing a 2nd response lag pattern derived from the above test results.
Figure 60:
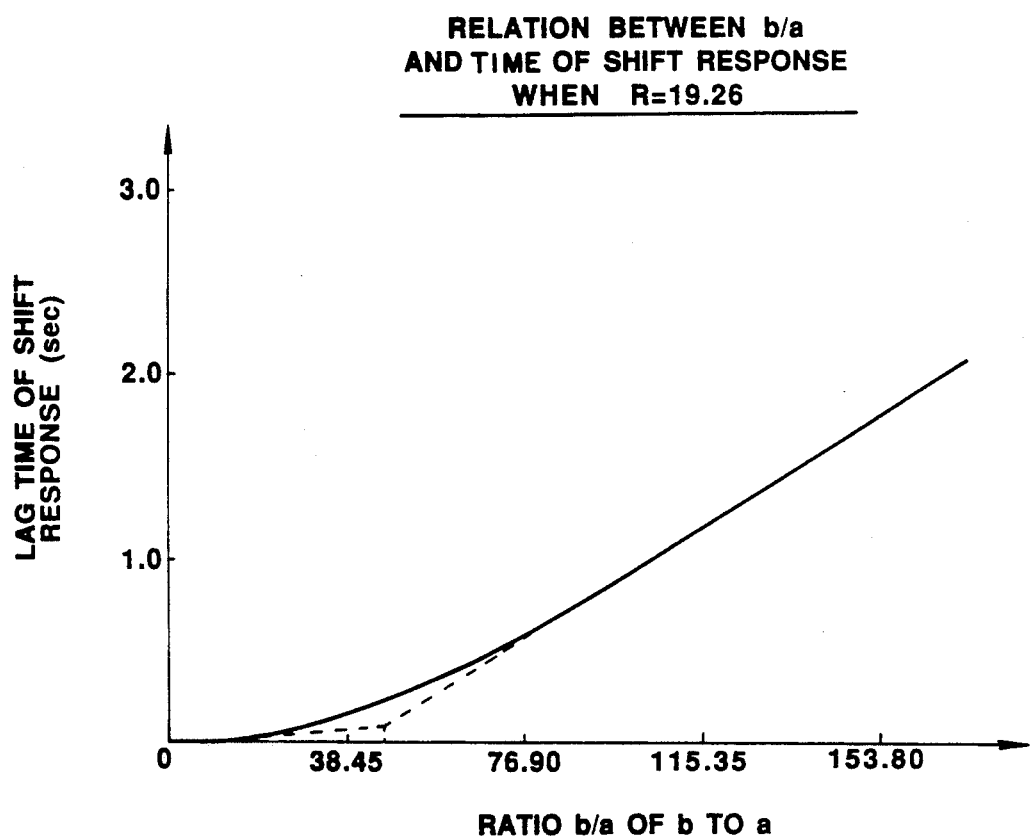
FIG. 60 is a view similar to FIG. 59, showing a 3rd response lag pattern derived from the above test results.
Figure 61:
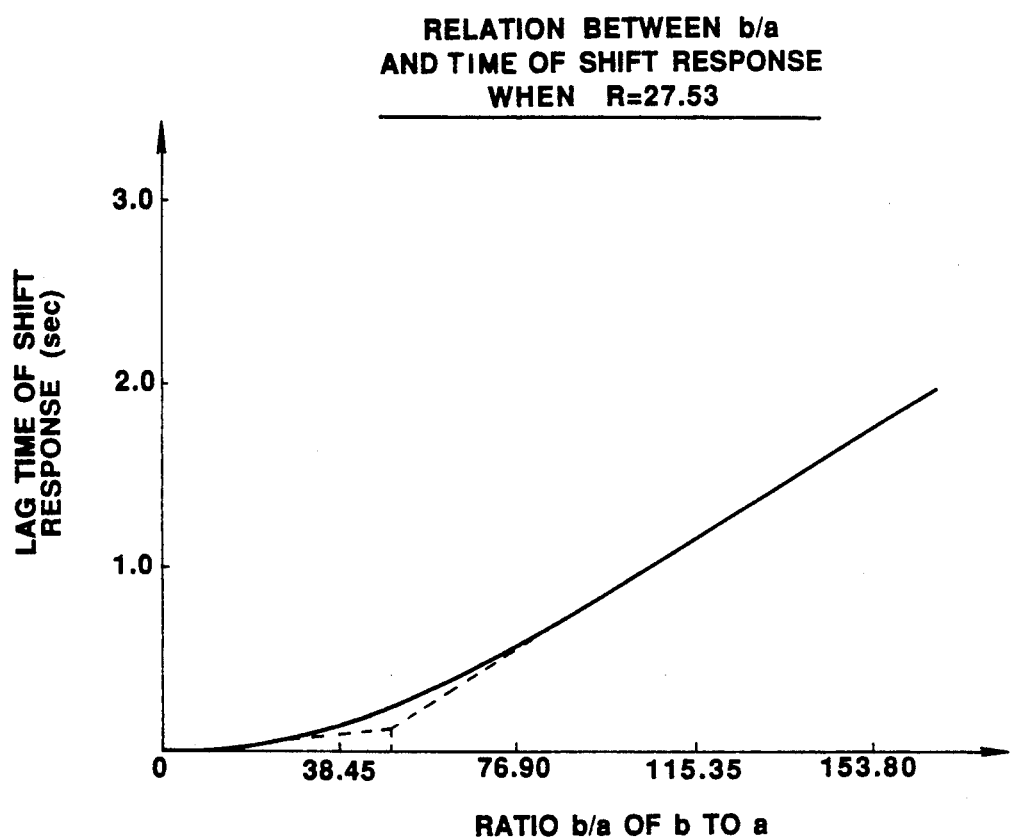
FIG. 61 is a view similar to FIG. 60, showing a 4th response lag pattern derived from the above test results.
Figure 62:
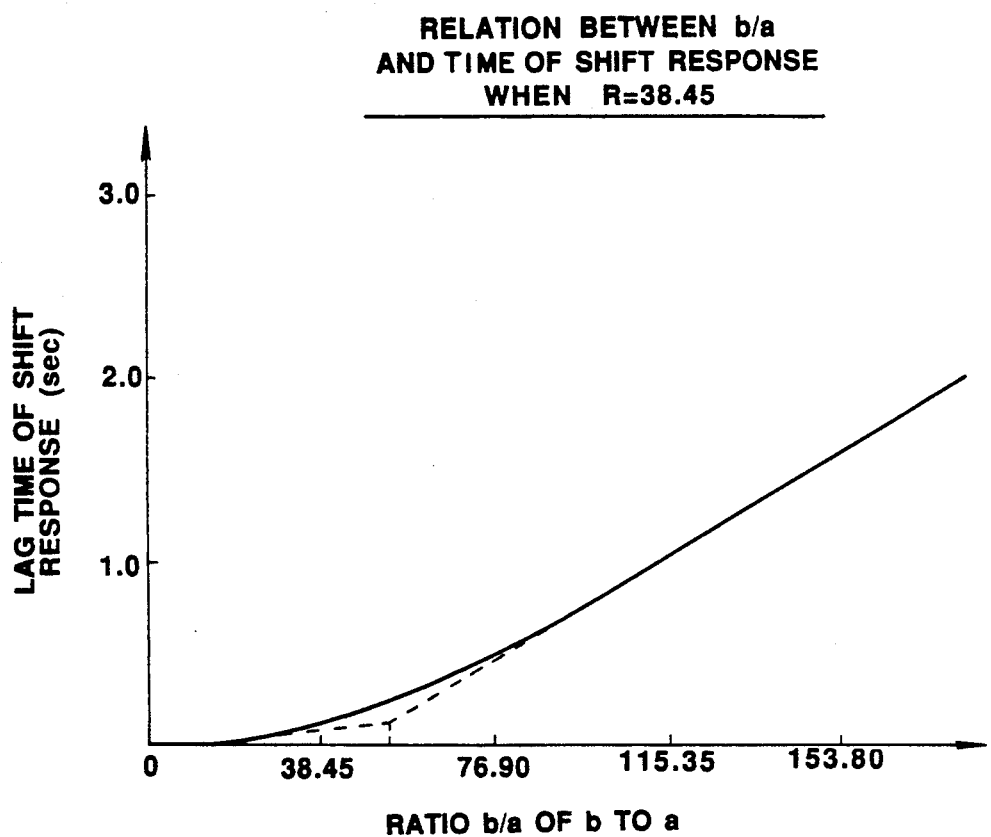
FIG. 62 is a view similar to FIG. 61, showing a 5th response lag pattern derived from the above test results.

Additionally, the relationship between a response lag produced between receipt of the speed ratio modifier command and achievement of an inclination value of the power roller corresponding to the speed ratio command value, and b/a is derived from the test results as shown in FIGS. 2-52: When R=5.69, the relationship is as shown in FIG. 58 by the solid line; When R=11.15, the relationship is as shown in FIG. 59 by the solid line; When R=19.26, the relationship is as shown in FIG. 60 by the solid line; When R=27.53, the relationship is as shown in FIG. 61 by the solid line; and when R=38.45, the relationship is as shown in FIG. 62 by the solid line.

Figure 63:
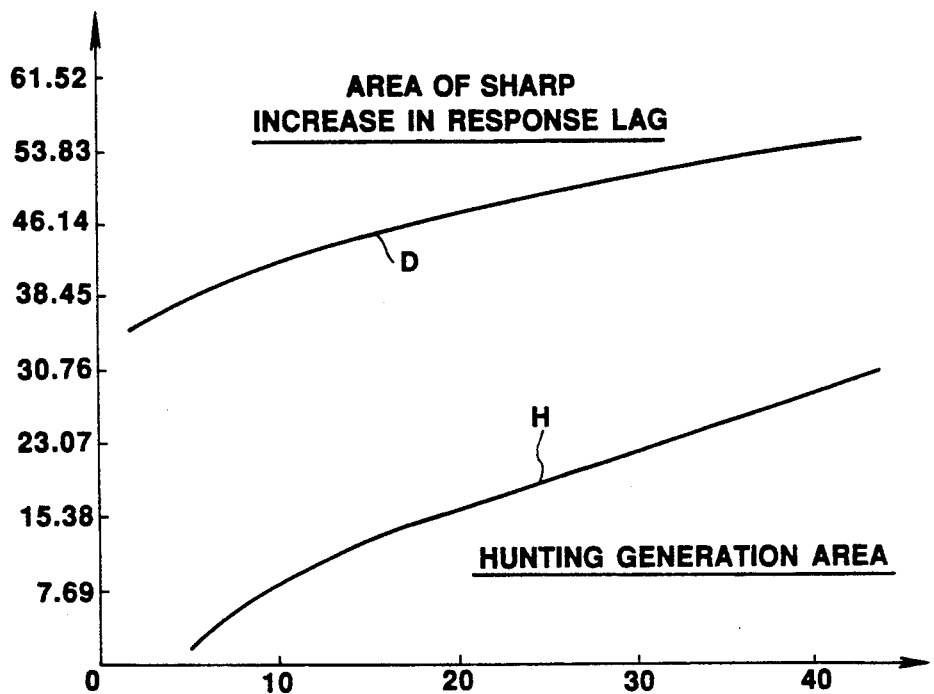
FIG. 63 is a view similar to FIG. 62, showing a hunting generation area and a sudden increase area of the response lag determined on FIGS. 53–62.
Figure 64:
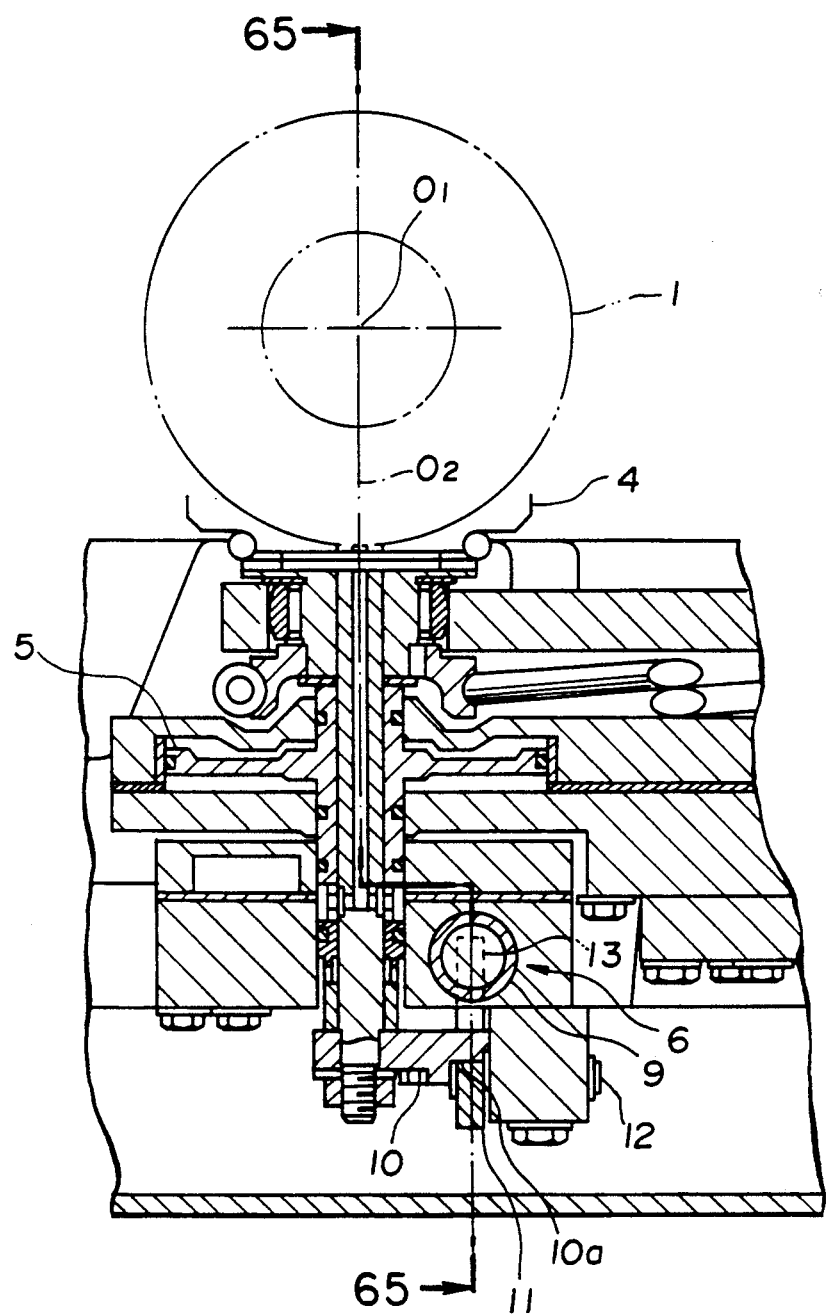
FIG. 64 is a fragmentary section showing a known continuously variable traction roller transmission.

In view of not only a disturbance of control of the speed ratio, but a bad influence on operativity, it is preferable that the number of huntings is null. By plotting every combination of R, b/a when the number of huntings is null in FIGS. 53-57, a curve H in FIG. 63 is obtained, below which is a hunting generation area. It is to be noted that b/a on the curve H and when the number of huntings is null is expressed by the following formula as a function of R:

$$b/a = 1.74R^{4/5} - 3.90$$

Of course, it is preferable that the response lag is null, which is practically impossible, however. Thus, a point from which the response lag begins to increase suddenly is obtained from FIGS. 58-62. That is, referring to FIGS. 58-62, an intersection point of a tangent line to a curve in a relatively low increase rate area of the response lag and a tangent line thereto in a relatively high increase rate area thereof as indicated by the dotted line is considered as a sudden increase start point of the response lag. By plotting this point for every R, a curve D in FIG. 63 is obtained, above which is a sudden increase area of the response lag. It is to be noted that b/a on the curve D and when the response lag increases suddenly is expressed by the following formula as a function of R:

$$b/a = 3.09R^{5/9} + 30.51.$$

As seen from FIG. 63, an area assuming an excellent shift control performance with no hunting and a relatively small response lag is between the curves H, D. According to the present invention, in case of the shift control of the continuously variable traction roller transmission, the feedback to the shift control valve 6 is carried out so that the ratio b/a of the variation "b" mm of the feedback amount to the shift control valve 6 for 1 mm of the displacement of the power roller to the variation "a" mm of the feedback amount to the shift control valve 6 for 1 degree of the inclination of the power roller is in a range given by the following formula as a function of the dimensionless parameter R:

$$1.74R^{4/5} - 3.90 \leq b/a \leq 3.09R^{5/9} + 30.51.$$

What is claimed is:

1. A continuously variable traction roller transmission, the transmission being shiftable in a speed ratio in response to a command thereof, comprising:
 input and output toroidal disks having an axis;
 a power roller interposed between said input and output toroidal disks to be rotatable with an inclination, said power roller having an axis;
 a shift control valve disposed to be responsive to the command, said shift control valve having valve bodies and inflow and outflow ports having an opening area; and
 a plurality of servo pistons fluidly connected to said shift control valve, said plurality of servo pistons moving said power roller to be offset from a position that said axis of said power roller intersects said axis of said input and output toroidal disks so as to direct the speed ratio to a value of the command, said plurality of servo pistons feedbacking movement and offset of said power roller to said shift control valve so as to hold said power roller in said position when said inclination of said power roller corresponds to said value of the command,
 wherein when a dimensionless parameter R is given by:

$$R = \sqrt{\rho} \cdot A_1 \cdot \sqrt{C_r} / \sqrt{P} \cdot A_2,$$

, and wherein
 $\rho$: specific gravity (kg/cm$^3$) of hydraulic fluid,
 $A_1$: total pressure area (cm$^2$) of said plurality of servo pistons,
 $C_r$: radial clearance (cm) between said valve bodies of said shift control valve at the overlap portion thereof,
 P: input pressure (kg/cm$^2$) to said shift control valve,
 $A_2$: average area (cm$^2$) of variations of said opening areas of said inflow and outflow ports for 0.1 mm of a relative displacement between said valve bodies of said shift control valve with respect to a balance state thereof, the feedback to said shift control valve is carried out so that a ratio b/a of a variation "b" mm of a feedback amount to said shift control valve for 1 mm of a displacement of said power roller to a variation "a" mm of said feedback amount to said shift control valve for 1 degree of said inclination of said power roller is in a range given by:

$$1.74R^{4/5} - 3.90 \leq b/a \leq 3.09R^{5/9} + 30.51.$$

2. A method of shift controlling a continuously variable traction roller transmission, comprising the steps of:
 providing a continuously variable traction roller transmission, the transmission being shiftable in a speed ratio in response to a command thereof, the transmission comprising:
  input and output toroidal disks having an axis;
  a power roller interposed between said input and output toroidal disks to be rotatable with an inclination, said power roller having an axis;
  a shift control valve disposed to be responsive to the command, said shift control valve having valve bodies and inflow and outflow ports having an opening area; and
  a plurality of servo pistons fluidly connected to said shift control valve;
 moving said power roller such that said power roller is offset from a position wherein said axis of said power roller intersects said axis of said input and output toroidal disks so as to direct the speed ratio to a value of the command;
 feedbacking movement and offset of said power roller to said shift control valve so as to hold said power roller in said position when said inclination of said power roller corresponds to said value of the command;
 wherein said feedbacking to said shift control valve is carried out so that a ratio b/a of a variation "b" mm of a feedback amount to said shift control valve for 1 mm of a displacement of said power roller to a variation "a" mm of said feedback amount to said shift control valve for 1 degree of said inclination of said power roller is in a range given by:

$$1.74R^{4/5} - 3.90 \leq b/a \leq 3.09R^{5/9} + 30.51;$$

wherein R is a dimensionless parameter defined by:

$$R = \sqrt{\rho} \cdot A_1 \cdot \sqrt{C_r} / \sqrt{P} \cdot A_2,$$

, and wherein
$\rho$: specific gravity (kg/cm$^3$) of hydraulic fluid,
$A_1$: total pressure area (cm$^2$) of said plurality of servo pistons,
$C_r$: radial clearance (cm) between said valve bodies of said shift control valve at the overlap portion thereof,
P: input pressure (kg/cm$^2$) to said shift control valve,
$A_2$: average area (cm$^2$) of variations of said opening areas of said inflow and outflow ports for 0.1 mm of a relative displacement between said valve bodies of said shift control valve with respect to a balance state thereof.

* * * * *